Oct. 13, 1959 E. S. PETERSON 2,908,758

TOLL TICKETING TELEPHONE SYSTEMS

Filed Sept. 11, 1952 14 Sheets-Sheet 1

INVENTOR.
Edward S. Peterson
BY
Smith, Olsen & Baird
Attys.

Oct. 13, 1959 E. S. PETERSON 2,908,758

TOLL TICKETING TELEPHONE SYSTEMS

Filed Sept. 11, 1952 14 Sheets-Sheet 2

INVENTOR.
Edward S. Peterson
BY
Smith, Olsen & Baird
Attys.

Oct. 13, 1959 E. S. PETERSON 2,908,758

TOLL TICKETING TELEPHONE SYSTEMS

Filed Sept. 11, 1952 14 Sheets-Sheet 3

INVENTOR.
Edward S. Peterson
BY
Smith, Olsen & Baird
Attys.

Oct. 13, 1959 E. S. PETERSON 2,908,758

TOLL TICKETING TELEPHONE SYSTEMS

Filed Sept. 11, 1952 14 Sheets-Sheet 4

INVENTOR.
Edward S. Peterson
BY
Smith, Olsen & Baird
Attys.

Oct. 13, 1959 E. S. PETERSON 2,908,758

TOLL TICKETING TELEPHONE SYSTEMS

Filed Sept. 11, 1952 14 Sheets-Sheet 5

INVENTOR.
Edward S. Peterson
BY
Smith, Olsen & Baird
Attys.

INVENTOR.
Edward S. Peterson
BY
Smith, Olsen & Baird
Attys.

Oct. 13, 1959 E. S. PETERSON 2,908,758

TOLL TICKETING TELEPHONE SYSTEMS

Filed Sept. 11, 1952 14 Sheets-Sheet 7

INVENTOR.
Edward S. Peterson
BY
Smith, Olsen & Baird
Attys.

INVENTOR.
Edward S. Peterson
BY
Smith, Olsen & Baird
Attys.

Oct. 13, 1959 E. S. PETERSON 2,908,758

TOLL TICKETING TELEPHONE SYSTEMS

Filed Sept. 11, 1952 14 Sheets-Sheet 9

INVENTOR.
Edward S. Peterson
BY
Smith, Olsen & Baird
Attys.

Oct. 13, 1959 E. S. PETERSON 2,908,758

TOLL TICKETING TELEPHONE SYSTEMS

Filed Sept. 11, 1952 14 Sheets-Sheet 10

INVENTOR.
Edward S. Peterson
BY
Smith, Olsen & Baird
Attys.

Oct. 13, 1959 E. S. PETERSON 2,908,758

TOLL TICKETING TELEPHONE SYSTEMS

Filed Sept. 11, 1952 14 Sheets-Sheet 11

INVENTOR.
Edward S. Peterson
BY
Smith, Olsen + Baird
Attys.

Oct. 13, 1959 E. S. PETERSON 2,908,758

TOLL TICKETING TELEPHONE SYSTEMS

Filed Sept. 11, 1952 14 Sheets-Sheet 12

INVENTOR.
Edward S. Peterson
BY
Smith, Olsen & Baird
Attys.

INVENTOR.
Edward S. Peterson
BY
Smith, Olsen & Baird

INVENTOR.
Edward S. Peterson
BY
Smith, Olsen & Baird
Attys.

United States Patent Office 2,908,758

Patented Oct. 13, 1959

2,908,758

TOLL TICKETING TELEPHONE SYSTEMS

Edward S. Peterson, Elmwood Park, Ill., assignor to General Telephone Laboratories, Incorporated, a corporation of Delaware Application September 11, 1952, Serial No. 308,957

9 Claims. (Cl. 179—7.1)

Figure 1:
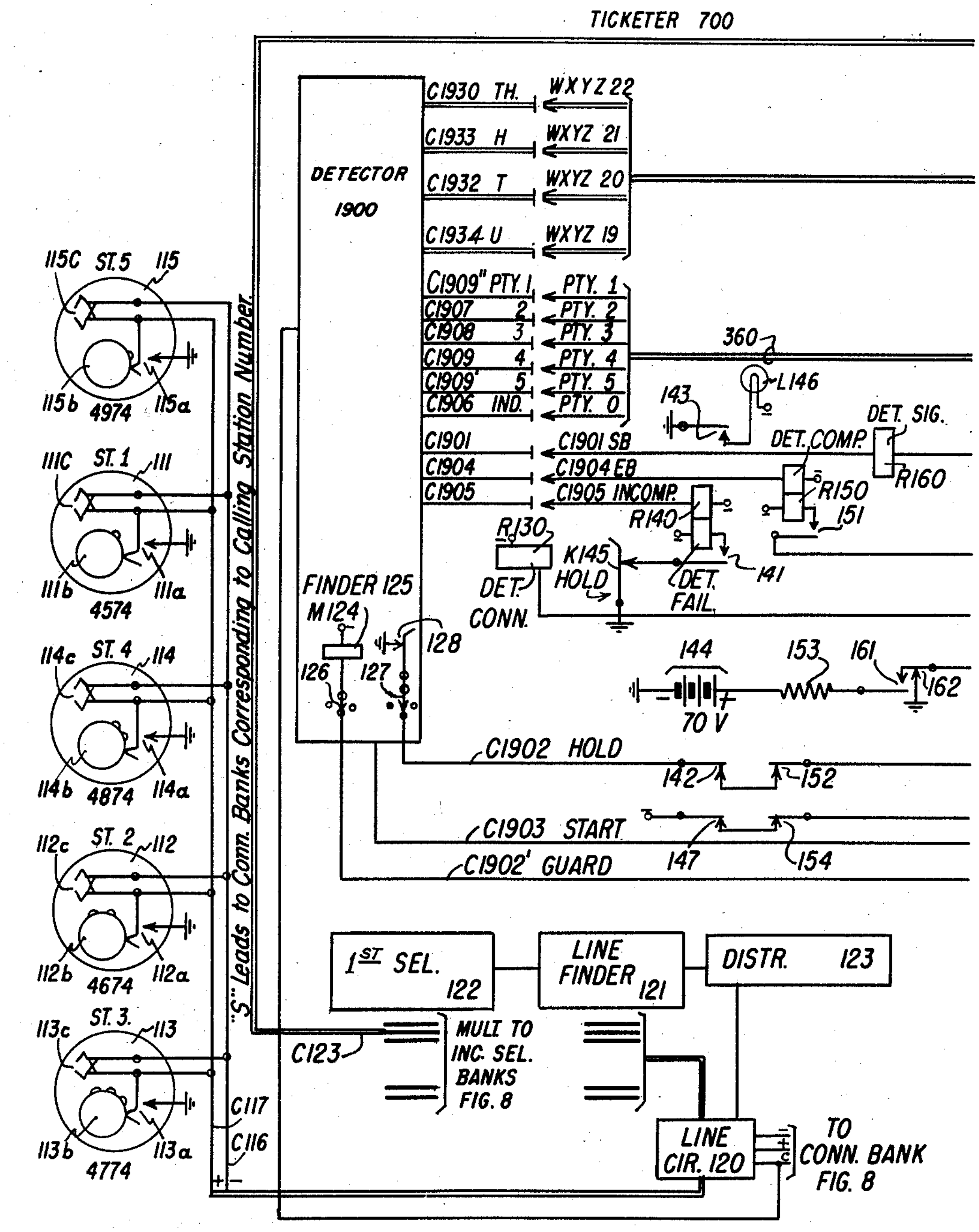

The present invention relates to automatic telephone systems in general and in particular to improvements in automatic telephone ticketing systems arranged to produce records of certain items of information pertaining to each telephone connection so that an appropriate charge may be assessed for each connection.

In prior automatic telephone ticketing networks of the type, for example, disclosed in the Ostline Patent No. 2,581,287, granted January 1, 1952, and in the Ostline Patent No. 2,678,353, granted May 11, 1934, toll ticketing telephone connections are completed under control of a register sender or director provided in the originating telephone exchange. During the establishment of a connection, a detector is controlled to determine the directory number of the calling station and it registers the detected calling number in the register sender. Also, during the setting-up of the connection, the register sender transfers the items of record information registered therein, including the calling station directory number, the called station directory number, the rate of charge for the call, and other pertinent items of record information, to a toll ticket repeater in the originating exchange that has been selected during the course of setting up the connection. The toll ticket repeater stores the items of information transferred thereto and it also accumulates and registers the total elapsed conversation time of the connection. Following the release of the connection a recorder controller, for example, a printer controller or a tabulator, is associated with the toll ticket repeater and the items of record information stored therein are then transferred to the record controller. Incident to the completion of the transfer of the items of information, the toll ticket repeater is restored to normal and rendered available for use in other toll ticketing calls. Thereafter, the recorder controller controls recording apparatus to produce an individual record and a common record of the items of information pertaining to the completed connection.

Automatic toll ticketing apparatus of the type described above is usually employed in a relatively large metropolitan area which is normally divided into a plurality of zones and each zone includes one or more 10,000 line telephone exchanges. Also, each of the exchanges in the network is provided with all of the toll ticketing apparatus necessary for recording the toll calls originated in the associated exchange. Since the apparatus provided in each exchange of a toll ticketing system is quite complicated to manufacture and install, such apparatus can not economically be used in telephone networks served by small exchanges having, for example, 5,000 or less subscriber lines.

Accordingly, it is the main object of the present invention to provide an automatic toll ticketing telephone system for use in relatively small exchanges of an automatic telephone network.

It is still another object of the invention to provide circuits and apparatus for an automatic toll ticketing system which do not require the use of a register sender or director to control the setting up of toll ticketing connections.

It is still another object of the invention to provide in a small central office of a telephone network automatic toll ticketing apparatus that is utilized to record toll calls originating in the central exchange and which is also utilized to record toll calls originating in other small remote exchanges of the network.

It is still another object of the invention to provide in a remote exchange of a toll ticketing network apparatus for controlling toll ticketing apparatus provided in the central exchange so that a record of the various items of information pertaining to a toll call originated in the remote exchange is produced in the central exchange.

Further objects and features of the invention pertain to the particular arrangement of the various circuit elements of the automatic toll ticketing telephone system, whereby, the above objects and additional operating features are attained.

Figure 15:
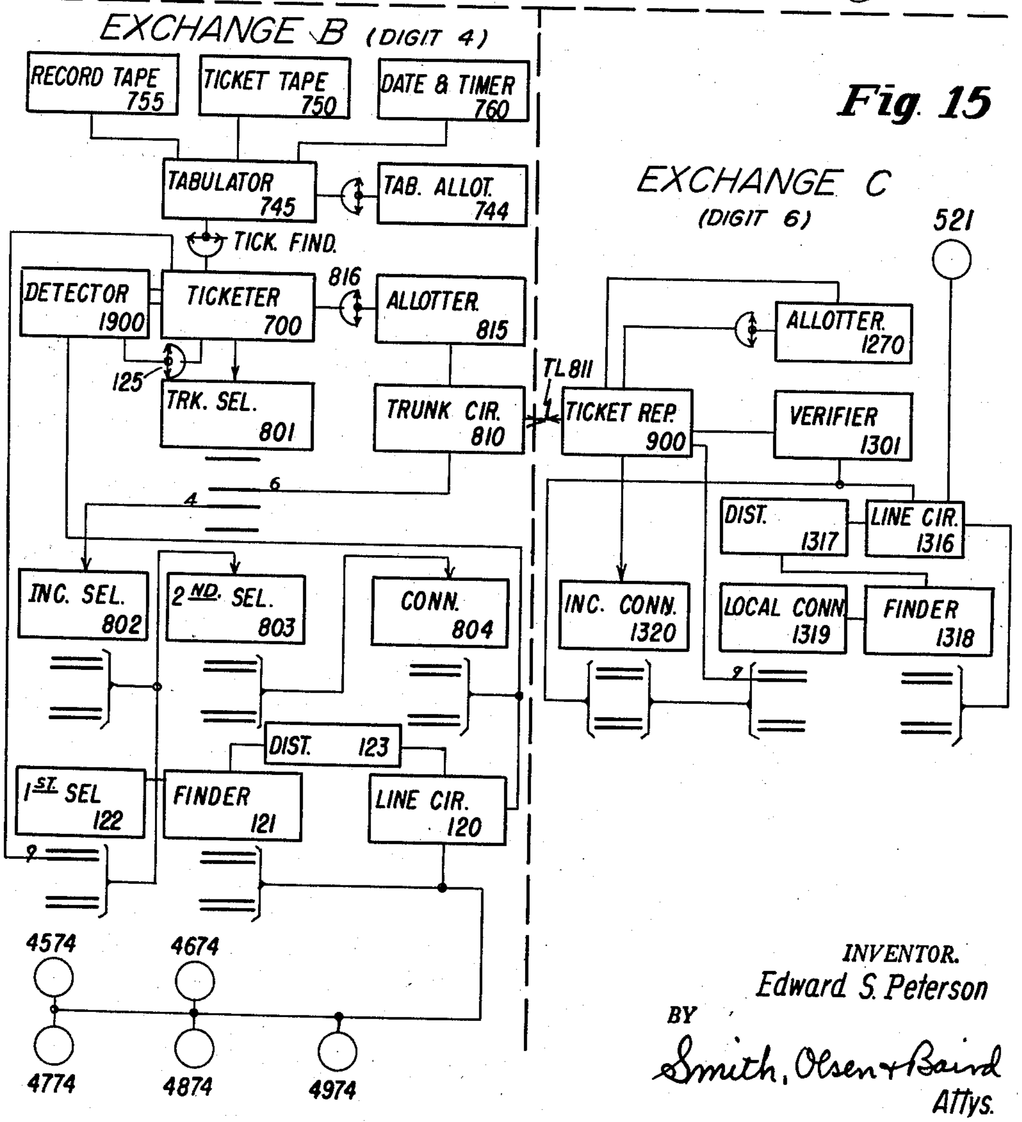
Figure 16:
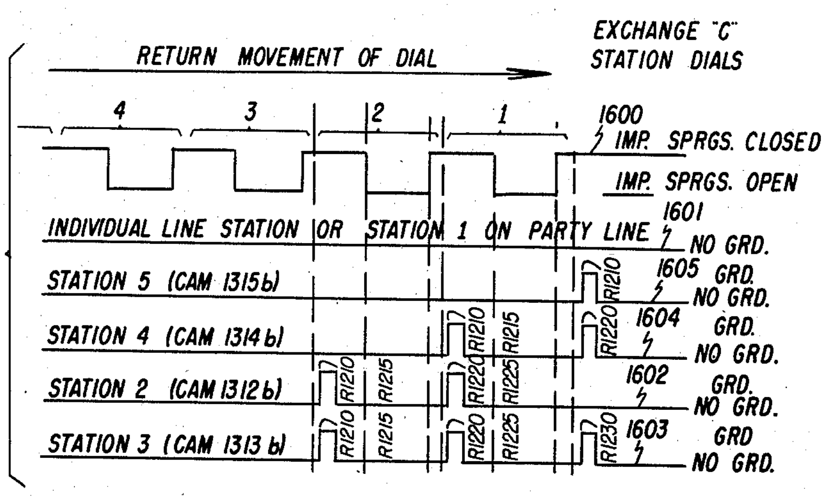
Figure 17:
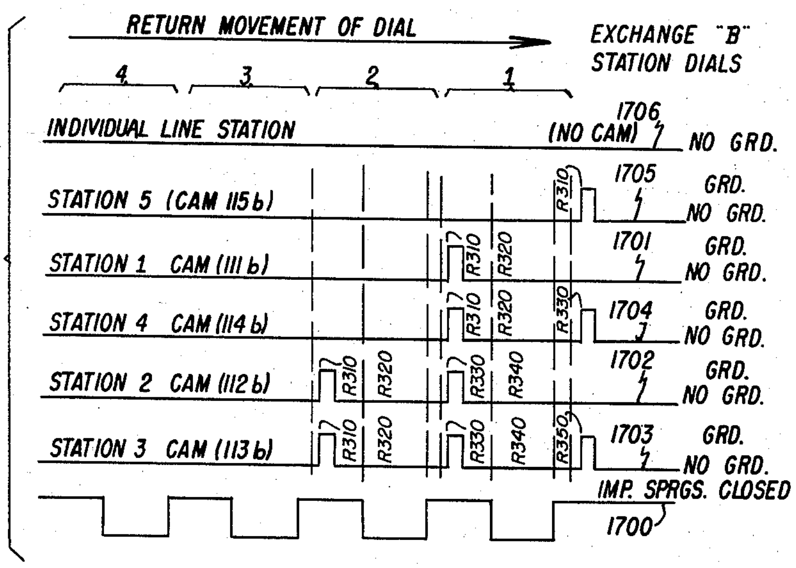

The invention, both as to its organization and method of operation, together with further objects and advantages thereof, will best be understood by reference to the following specification taken in connection with the accompanying drawings in which Figs. 1 to 13, inclusive, taken together, illustrate the details of the apparatus incorporated in the central exchange B and a remote exchange C of the toll ticketing telephone system, which apparatus has incorporated therein the features of the invention as briefly outlined above; Fig. 14 illustrates the mode of combining Figs. 1 to 13, inclusive, to form a unified system; Fig. 15 schematically illustrates a trunking layout of apparatus provided in the central exchange B and the remote exchange C of a telephone system embodying the present invention; Fig. 16 schematically illustrates the manner in which the dial or calling device at each of the different stations on a party line in exchange C transmits switch controlling loop impulses corresponding to digits of a called station number and station identifying ground impulses identifying a particular calling station on a party line; and Fig. 17 schematically illustrates the manner in which the dial or calling device at each of the different stations on a party line in exchange B transmits switch controlling loop impulses corresponding to the digits of a called station number and station identifying ground impulses identifying a particular calling station on the party line.

More particularly, Figs. 1 to 7, inclusive, illustrate the details of one of a plurality of ticketers 700 provided in the central exchange B and which is utilized in toll connections established between subscriber stations in exchanges B and C. The ticketer 700 includes a code storage register 302 for registering the four digits identifying the numerical portion of the directory number of a calling station in exchange B as detected by the detector 1900. In Fig. 1 the schematically illustrated detector 1900 is arranged to identify the calling station number and to register the digits identifying the calling station in the ticketer 700. Preferably, the detector 1900 may be substantially identical to the detector 1900 illustrated in the Ostline Patent No. 2,639,330, issued May 19, 1953. Also, the ticketer 700 includes a digit register 509 which includes the individual registers 510, 520 and 530 for registering the three digits identifying a calling station in the remote exchange C and it includes the individual digit registers 540 to 580, inclusive, for registering the digits identifying a called station in exchange C if the call is an outgoing call from exchange B or for registering the digits identifying a called station in exchange B if the call is incoming to the exchange B. Also, the ticketer 700 includes a storage transfer switch 701 for transferring various items of record information, as stored in the different registers of the ticketer, to a schematically illustrated tabulator 745. The tabulator 745 is arranged so that it will control the schematically illustrated ticket tape perforator 755 and the record tape perforator 750 to perforate tapes in accordance with the various items of record information and in accordance with the date and time as registered in the schematically illustrated date and time unit 760. Preferably, the tabulator allotter 744, the tabulator 745, the record tape perforator 750, the ticket tape perforator 755 and the date and time unit 760 may be substantially the same as the corresponding units disclosed and described in detail in the Ostline Patent No. 2,678,353, issued on May 11, 1954.

Figure 8:
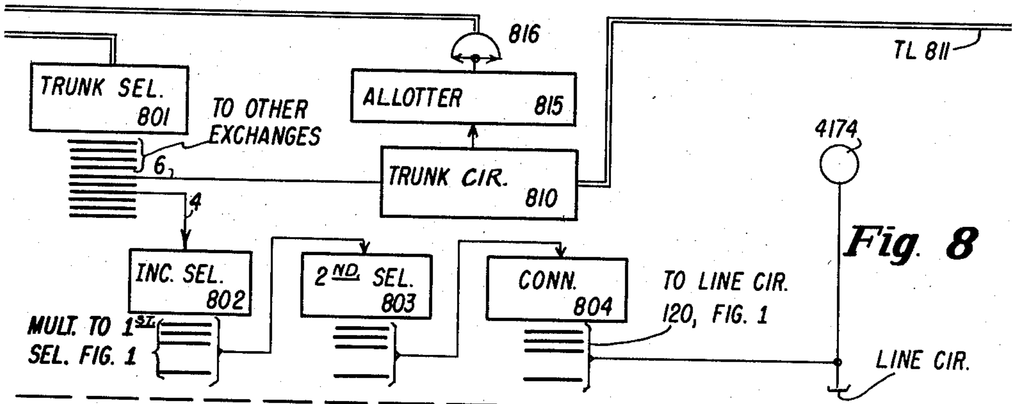

Fig. 8 and a portion of Fig. 1 schematically illustrate certain of the switching apparatus provided in the central exchange B for establishing local calls, incoming toll ticketing calls and outgoing toll ticketing calls.

Figure 12:
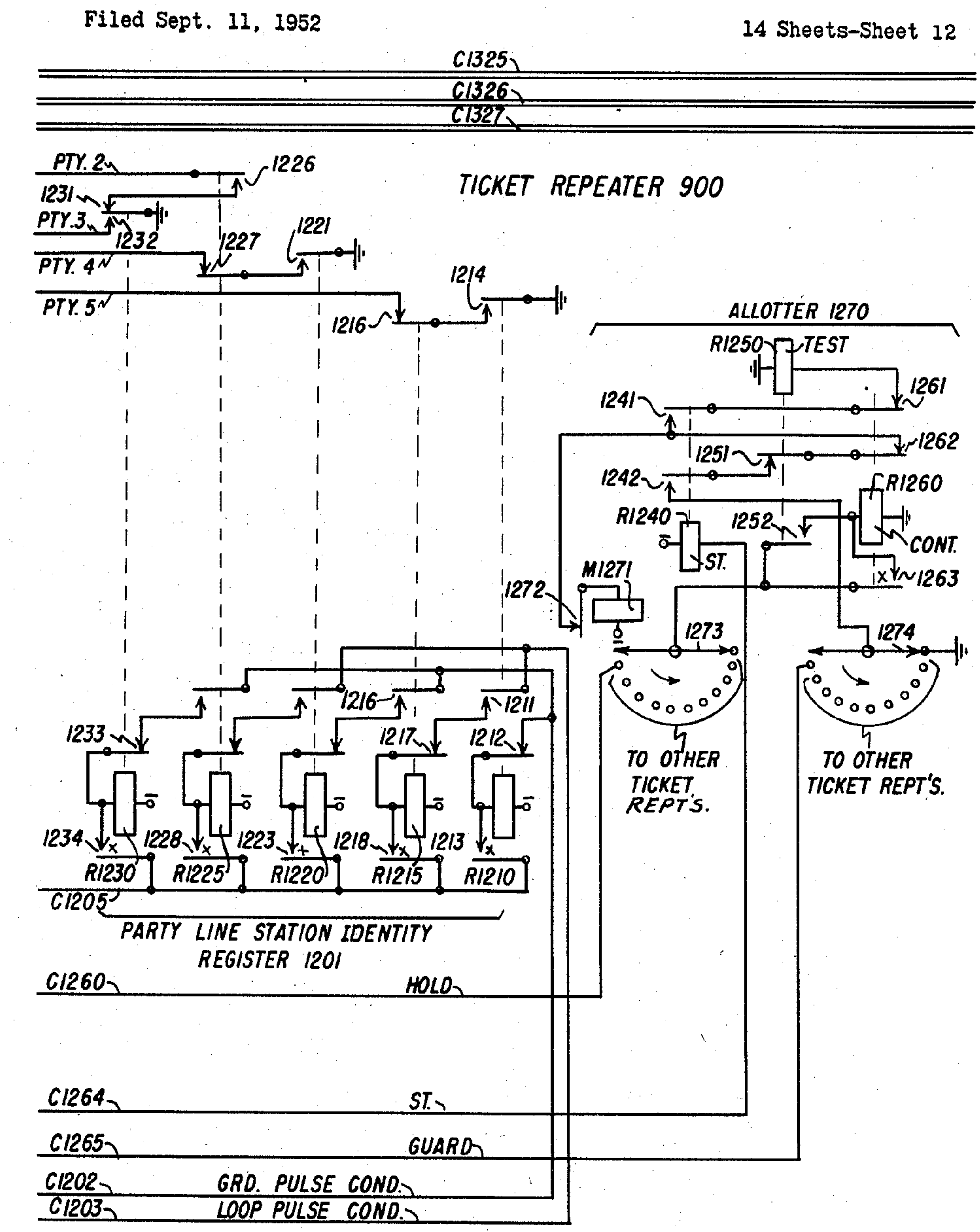

Figs. 9 to 12, inclusive, illustrate the details of one of a plurality of ticket repeaters 900 provided in the remote exchange C. The ticketer 900 includes a tens digit register 1170, a units digit register 1180, and a station digit register 1190 for registering the number of the calling station in exchange C. Fig. 12 also illustrates the details of an allotter 1270 for connecting a common calling line verifier 1301 to any one of the plurality of the ticket repeaters 900 that is in use in a call from exchange C to exchange B.

Figure 13:
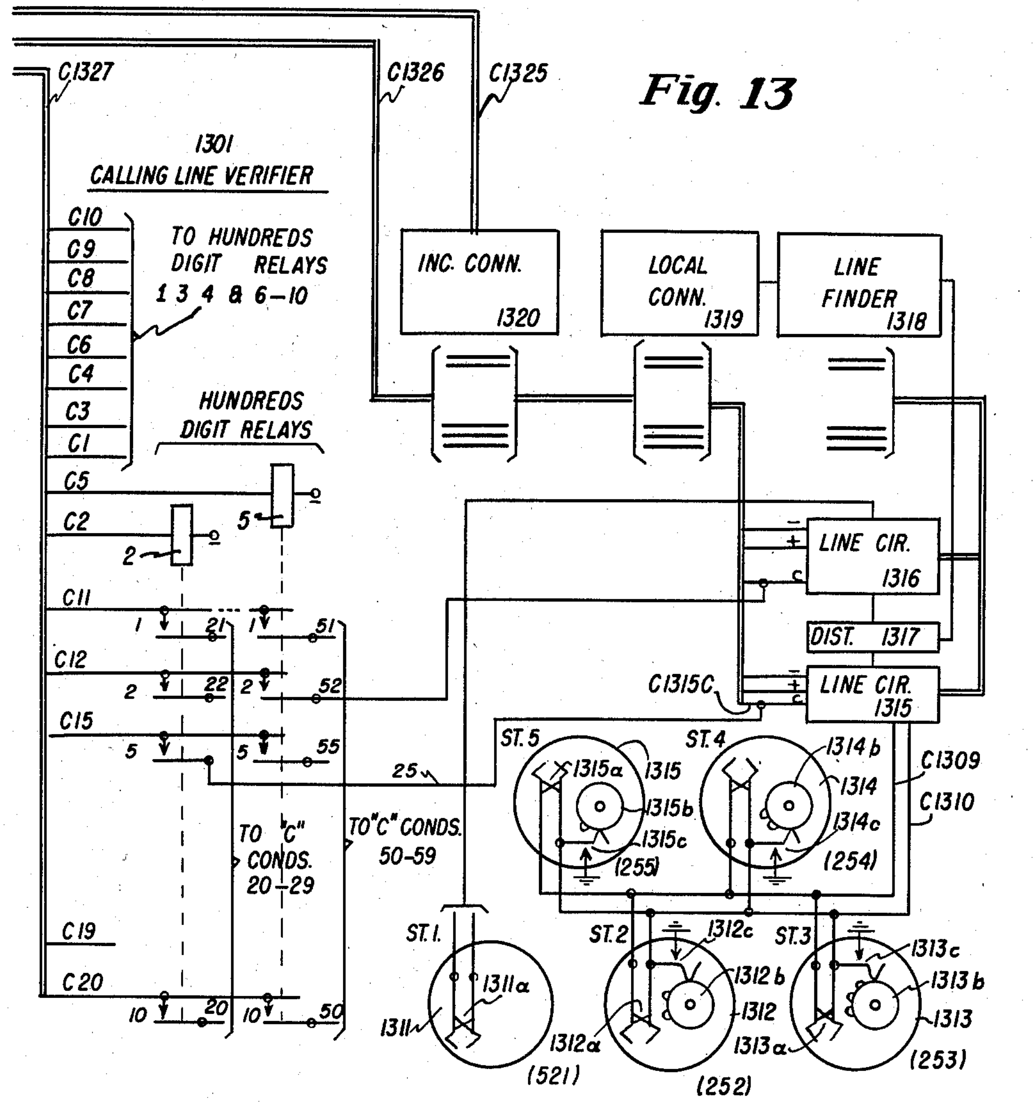
Figure 14:
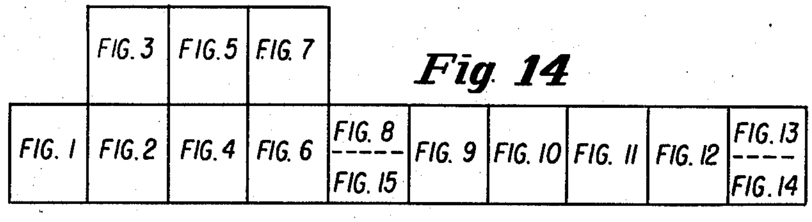

Fig. 13 illustrates the details of the calling line verifier 1301 which is utilized in conjunction with a ticket repeater to ascertain whether or not a calling subscriber in exchange C has accurately dialed his own telephone number in the course of setting up a toll ticketing call to a subscriber in exchange B. Fig. 13, also schematically illustrates the switching apparatus in exchange C for establishing local calls, incoming toll ticketing calls and outgoing toll ticketing calls.

*General arrangement of the telephone system*

Referring now to Fig. 15 a description will be given of the trunking layout schematically illustrated therein for a better understanding of the system. Thus, if a subscriber in exchange B desires to establish a toll ticketing call with a subscriber in a remote exchange C, the line circuit 120, distributor 123 and finder 121 will operate in a conventional manner to connect the calling subscriber line to an idle first selector, such as the first selector 122. As schematically illustrated, the line circuit 120 is individual to a five-party line including the stations having the directory numbers 4574 to 4974. It should be understood, however, that similar line circuits may be utilized for each party line and for each individual line in the exchange. Consequently, if a subscriber at substation 4574 removes his receiver the line circuit 120 will cause the distributor 123 to select an idle finder, such as the finder 121 and the latter mechanism will operate in a vertical and rotary direction to find the calling line. When this occurs, the selector 122 individually associated with the finder 121 will transmit the usual dial tone signal to the calling subscriber. Thereafter, a subscriber may dial the digits 90—6—521.

The digit 9 as dialed by the calling subscriber will control the first selector 122 to raise its wipers to the ninth level and then to rotate its wipers over the bank contacts in the ninth level to select an idle ticketer, such as the ticketer 700.

The next digit 0 dialed by the calling subscriber will be registered in the ticketer 700 to indicate that the call is to be a toll ticketed call. During the dialing of the digit 0 the special dial in the calling station on the party line will transmit one or more ground impulses in the manner to be explained hereinafter to register in the ticketer 700 the number of the particular calling station on the calling party line. As a result of the dialing of the digit 0 and the registration of the identity of the calling station on the party line, the ticketer 700 will cause the detector 1900 to associate itself with the ticketer 700 and to automatically detect the number of the calling station on the party line. In the present call, the detector 1900 will detect the digits 4574 of the directory number of the calling station and it will register these digits in the ticketer 700.

The next digit 6, dialed by the calling subscriber 6 is repeated by the ticketer 700 to the associated trunk selector 801. This selector, in response to the digit 6 will raise its wipers to the sixth level and it will then rotate its wipers over the selected level to search for an idle trunk circuit, such as the trunk circuit 810 terminating a toll line extending to the remote exchange C. As a result of the seizure of the trunk circuit 810 in exchange B, the ticket repeater 900 in exchange C is selected and a circuit is completed for controlling the incoming connector 1320.

The calling subscriber now dials the digit 5 which is repeated by the ticketer 700 over the above connection including the trunk circuit 810, the toll line TL811 and the repeater 900 to the incoming connector 1320. This connector now raises its wipers to the fifth level.

The subscriber then dials the digit 2 and causes the incoming connector 1320 to rotate its wipers two steps into engagement with the second set of contacts in the fifth level.

The last digit is now dialed by the calling subscriber and it controls the incoming connector 1320 to transmit a particular frequency of ringing current over the selected line to ring the called subscriber at station 521.

In the above description of the operation of the incoming connector 1320 it was assumed that the connector is a three-digit frequency ringing connector. However, it may also be of the code ringing type in which case the ringing current will be transmitted to the called line in accordance with a particular code, in a conventional manner. Furthermore, it should be understood that other subscriber lines in the remote exchange C may be of the party type and, consequently, the last digit of the directory number of a called party on a party line may be, for example, any one of the digits 2, 3, 4 or 5 if the lines are of the four-party type.

When the called subscriber at station 521 answers the call, the ticketer 700 in the central exchange B will start timing the call and when the connection is terminated, the ticketer 700 will have registered therein the total elapsed time of the conversation. Thereafter, the ticketer 700 will cause the tabulator allotter 744 to associate the tabulator 745 with the ticketer 700 and all of the items of information stored in the ticketer 700 will be transferred to the tabulator 745. The latter mechanism in turn will then control the ticket tape perforator 750 and the record tape perforator 755 to record, for example, a three digit number identifying the particular ticketer 700 utilized in the connection; a three digit number indicating the number of minutes that the connection is established between the calling and called subscribers; the three digits 521 identifying the directory number of the called station in the remote exchange C; the digit 6 identifying the called remote exchange C; the four digits 4574 identifying the directory number of the calling station in the central exchange B; and also the digit 4 identifying the calling central exchange C. The above items of record information are transferred from the ticketer 700 to the tabulator 745 in the order named and the tabulator 745 controls the ticket tape and record tape mechanisms 750 and 755 in substantially the same manner but also includes additional items of information pertaining to the date and the time that the tabulator recorded the information.

In the above description, the toll ticketed call is originated by a subscriber in the central exchange B and is extended to a subscriber in the remote exchange C. If a subscriber in the remote exchange C originates a call, for example, the subscriber at station 521, the line circuit 1316 will control the distributor 1317 to select an idle finder 1318 and the finder in turn will find the calling subscriber line in a conventional manner. Thus, the calling subscriber at station 521 is now connected to the local connector 1319 which transmits the usual dial tone signal to the calling station. It should be noted at this time that the apparatus, as illustrated, in the exchange C is commonly referred to as a finder-connector system in that it does not have sufficient subscriber lines to require the use of first or second selectors. Accordingly, the exchange C is a 100 line exchange serving 100 subscriber lines.

Upon receiving the dial tone signal, the subscriber at station 521 may now dial the digits 90–521–4–4574 to extend a toll ticketing call to a subscriber in exchange B. The first digit 9 will control the local connector 1319 to raise its wipers to the ninth level and to automatically rotate it wiper over the selected ninth level to search for an idle ticket repeater, such as the ticket repeater 900. The local connector 1319 is of the trunk hunting type, at least on the ninth level thereof and will automatically select and seize an idle ticket repeater.

The next digit dialed by the subscriber at station 521 is the digit 0 which is registered in the 0 register 915 in the ticket repeater 900. The registration of this digit causes the ticket repeater 900 to extend a connection by way of the toll line TL811 to the trunk circuit 810. The trunk circuit 810, in turn, causes the allotter 815 and its associated rotary switch 816 to select an idle ticketer, such as the ticketer 700 in exchange B. If the calling station is on a party line, then during the dialing of the second digit 0, one or more station identifying ground pulses will be transmitted and registered in the ticket repeater 900 to indicate the particular station on a party line that is making the call. In the present example, it is assumed that the call is being made from an individual line station and, consequently, the dial at this station is of conventional construction and does not transmit any station identifying ground pulses to the ticket repeater 900. However, if the call originated on a party line one or more station identifying ground pulses will be transmitted by the calling station dial at the same time as the ten impulses of the digit 0 are transmitted to the ticket repeater 900.

Following the digit 0 the calling subscriber must now dial his own station number, the digits 521, to the ticket repeater 900. These digits are registered in the digit registers 1170, 1180 and 1190 in the repeater and cause the allotter 1270 to associate the verifier 1301 with the ticket repeater 900. The impulses of the digits 521 dialed by the calling subscriber are also repeated, by the ticket repeater 900, over the toll line TL811 and then by way of the trunk circuit 810 and the allotter 815 to the ticketer 700 where they are also registered. Thus, the ticketer 700 in the central exchange B registers the digits of the calling subscriber number as they are dialed. If the calling subscriber has dialed his own number correctly, the vertifier 1301 will check the same and will permit the ticket repeater 900 to also repeat subsequent digits dialed by the calling subscriber over the toll line TL811 to the exchange B.

The calling subscriber now dials the digits 4–4574 in the order named and these digits are repeated over the toll line TL811 and the trunk circuit 810 to the ticketer 700 and registered therein. In response to the first digit 4 identifying the called exchange B of the called number, the ticketer 700 also controls the trunk selector 801 to raise its wipers to the fourth level and then rotate its wipers to select an idle incoming selector, such as the incoming selector 802. The next digit 4 of the called number will cause the ticketer 700 to control the incoming selector 802 to raise its wipers to the fourth level and then rotate its wipers over the selected level to select an idle second sleector, such as the second selector 803, which has access to connector switches in the 500 group. The next digit 5 of the called number will cause the ticketer 700 to control the second selector 803 to raise its wipers to the fifth level and then rotate its wipers over the selected fifth level to select an idle connector, such as the connector 804.

The last two digits 74 of the called subscriber directory number will also be repeated by the ticketer 700 to control the connector 804 in the 500 group to select the line of the called subscriber. This connector, since it is in the 500 group, will transmit a particular frequency of ringing current which will ring the bell at only the subscriber station 4574 on the five party line. Other connectors in the other hundred groups will transmit particular ringing frequencies to selectively signal only the subscriber stations having corresponding ringers at their stations. The ticketer 700 starts timing the connection after the called subscriber at station 4574 answers the call and upon the release of the connection the conversation timer will have stored therein the total elapsed conversation time of the telephone connection.

The remaining operations of the ticketer 700, the tabulator 745 and the tabulator allotter 744, whereby the ticket tape perforator 750 and the record tape perforator 755 are controlled to produce a record of the toll call are substantially the same as described previously.

In view of the foregoing it will be understood that permanent records are made of toll calls extended over the toll line TL811 in either direction between subscribers in the central exchange B and subscribers in the remote exchange C and that the permanent records are always produced in the central exchange B.

Local calls may also be established between the subscribers in exchanges B or C without producing a record of such local calls. For example, the party line subscriber at station 4574 in the central exchange B may establish a connection with another subscriber in the same exchange by dialing the four digits identifying the called subscriber station. Thus, when the subscriber at station 4574 removes his receiver, the line circuit 120, the distributor 123 and the finder 121 will cooperate, in the manner previously described, to connect the calling line to a first selector, such as the first selector 122. Upon receipt of the dial tone signal from the first selector 122, the subscriber may dial the first digit of the local called station into the first selector 122. In response to this digit, the first selector will raise its wiper to the selected level (except level 9 which is reserved for calls to exchange C) and then rotate its wipers over the selected level to search for an idle second selector, such as the second selector 803. The second digit dialed by the calling subscriber will control the second selector 803 in a vertical and then a rotary direction in a conventional manner to select an idle connector, such as the connector 804. The final two digits dialed by the calling subscriber will have caused the connector to select the line to the desired called subscriber. The ringing current for signaling the called subscriber is automatically transmitted by the connector 804 in the usual manner and the conversational circuit will be completed when the called subscriber answers the call. All of the subscriber stations in the central exchange B have four digit directory numbers and the value of the first digit will indicate the thousand group including the called subscriber station.

In exchange C, which is assumed to have 100 subscriber lines, the calling subscriber at station 521 in making a local call will remove his receiver and thereby cause the line circuit 1316, the distributor 1317 and the finder 1318 to operate in a conventional manner to connect the calling line to the local connector 1319. Since the apparatus provided in exchange C is designed to handle calls for 100 subscriber lines, two digits would normally designate the line number of any desired called subscriber. However, inasmuch as some of the subscriber lines in this exchange are arranged for party line service, an additional digit is provided in the directory number of a called station to determine the ringing frequency to be utilized in signaling a particular station on a called party line. In the present example, it will be assumed that the calling subscriber station 521 desires to extend a connection to a called subscriber on a party line having the directory number 253. The digit 2 dialed into the local connector 1319 will raise the wipers to the second level and the second digit 5 will rotate the wipers over the contacts in the second level into engagement with the fifth set of contact banks. The last digit 3 of the called number will control the connector in a well known manner to transmit ringing current over the called line 25 to ring only the station on the party line having the directory number 253. When the called subscriber at station 253 answers the call, the ringing signal will be terminated and the calling and called parties may converse.

While it has been assumed for the purpose of this description that the central exchange B is arranged to serve 1,000 lines and the remote exchange C is arranged to serve 100 lines, it should be understood that the apparatus in exchange B may also be arranged to handle telephone service for 10,000 subscriber lines if desired. Also, the apparatus in exchange C may be arranged to serve 1,000 subscriber lines by introducing, for example, a first selector, such as the first selector 122, between the finder 1318 and the local connector 1319. Furthermore, if it is deemed advisable to increase the number of lines to 10,000 then first and second selectors, such as the first and second selectors 122 and 803, respectively, may be introduced between the finder 1318 and the local connector 1319 in the same manner illustrated in the central exchange B.

Before describing the detail operation of the apparatus illustrated in Figs 1 to 13, inclusive, it should be noted that each of the subscriber station telephone instruments includes the usual handset having a transmitter and a receiver, a ringer and a calling device or dial. The calling device provided at each of the individual subscriber line stations is of conventional construction and arrangement, whereas, the calling device provided at each party subscriber station on a party line is of the construction and arrangement of that disclosed in the John E. Ostline Patent No. 2,410,520, granted November 5, 1946.

In the present system, the calling devices disclosed as stations 1 to 5, inclusive, (Fig. 1) in the central exchange B are provided respectively with impulsing springs **111*c* to 115*c*, inclusive, and they are respectively provided with cam springs 111*a* to 115*a*, inclusive, and associated cams 111*b* to 115*b***, inclusive. In each of the calling devices, the set of impulsing springs are operated in accordance with the return movement of the associated finger wheel (not shown) to transmit a variable number of series of switch controlling loop impulses in accordance with the finger hole selected on the pull of the finger wheel. Also, on each of these calling devices the cam springs are operated by the associated cam, during the return movement of the finger wheel in order to transmit a fixed number of station identifying ground impulses.

Referring now to Fig. 17 it will be seen that the impulsing springs at the various subscriber stations are arranged to interrupt a circuit including the line conductors C116 and C117 as is graphically represented by the line 1700 and that the station identifying cams at stations 1 to 5, inclusive, on the five party line are arranged to apply ground potential to the line conductors as is graphically represented by the lines 1701 to 1705, inclusive. The line 1706 in Fig. 17 indicates that the individual line subscriber stations are not provided with station identifying cams and, consequently, do not transmit station identifying ground impulses. Thus, the line 1700 shows that the dial impulsing springs at any calling station, during the return movement thereof, transmits switch controlling loop impulses over the conductors of the calling subscriber line in accordance with the value of the digit dialed. The line 1701 represents the action of the cam **111*b* (Fig. 1) during the return movement of the dial at the station 1 on a party line to transmit a single short ground impulse just prior to the transmission of the last switch controlling loop impulses by the impulsing springs 111*c*. The line 1702 represents the action of the cam 112*b* to transmit a first short ground impulse just prior to the transmission of the next to the last switch controlling loop impulse and to transmit a second short ground impulse between the transmission of the next to the last and the last switch controlling loop impulse by the impulsing springs 112*c* at the station 2 on the party line. The line 1703 represents the action of the cam 113*b* to transmit three short ground impulses during the return movement of the dial at station 3 on the party line. At this station, the first short ground impulse is transmitted just prior to the transmission of the next to the last switch controlling loop impulse, the second short ground impulse is transmitted between the transmission of the next to the last and the last switch controlling loop impulse, and the third ground impulse is transmitted immediately after the transmission of the last switch controlling loop impulse by the impulsing springs 113*c*. The line 1704 represents the action of the cam 114*b*, during the return movement of the dial at the station 4 on the party line to transmit one short ground impulse between the transmission of the next to the last and the last switch controlling loop impulse and to then transmit a short ground impulse following the transmission of the last switch controlling loop impulse by the impulse springs 114*c*. Finally, the line 1705 represents the action of the cam 115*b*, during the return movement of the dial at the station 5 on the party line to transmit a single short ground impulse following the transmission of the last switch controlling loop impulse by the impulsing springs 115*c***.

Referring now to Fig. 16 it will be seen that the impulsing springs at the various subscriber stations in exchange C are arranged to interrupt the circuit including the line conductors C1309 and C1310 (Fig. 13) as is graphically represented by the line 1600. It will also be seen that the station identifying cams at the stations 2 to 5, inclusive, on a four party line are arranged to apply ground potential to the conductors as is graphically represented by the lines 1602 to 1605, inclusive. The line 1601 indicates that the individual subscriber stations and, if necessary, the station 1 on a five party line are not provided with cams and, consequently, do not transmit station identifying ground impulses. The manner in which the various cams **1312*b* to 1315*b* transmit station identifying ground impulses during the return movement of the associated dial is graphically represented in lines 1602 to 1605**, inclusive, and is substantially the same as has been described above in connection with Fig. 17.

From the foregoing it will be understood that during the return movement of the dial at each of the subscriber stations on a party line, the individual cam thereat will transmit an individual station identifying code signal indicating the position of the particular calling subscriber station on the particular calling party line.

*Extension of a toll ticketed call from a subscriber in the central exchange B to the subscriber in the remote exchange C*

A description will now be given of the operation of the switching apparatus included in the central exchange B and in the remote exchange C. For this purpose, it will be assumed that a call is originated by the subscriber at station 3 (Fig. 1) in the central exchange B having the directory number 4774 and intended for the called subscriber at station 3 (Fig. 14) in the remote exchange C having the directory number 253.

When the calling subscriber at station 3 (whose directory number is 4774) removes his receiver, the usual loop circuit, including the line conductors C116 and C117 is completed for operating the line circuit 120. In response to the completion of the above mentioned loop circuit, the line circuit 120 initiates operation of the distributor 123 and marks the terminals of the calling subscriber line in the bank contacts of a group of line finders, including the line finder 121, having access to the calling subscriber line. For the purpose of this description it will be assumed that the distributor 123 selects the line finder 121 and that the latter finder operates its wiper in a vertical and then a rotary direction in the well known manner to select the terminals in the associated bank terminating the calling line. When the calling line is found by the line finder 121, it extends the calling line to the individually associated first selector 122 and the latter selector transmits the usual dial tone signal to the calling subscriber to indicate that the dialing may be started. The above noted switching apparatus, including the line circuit 120, the distributor 123, the line finder 121 and the first selector 122 may be of conventional construction and arrangement and may be, for example, of the type illustrated in the Bakker Patent No. 2,289,896, granted July 14, 1942, and in the Saunders Patent No. 1,849,694, granted March 15, 1932.

Since the calling subscriber at station 4774 intends to extend the connection to a called subscriber in the remote exchange C it is necessary to prefix the three digit directory number 253 of the called subscriber with the digits 90–6. Consequently, when the calling subscriber receives the dialing tone signal the dial is actuated in accordance with the digit 9 to transmit nine loop impulses to the first selector 922. This selector then raises its wipers in a vertical direction to the ninth level and then rotates its wipers over the selected level to search for an idle ticketer, such as the ticketer 700. It will be assumed for the purpose of this description that the first selector 122 now extends the connection from the calling subscriber line by way of the cable C123 to the ticketer 700 illustrated in Figs. 1 to 7, inclusive. The cable C123 includes the − conductor C414, the + conductor C415 and the control conductor C416. If the ticketer 700 is busy, the control conductor C416 will be grounded in order to indicate the busy condition to the first selector 122. Thus, as the selector rotates its wipers over the ninth level it will pass over contacts terminating ticketers having grounded control conductor corresponding to the C conductor C416.

Figure 2:
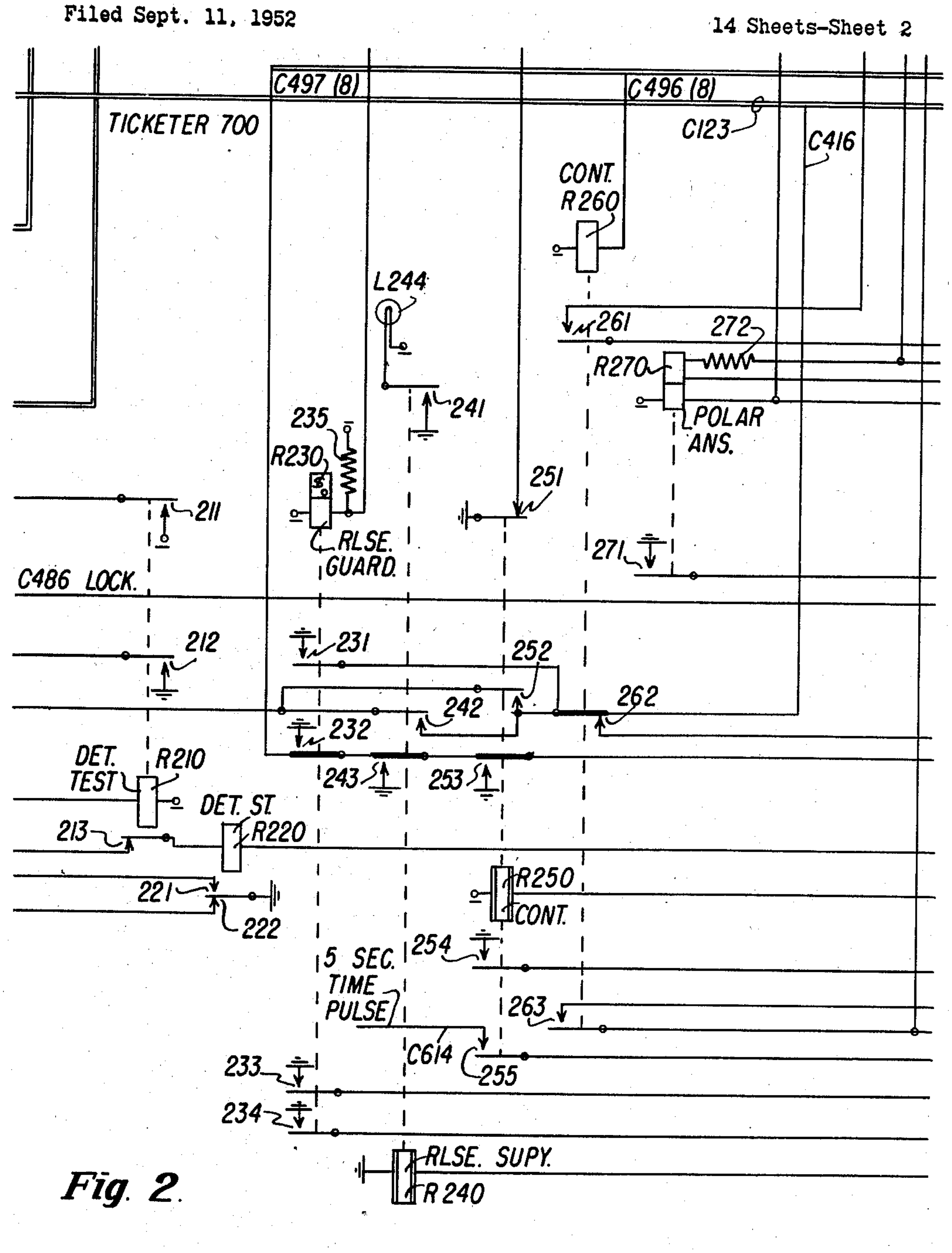
Figure 3:
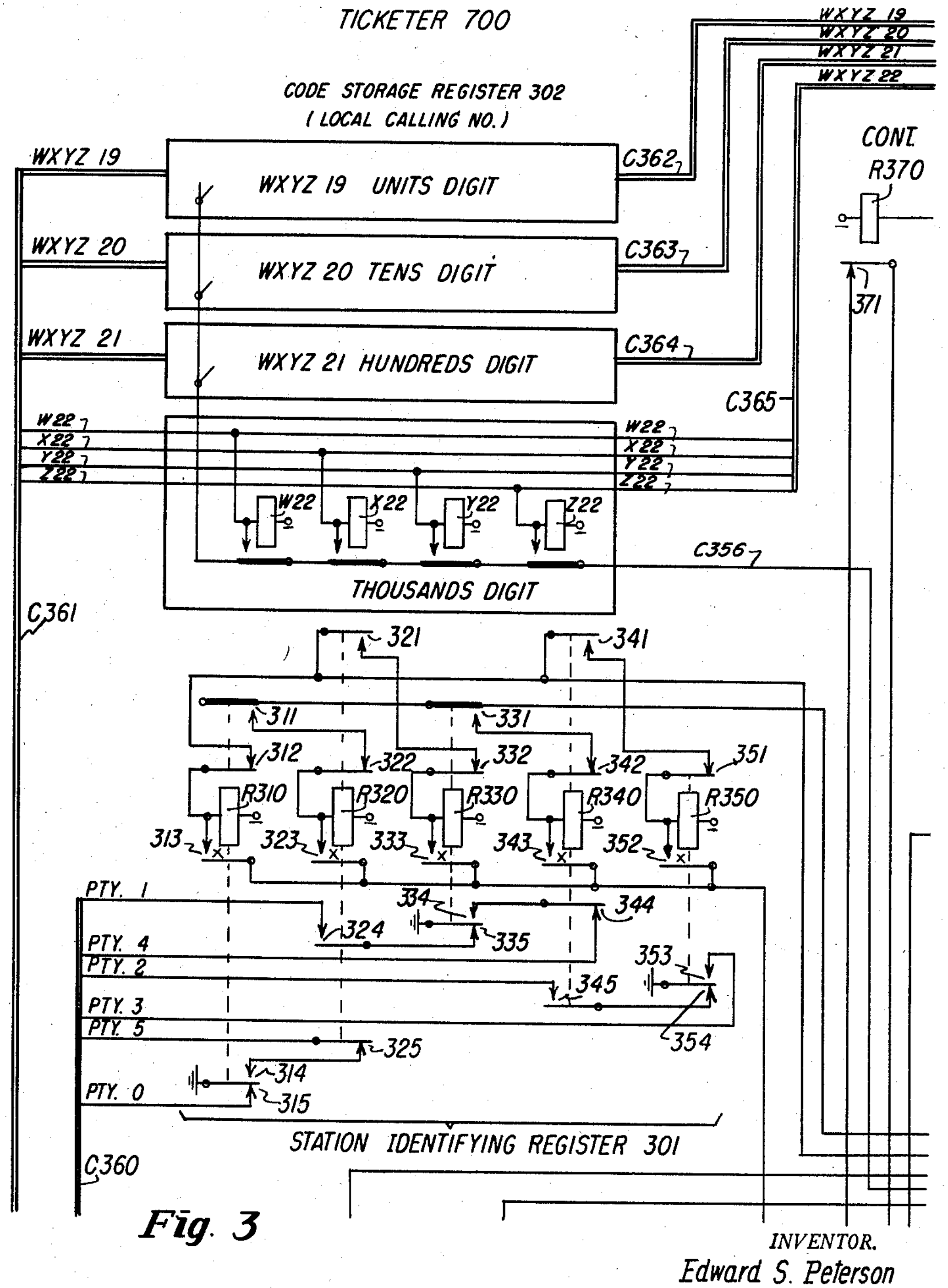

When the first selector 122 seizes the ticketer 700 it extends the loop circuit, including the − and + conductors C116 and C117 of the calling line to the − and + conductors C414 and C415 (Fig. 4) of the ticketer 700. Also, the first selector 122, upon seizing the ticketer 700, applies ground potential to the control conductor C416 (Fig. 2). Referring now to Fig. 2 it will be seen that the ground potential applied to the conductor C416 is extended by way of contacts 262 and the winding of the seize relay R650, to battery. The seize relay R650 operates over this circuit and, at its contacts 655, it completes a circuit including the contacts 647 for operating the line cut-inrelay R450. As soon as the relay R450 operates it completes, at its contacts 451, 453 and 455, a circuit for further extending the − and + conductors C414 and C415 to the windings of the local line relay R430 and the polarized party line relay R420. The last mentioned circuit may be traced from the − conductor C414, contacts 451, upper left-hand winding of the repeating coil 490, contacts 453, winding of the local line relay R430, resistor 435′, negative terminal of the 50 volt auxiliary battery 436, positive terminal of the battery 436, resistance lamp L437, winding of the polarized party line relay R420, contacts 455, lower left-hand winding of the repeating coil 490, and the + conductor C415. Thus, the calling subscriber loop circuit, including the line conductors C116 and C117, is now connected by way of the line circuit 120, the line finder 121, and the first selector 122 to the windings of the relays R420 and R430 in the ticketer 700. Since the party line relay R420 is of the polarized type, the current flow through its windings is in such a direction that the relay does not operate. However, the local line relay R430 operates at this time.

In response to the operation of the line relay R430 a circuit is completed, at its contacts 434, for operating the control relay R250. The latter relay, at its contacts 253, applies ground potential to the C conductor C497 extending to the banks of the rotary switch 816 (Fig. 8). This ground potential marks the ticketer 700 busy to the rotary switch 816, and other similar rotary switches, thereby to prevent the allotter 815 from utilizing the ticketer 700 in connection with an incoming call from the exchange C to the exchange B.

Referring again to the control relay R250, it will be seen that as soon as this relay operates it also completes, at its contacts 254, an obvious circuit for operating the hold slave relay R480.

As soon as the hold slave relay R480 operates it completes, at its contacts 481, an obvious circuit for operating the control relay R610. The relay R610, at its contacts 611, applies a holding ground potential to the conductor C356 in order to retain operated any of the relays in the code storage register 302 that are subsequently operated, to store the registration of the four digit directory number of the calling station. At the contacts 612, the relay R610 completes a circuit for operating the release relay R460 and, at the contacts 613, the relay R610 connects a marking ground potential to certain of the bank contacts associated with the wipers of the storage transfer switch 701.

As soon as the release relay R460 operates, at its contacts 466, it applies ground potential to the locking conductor C486. Finally, at the contacts 465, the relay R460 completes a circuit for energizing the lower polarizing winding of the answer relay R270. However, this relay will not operate until the current flow through the upper winding of the relay is in the proper direction.

The local line relay R430 in the ticketer 700 is now connected to the calling subscriber line and the ticketer 700 is in condition to respond to the impulses of the remaining digits dialed by the calling subscriber. However, before describing the dialing of the second digit 0 into the ticketer 700, it should be noted that when the relay R250 operates, as noted above, it also completes, at its contacts 252, a circuit for returning ground potential (at contacts 161) over the C conductor C416 to the first selector 122. This ground potential is substituted for the normal battery potential applied to the conductor C416 which indicated that the ticketer 700 is idle. Since the first selector 122 is of the battery searching type, it will not switch-through in the manner described above unless the C conductor C416 has the battery potential applied thereto. However, after the switch-through operation of the selector 122 is completed, the ground potential is returned over the C conductor C416 to now hold the selector 122, the line finder 121, and the line circuit 120 in their operated positions under control of the ticketer 700. Also, this ground potential marks the calling line busy to all of the connectors in the exchange B having access to the calling subscriber line.

*Dialing the digit 0 into the ticketer 700*

In response to the dialing of the second digit, which in this case is the digit 0, the local line relay R430 restores and reoperates ten times. The first time the line relay R430 restores to normal it completes, at its contacts 433, a circuit including the contacts 457, 464, 458 and 474 for operating the pulse control relay R485 and the latter relay, at its contacts 487, further extends this operating ground potential by way of the contacts 641, 654, and 645 in order to operate the magnet M663 of the 0 register 660. The magnet M663 is retained in its operated position until the line relay R430 reoperates, at the end of the first pulse, at which time the magnet restores to normal and advances its wipers 661 and 662 one step in a clockwise direction. Thus, in response to the ten impulses transmitted to the local line relay R430, the above traced circuit for the magnet M663 is completed ten times. Accordingly, the wipers 661 and 662 of the 0 register 660 are advanced into engagement with the contacts 10 in the associated contact banks. During the registration of the impulses comprising the digit 0 in the 0 register 660, the slow-to-release pulse control relay R485 is retained in its operated position.

At the conclusion of the dialing of the digit 0, the local line relay R430 will be retained in its operated position during the interdigital pause between the transmission of the digit 0 and the following digit dialed by the calling subscriber. During the interdigital pause the pulse control relay R485 restores to normal and attempts to complete, at its contacts 486 and 488, two separate circuits. The first circuit is provided to operate the relay R640 if the digit 0 has been registered in the 0 register 660 and the second circuit is provided to operate the 0 failure relay R470 in the event that the digit 0 is not registered in the 0 register 660.

Assuming that the digit 0 has been properly registered, a circuit is completed, incident to the restoration of the relay R485, which may be traced from ground at contacts 466 and then by way of the contacts 486, wiper 662 in engagement with the contact 10 and the winding of the 0 dialed relay R640, to battery. The latter relay now operates and, at its contacts 643, locks itself to the grounded locking conductor C486. As a further result of the operation of the relay R640, at its contacts 642, it prepares a point in a pulsing circuit for transmitting impulses of subsequent dialed digits to the wiper 503 of the receive sequence switch 501. Also, at its contacts 644, the relay R640 interrupts a point in a circuit traced hereinafter, in order to prevent operation of the 0 failure relay R470. At its contacts 646, the relay R640 completes a circuit including the contacts 213, 154 and 147 for operating the detector start relay R220 in order to cause the detector 1900 to identify the directory number of the calling station and to register the digits thereof in the code storage register 302. Finally, at its contacts 647, the relay R640 interrupts the circuit for the line cut-in relay R450. The relay R450 now restores to normal in order to disconnect the loop circuit including the calling subscriber line from the party line relay R420 and the local line relay R430 and in order to connect the loop circuit to the windings of the line relay R440.

The second circuit completed incident to the restoration of the pulse control relay R485 at the termination of the transmission of the digit 0 to the ticketer 700 includes the contacts 488, 644, 631 and the winding of the 0 failure relay R470, to battery. It should be noted in the above circuit that the contacts 631 are closed by operation of the control relay R630 and that the latter relay is operated as soon as the wiper 661 is advanced into engagement with the first contact in the associated contact bank. Contacts 1 to 10, inclusive, of this bank are multiply connected to ground potential so that the relay R630 is retained operated during the time interval that the wiper 661 engages any one of the contacts 1 to 10, inclusive, in the associated contact bank. Thus, if any digit other than the digit 0 is registered in the 0 register 660, the 0 dialed digit relay R640 will not be operated incident to the restoration of relay R485 and, therefore, the above mentioned circuit will be completed for operating the 0 failure relay R470. Upon operating the relay R470 locks itself, at its contacts 475, to the grounded locking conductor C486. Also, at its contacts 474, the relay R470 interrupts a point in the circuit for the pulse control relay R485 in order to prevent reoperation of this relay if the subscriber should dial an additional digit. Also, at the contacts 471 and 473, the relay R470 completes a circuit, whereby, a busy tone source (not shown) connected to the conductor C477 transmits a busy tone signal over the − conductor C414 to the calling subscriber station and returned by way of the + conductor C415, contacts 473 and the condenser 476 to ground. Accordingly, the calling subscriber receives a busy tone signal to indicate that the call cannot be completed to its destination. Finally, at the contacts 472, the relay R470 interrupts a point in a loop circuit traced hereinafter extending to the trunk selector 801.

From the foregoing description it will be understood that if the 0 digit is properly registered in the 0 register 660, the detector 1900 is seized for operation to identify the number of the calling subscriber station and the ticketer 700 is conditioned to respond to subsequent dialed digits. However, if 0 digit is not properly dialed and registered in the register 660, a busy tone signal will be transmitted to the calling subscriber and the ticketer 700 will be controlled so that it will not respond to any additional digits dialed by the calling subscriber.

If the present call is originated at an individual subscriber line provided with a conventional calling device that is arranged to transmit only loop impulses, then the polarized party line relay R420 will not be operated during the transmission of the digit 0 to the ticketer 700. However, if the calling station is provided with a special dial of the type previously noted, then the party line relay R420 will operate and restore one or more times in accordance with the arrangement illustrated in Fig. 17 and will control the station identifying register 301 to indicate the particular station on the party line that is making the call. The special calling device, when actuated in accordance with the digit 0, and, as a matter of fact, in accordance with any of the digits 2 to 9 and 0, will transmit a corresponding number of regular loop impulses to control the line relay R430 and during the transmission of at least the last two impulses of the digit, the special dial will transmit 1, 2 or 3 short ground impulses to control the party line relay R420.

In the present example, it was assumed that the call was originated by the subscriber at station 3 whose directory number is 4774. The special dial at this station is arranged to transmit three spaced-apart short ground impulses as is indicated in Fig. 17. The above description regarding the operation of the line relay R430 in response to the ten loop impulses applies at the present time so that the 0 digit is registered in the 0 register 660. However, just prior to the transmission of the next to the last loop impulse by the impulsing springs **113*c*, the cam 113*b* will close the cam springs 113*a* in order simultaneously to apply ground potential to the line conductors C416 and C417. The ground potential applied in this manner to the conductor C116 is extended over the previously traced circuits to the − conductor C414 in the ticketer 700 and then to the winding of the local line relay R430. This ground potential retains the local line relay R430 in its operated position. The ground potential applied to the + conductor C117 is extended over the previously traced circuit to the + conductor C415 in the ticketer 700 and then to the winding of the polarized party line relay R420, the resistance lamp L437 and the − terminal of the 50 volt exchange battery 435, to ground. At this time the current flow through the winding of the polarized relay is reversed from the direction of the current normally flowing through the relay at the time the loop circuit is closed. Consequently, the relay R420 momentarily operates in response to the first ground pulse. At its contacts 421, a momentary circuit is completed for operating the relay R310 in the station identifying register 301. The circuit for operating the relay R310 may be traced from ground at contacts 465 and then by way of the contacts 432, 421 and 312 and the winding of the relay R310, to battery. The relay R310 operates and at its X contacts 313** completes a locking circuit for itself to ground at contacts 465 before its initial operating circuit is interrupted at the contacts 312. At the end of the first ground pulse transmitted by the cam 113*b*, the party line relay R420 restores to normal.

Immediately thereafter, the impulsing springs 113*c* are opened in order to transmit the next to the last loop impulse over the line conductors C116 and C117 to the ticketer 700. At this time the current flow through the party line relay R420 is in such a direction that the relay remains in its restored position. The line relay R420, however, restores to normal and, at its contacts 431, now applies the ground potential at contacts 465 by way of the contacts 311 and 322 and the winding of the relay R320, to battery. This relay now operates and locks itself to the ground at contacts 465 over a circuit including its X contacts 323. At the end of the next to the last loop impulse, the relay R430 remains in its operated position and shortly thereafter, the next ground impulse is transmitted by the cam 113*b*. The party line relay R420 operates a second time and now completes, at its contacts 421, a circuit including contacts 321 of the now operated relay R320 and contacts 332 for operating the relay R330. This relay, at its X contacts 333, also locks itself to ground at contacts 465. The last loop impulse is now transmitted by the impulsing springs 113*c*, whereupon, the local line relay R430 momentarily restores to normal and completes a circuit including its contacts 431, contacts 331 of the operated relay R330 and contacts 342 in order to operate the relay R340. This relay also closes its X contact 333 in order to lock itself in its operated position. After the transmission of the last loop impulse, as noted above, the cam 113*b* transmits the third ground impulse to the ticketer 700, whereupon, the party line relay R420 completes, at its contacts 421, a circuit for operating the relay R350 which also locks itself in its operated position.

Since the special dial at the station 3 on the calling party line is arranged to transmit three short ground impulses separated by two loop impulses as is graphically illustrated in Fig. 17, the five relays R310 to R350, inclusive, are sequentially operated in the manner noted above. With all of the relays in their operated positions, a circuit is completed at the contacts 353 for applying ground potential to only the conductor PTY. 3 to indicate to the detector 1900 that the party 3 on a calling party line has made the call. By referring to Fig. 17 it will be seen that if the station 5 originated the call, the cam 115*b* thereat would transmit a single short ground impulse after the last impulse of the digit 0 thereby to operate the relay R310 of the station identifying register 301. With only the relay R310 operated, a circuit is completed at the contacts 314 for marking only the conductor PTY. 5 to indicate to the detector 1900 that the calling station is the fifth station on a party line.

By referring to Fig. 17 it will be seen that if the station 1 originated the call, the cam 111*b* thereat would transmit a single short ground pulse just prior to the transmission of the last loop impulse. The relay R310 will operate in response to the short ground impulse and the relay R320 will operate in response to the last loop impulse. With the relays R310 and R320 in the station identifying register 301 in their operated positions, only the conductor PTY. 1 is grounded to indicate to the detector 1900 that the calling station is the first station on the party line.

By referring to Fig. 17 it will also be seen that if the station 4 is the calling station on a party line, the cam 114*b* thereat will transmit one short ground impulse prior to the transmission of the last loop impulse and it will transmit a second short ground impulse after the transmission of the last loop impulse. Accordingly, the relay R310 will operate in response to the first short ground impulse, the relay R320 will operate in response to the last loop impulse and the relay R330 will operate in response to the second short ground impulse. Thus, the relays R310, R320 and R330 in the station identifying register 301 will be in their operated positions and only the conductor PTY. 4 will be grounded to indicate to the detector 1900 that the fourth station on a party line is calling.

Referring again to Fig. 17 it will be seen that if the station 2 on the party line is calling, the cam 112*b* thereat will transmit a first short ground impulse just prior to the transmission of the next to the last loop impulse and a second short ground impulse will be transmitted between the transmission of the next to the last and the last loop impulse. Thus, the relay R310 will operate in response to the first short ground impulse, the relay R320 will operate in response to the next to the last loop impulse, the relay R330 will operate in response to the second short ground impulse and the relay R340 will operate in response to the last loop impulse. With the relays R310 to R340, inclusive, in the station identifying register 301 in their operated positions, ground potential will be applied only to the conductor PTY.2 to indicate to the detector 1900 that the second station on a party line is calling.

From the above description it is apparent that during the dialing of the digit 0 to the ticketer 700, the line relay R430 will restore and reoperate ten times to register the digit 0 in the 0 register 660 and it will also cooperate with the party line relay R420 to register the number of the particular calling station on a calling party line in the station identifying register 301.

*The detector 1900*

In the above description of the operation of the ticketer 700 it was pointed out that incident to the registration of the digit 0 in the 0 register 660 the 0 dialed relay R640 operated and completed a circuit for operating the detector start relay R220. The operation of the detector start relay R220 controls the finder 125 associated with the detector 1900 so that it will search for and find the particular calling ticketer, such as the calling ticketer 700, being used in extending the present call. The detector 1900 and the finder 125 portion thereof have been schematically illustrated and the conductors connected to the detector 1900 and the finder 125 have been designated, for the most part, with the same designations that appear in the drawings of the detector 1900 illustrated in the John E. Ostline application Serial No. 79,677, filed March 4, 1949. The present detector 1900 is the same as the detector 1900 shown in the above Ostline application and the various conductors are identified by the same designations in order to correlate the operation of the present detector with the detector 1900 of the Ostline application. It will be understood from the following description that upon seizure, the schematically illustrated detector 1900 will associate itself with the calling ticketer 700, it will identify the four digits of the directory number of the calling subscriber station on a terminal-per-station basis, and it will store the identified number in the code storage relays WXYZ19 to WXYZ22, inclusive, in the ticketer 700.

As previously noted, the ticketer 700 is provided with a station identifying register 301 which includes five relays, one or more of which is controlled by the calling device at the calling station for the purpose of marking the conductors PTY.1 to PTY.5 in accordance with the position of the particular calling station on a party line. When the ticketer 700 is associated with the detector 1900 by the operation of the multi-contact connect relay R130, the conductors PTY.1 to PTY.5, inclusive, are connected respectively to the conductors C1909″, C1907, C1908, C1909 and C1909′. The remaining conductor PTY.0 is normally marked with the ground potential if all of the relays in the station identifying register 301 remain in their restored positions. This conductor is connected, incident to the operation of the detector connect relay R130, to the conductor C1906 in order to indicate to the detector 1900 that the calling station is on an individual line. The conductors C1906 to C1909″, inclusive, are connected to certain party relays provided in the detector 1900 of the last-mentioned Ostline application and illustrated in Fig. 5 thereof, in order to control the detector to search for the identity of the particular calling station on a calling line in the manner described in said Ostline application.

Since the present system is arranged for five subscriber stations 1 to 5, inclusive, on a party line, five party relays are provided in the detector 1900 so that the detector will search for the calling line in one of five groups of subscriber lines. When the detector 1900 finds the calling line and identifies the same, the detector will mark the four WXYZ22 conductors in the cable C1930 in accordance with the thousands digit of a calling station number; it will mark the four WXYZ21 conductors in the cable C1933 in accordance with the hundreds digit; it will mark the four WXYZ20 conductors in the cable C1932 in accordance with the tens digit; and it will mark the four WXYZ19 conductors in the cable C1934 in accordance with the units digit. Depending upon the marking of these conductors, the corresponding WXYZ relays in the code storage register 302 will be operated to register the digits of the calling station number in code form.

The code employed is generally referred to as a WXYZ code and is of the type in which any digit from 1 to 9, inclusive, and 0 may be registered by operating any one or any two of four WXYZ register relays or by marking any one or any two of four WXYZ code marking conductors in accordance with the following code:

| Digit: | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

As soon as the detector start relay R220 operates as noted above it completes, at its contacts 221, a circuit for grounding the start conductor C1903 extending to the detector 1900. Also, at its contacts 222, it removes a busy marking ground potential from the guard conductor C1902′ in order to indicate to the detector 1900 that the ticketer 700 is the calling ticketer.

It should be understood that the ticketer 700 is one of a plurality of ticketers, each of which may be individually associated with the detector 1900. The detector 1900 in turn is common to all of the ticketers in the central exchange B. Consequently, when the detector start relay R220 operates and applies ground potential to the start conductor C1903, the finder 125 in the detector is controlled to search for the ticketer 700 which is now marked as the calling ticketer by the removal of the busy marking ground potential from the guard conductor C1902′. Accordingly, the rotary magnet M124 of the finder 125 automatically advances its wipers 126 and 127 over the associated bank contacts until the wiper 126 engages the ungrounded guard conductor C1902′. Simultaneously therewith, ground potential at the contacts 128 is connected by way of the wiper 127, hold conductor C1902 and contacts 142 and 152 in order to operate the detector test relay R210.

When the detector test relay R210 operates it completes, at its contacts 212, an obvious circuit for operating the detector connect relay R130, whereby, various conductors of the detector 1900, which are common to all of the ticketers, are individually connected to the ticketer 700. Also, at its contacts 213, the relay R210 interrupts a circuit for the detector start relay R220 which now restores to normal and removes the ground potential from the start conductor C1903. Also, the relay R220 upon restoring reapplies the busy marking ground potential to the guard conductor C1902′. However, since the operation of the detector 1900 has been started it continues its operation until it has identified the number of the calling subscriber line. As a further result of the operation of relay R210, at its contacts 211, it connects the winding of the detector signal relay R160 to a circuit including the SB conductor C1901. The latter relay, however, will not be operated by the detector 1900 until the detector has been controlled over one of the party conductors (PTY.) in the cable C360 to register the position of the particular calling station on a party line or to register the fact that the calling station is on an individual line.

In the above description of the operation of the station identifying register 301, it was pointed out that the relays in this register are operated in certain combinations in accordance with ground and loop impulses transmitted by the special calling device provided at the different stations on a party line and that all of the relays in the register 301 remain in their unoperated positions if the calling station is connected to an individual line. Accordingly, one of the party conductors (PTY.) in the cable C360 is marked with a ground potential in accordance with the position of the particular calling station on a subscriber line. When the detector connect relay R130 is operated, it connects the various party conductors in the cable C360 to the conductor C1906 to C1909, inclusive, C1909′ and C1909″, and depending upon the position of the calling station on the calling line one of the conductors is grounded. The ground potential applied to any one of the above noted conductors selectively indicates to the detector 1900 the group of lines in which the detector must search to find and identify the four digits of the directory number of the calling station. As soon as the party marking is registered in the detector, it applies a ground potential to the SB conductor C1901 in order to operate the detection signal relay R160.

The detection signal relay R160 in its normal position supplies the holding ground potential to the C conductor C416 so that the first selector 122, the line finder 121 and the line circuit 120 are held in their operated position and also to apply the busy marking ground potential to the bank contacts of the connectors having access to the calling subscriber line. However, as soon as the detection signal relay R160 operates, it removes the direct ground potential, at its contacts 162, and, at its contacts 161, it applies positive 70 volt booster battery to the C conductor C416. More specifically, the positive terminal of the 70 volt booster battery 144 is now connected by way of the resistor 153, contacts 161 and 252, C conductor C416 in the cable C123 to the first selector 122 in order to hold the last mentioned mechanism in its operated position; it is further extended to the line finder 122 in order to hold this switch in its operated position; it is further extended to the line finder 122 in order to hold this switch in its operated position; it is further extended to the line circuit 120 to hold the cut-off relay (not shown) in its operated position; and it is further extended to the C conductor in the bank contacts of the various connectors in the exchange having access to the calling line. The positive 70 volt booster battery maintains the busy marking condition on the line circuit 120. Furthermore, the positive 70 volt booster battery potential is extended over an S lead, which is individual to the particular calling subscriber station, to the detector 1900. In response to the booster battery potential thus applied to the S lead, the detector 1900 operates in the manner described in the Ostline Patent No. 2,639,330, to register therein the thousands, hundreds, tens and units digit of the numerical portion of the directory number of the particular calling subscriber station.

When the detector has determined the digital value of the thousands digit of the calling subscriber number, the four WXYZ22 code marking conductors in the cable C1930 will be marked in code form in accordance with the identified digit and the digit will be registered in the WXYZ22 register relays in the code storage register 302 of the ticketer 700. The hundreds, tens and units digit of the calling station directory number, as determined by the detector 1900, will also be transferred to and registered in the respective WXYZ21, WXYZ20 and WXYZ19 relays in the code storage register 302 in the same manner as noted above.

At the conclusion of the operation of the detector, the four digits identifying the calling subscriber directory number will be registered in the code storage register 302 and the operated ones of the register relays will be locked in their operated positions to the grounded conductor C356. As soon as the above noted operations have been completed by the detector 1900 it connects ground potential to the EB conductor C1904 in order to operate the detection complete relay R150. This relay upon operating locks itself over a circuit including its lower winding and its contacts 151 to the grounded locking conductor C486. Furthermore, the relay R150, at its contacts 152, interrupts the circuit for the detector test relay R210. The latter relay now restores to normal and interrupts, at its contacts 212, the circuit for the detector connect relay R130. The latter relay now restores to normal and disconnects the ticketer 700 from the common detector 1900. At its contacts 211, the relay R210 interrupts a point in the circuit for the detection signal relay R160. This relay also restores to normal and, at its contacts 161 and 162, removes the positive 70 volt booster battery 144 from the C conductor C416 and reapplies the direct ground potential to this conductor. Finally, at its contacts 213, the relay R210, upon restoring, prepares a point in the initial operating circuit for the detector start relay R220. However, the relay R220 cannot reoperate due to the fact that the detection complete relay R150 is locked in its operated position and, at its contacts 154, it prevents relay R220 from reoperating.

In the present description it is assumed that the call originated at station 3 on the party line having the directory number 4774. Consequently, the detector 1900 in identifying the number of the calling line registered the digits 4774 in the WXYZ22, WXYZ21, WXYZ20 and WXYZ19 relays in the code storage register 302. After these digits have been registered in the code storage register 302 and the detection complete relay R150 has been operated as previously noted, the detector 1900 is rendered available for use by any other ticketer, in the central exchange B.

Before leaving the description of the operation of the portion of the ticketer 700 which is associated with the detector 1900, it should be noted that the incomplete conductor C1905 interconnecting the detector 1900 and the winding of the detector failure relay R140 is grounded whenever the detector 1900 fails to identify the directory number of a calling subscriber station. The failure of the detector 1900 to detect a calling subscriber number is described in detail in the previously mentioned Ostline application, Serial No. 79,677. For the purpose of briefly describing the detector failure condition, it will be assumed that the detector 1900 failed to identify the calling line and, as a result thereof, it applied ground potential to the incomplete conductor C1905 in order to operate the detector failure relay R140. It should be noted, however, that the detector failure condition is transmitted by the detector 1900 to operate the relay R140 prior to the release of the detector connect relay R130. As soon as the relay R140 operates, it locks itself over a circuit including its lower winding and its contacts 141 to the hold key K145. As a further result of the operation of the detector failure relay R140, it completes, at its contacts 143, an obvious circuit for illuminating the detection failure alarm signal lamp L146 thereby to indicate to the exchange attendant that the identity of the calling subscriber was not found by the detector 1900. The ticketer 700 is actually locked in a detector failure condition until the exchange attendant momentarily operates the hold key K145 to interrupt the locking circuit for the relay R140. As a further result of the operation of relay R140, at its contacts 142, it interrupts a point in the circuit for the detector test relay R210 which restores to normal. At its contacts 147, the relay R140 interrupts a point in the circuit for the detector start relay R220 thereby to prevent the latter relay from reoperating incident to the restoration of relay R210.

In the present system it is contemplated that the calling subscriber will be able to complete his connection to the desired called destination even though the detector has failed to identify and register the directory number of the calling station in the code storage register 302. However, if desired, the detector failure relay R140 upon operating could be arranged so that it would transmit, for example, a busy tone signal to the calling subscriber and also to block the ticketer 700 to prevent it from repeating subsequent dialed digits to the switching apparatus in the remote exchange C.

*Registering the digits of the desired called subscriber directory number in the ticketer 700*

In the description thus far, the calling subscriber at station 3 on the party line in the central exchange B has dialed the two digits 90. The first digit 9 operated the first selector 122 to select the ticketer 700 and the second digit 0 was registered in the 0 register 660. Incident to the dialing of the digit 0 the number of the calling station on the party line was registered in the station identifying register 301 and the detector 1900 upon detecting the directory number of the calling station registered the digits 4774 in the code storage register 302 of the ticketer 700. During the time that the detector 1900 is detecting the calling station directory number, the calling subscriber may continue to dial the remaining digits of the called number. It will be recalled that immediately after the digit 0 is registered in the 0 register 660, the 0 dialed relay R640 operated and, at its contacts 647, interrupted the circuit for the line cut-in relay R450. Thus, during the interdigital pause following the transmission of the digit 0 the relay R450 restores to normal and, at its contacts 452 and 454, connects the calling subscriber loop circuit to the line relay R440. At its contacts 453 and 455, the relay R450 disconnects the calling subscriber loop from the circuit of the local line relay R430 and the party line relay R420. At this time the upper winding of the line relay R440 is connected by way of the contacts 452, upper winding of the repeating coil 490 and contacts 461 to the — conductor C414 and the lower winding of the line relay R440 is connected by way of the contact 454 and the lower left-hand winding of the repeating coil 490 to the + conductor C415. Accordingly, the line relay, R440 immediately operates over the loop circuit from the calling subscriber line and, at its contacts 443, completes an obvious circuit for operating the hold relay R410. The latter relay, at its contacts 413, retains the control relay R250 in its operated position. As a further result of the operation of relay R410, at its contacts 411, it applies ground potential to the hold conductor C495 extending to the rotary switch 816 in Fig. 8 in order to block the ticketer 700 to incoming calls from the distant exchange C.

As a further result of the operation of the line relay R440, at its contacts 441, it now completes a loop circuit for controlling the trunk selector 801, whereby, the latter selector is seized and conditioned to respond to the next series of impulses transmitted to the ticketer 700. The circuit for controlling the trunk selector 801 includes the — conductor C491 and the + conductor C492 which are directly connected to the trunk selector 801 and are included in the circuit for operating a line relay (not shown) therein in a conventional manner. In the ticketer 700 the — conductor C491 is connected by way of the upper right-hand winding of the repeating coil 490, upper winding of the polarized answer relay R270, resistor 272, contacts 441 and 472, lower right-hand winding of the repeating coil 490 and the + conductor C492. Consequently, the line relay (not shown) in the trunk selector 801 is operated in series with the upper winding of the answer relay R270. However, the direction of current flow through the upper winding of the answer relay R270 is in such a direction that the relay does not operate at this time. Operation of the line relay in the trunk selector 801 conditions the selector to respond each time the loop circuit is subsequently interrupted by the contacts 441.

When the party line relay R420 and the local line relay R430 are disconnected from the loop circuit including the calling subscriber line, as noted above, the local line relay R430 restores to normal. At its contacts 434, the relay R430 opens a point in the initial operating circuit for the relay R250 but this relay is now locked operated to ground at contacts 413. As a further result of the restoration of relay R430, at its contacts 431, it reconnects ground potential to the previously described circuit for controlling the relays in the station identifying register 301. If one or more of the relays in the register 301 should now operate in response to the ground pulse at the contacts 431, it is of no consequence because the station identification previously registered by the relays of the register 301 has been utilized to control the detector 1900 as previously described.

The next digit dialed by the calling subscriber is the digit 6 identifying the called exchange C. In response to the dialing of the digit 6 by the calling subscriber at station 4774, the line relay R440 restores and reoperates six times. The first time the line relay R440 restores to normal, it completes a circuit including the contacts 442, 456, 412 and 474 for reoperating the pulse control relay R485 and, as soon as the relay R485 operates and closes its contacts 487, for completing a branch circuit including the contacts 487 and 642, wiper 503 of the receive sequence switch 501, engaged home contact in the associated contact bank and the magnet (not shown) of the called office digit register 540. The called office digit register 540 is exactly the same as the register 510 which is shown in detail. The magnet in the called office digit register 540 operates and it then restores, as soon as the line relay R440 reoperates at the end of the first impulse, in order to advance its wipers one step in a clockwise direction. In response to the six impulses of the digit 6 transmitted to the line relay R440, the contacts 442 are closed and opened six times in order to transmit six pulses to the magnet of the called office digit register 540 thereby to register the digit 6 therein.

As a further result of the control of the line relay R440 in response to the digit 6, the contacts 441 are opened and closed six times in order to repeat the impulses of the digit 6 to the trunk selector 801. Thus, the wipers of the selector 801 are raised step-by-step in a vertical direction to the sixth level and the wipers are then automatically rotated over this level to search for and to select an idle trunk repeater, such as the trunk repeater 810, terminating an idle toll line extending to the remote exchange C.

During the impulsing period of the line relay R440, the contacts 443 thereof are interrupted but due to the slow-to-release characteristics of the relay R410, the latter relay remains in its operated position.

As pointed out above the pulse control relay R485 operates as soon as the line relay R440 restores in response to the first impulse of the digit 6 and the relay remains in its operated position until after the last impulse of the digit 6 has been registered in the called office digit register 540. At the contacts 489, the relay R485 completes a circuit for operating the relay R590 and it also completes a circuit, including the contacts 648, for operating the magnet M505 of the receive sequence switch 501. At the end of the dialing of the digit 6, and during the interdigital pause, the slow-to-release pulse control relay R485 restores to normal and interrupts, at its contacts 489, the above mentioned circuit for the magnet M505. The magnet now restores to normal and advances its wipers 502 to 504, inclusive, one step in a counterclockwise direction into engagement with the contacts 1. Also, at the contacts 489 the relay R485 interrupts the circuit for the relay R590. Thus, at the end of the registration of the digit 6 in the called office digit register 540, the receive sequence switch 501 is advanced one step in order to connect the pulsing circuit including the wiper 503 to the thousands digit called number register 550. The ticketer 700 is now in condition to register the first numerical digit of the called subscriber number in the digit register 550 and also to repeat this digit by way of the trunk selector 801 and the trunk repeater 810 over the toll line TL811 to the switching apparatus provided in the exchange C.

Since it has been assumed that the present call is to be extended to the called subscriber in exchange C whose directory number is 253, the calling subscriber now dials the digit 2. The impulses of the digit 2 dialed by the calling subscriber controls the line relay R440 in the ticketer 700 in the above described manner. At the contacts 441, the relay R440 repeats the two impulses of the digit 2 over the established connection including the trunk selector 801, the trunk repeater 810 and the toll line TL811 to the switching apparatus in the exchange C. Also, at the contacts 442, the line relay R440 transmits two impulses over a circuit including the contacts 456, 412 and 474 to the pulse control relay R485. This relay immediately operates upon the first restoration of the relay R410 so that the two pulses of the digit 2 are also transmitted by way of the contacts 487 and 642, wiper 503 in engagement with the contact 1 to the thousands digit called number register 550. The digit register 550 is exactly the same as the illustrated digit register 510 and, consequently, registers the hundreds digit 2 of the called number 253 and marks the WXYZ15 conductors in the cable C559 in accordance with the digit 2.

At the end of the transmission of the digit 2 of the called subscriber directory number, the line relay R440 remains in its operated position during the interdigital pause and the slow-to-release pulse control relay R485 restores to normal. At its contacts 489, the relay R485 again interrupts the circuit for the magnet M505 thereby to advance the wipers 502 to 504, inclusive, of the receive sequence switch 501, an additional step in a counterclockwise direction into engagement with the contacts 2.

The next digit 5 of the called number 253 dialed by the calling subscriber controls the line relay R440 in the same manner whereby the five impulses of the digit 5 are repeated by the contacts 441, over the previously described path, including the toll line TL811 to the switching apparatus in the exchange C. Also, at the contacts 442, the relay R440 transmits the five impulses to the pulse control relay R485 and in multiple therewith, to the wiper 503 of the sequence switch 501 in engagement with the contact 2. Thus, the tens digit 5 of the called number 253 is now registered in the hundreds digit called number register 560. This register, marks the WXYZ14 conductors in the cable C569 in accordance with the second digit 5 of the called number. During the interdigital pause following the dialing of the digit 5, the line relay R440 remains in its operated position, the pulse control relay R485 restores to normal and the latter relay, at its contacts 489, now causes the magnet M505 to advance its wipers 502 to 504, inclusive, an additional step in a counter-clockwise direction into engagement with the contacts 3.

The calling subscriber now dials the final digit 3 of the called number 253. The impulses of this digit are repeated over the toll line TL811 by the contacts 441 and they are registered, by means of the contacts 442 and the relay R485, in the tens digit called number register 570. This register is the same as the digit register 510, and, consequently, registers the units digit 3 of the called number 253 and marks the WXYZ13 conductors in the cable C579 in accordance with the digit 3.

At the end of the dialing of the last digit 3 of the called number 253, the line relay R440 remains in its operated position, the pulse control relay R485 restores to normal and, at the contacts 489, the relay R485 controls the magnet M505 to advance the wipers 502 to 504, inclusive, an additional step in a counter-clockwise direction into engagement with the contacts 4. Normally, the wiper 503 in engagement with the contact 4 completes the pulsing circuit for registering a digit in the units digit called number register 580. But in the present example, the third or last digit of the called number 253 is registered in the tens digit called number register 570 and no additional digit is required to complete the connection to the called line in the exchange C.

Figure 5:
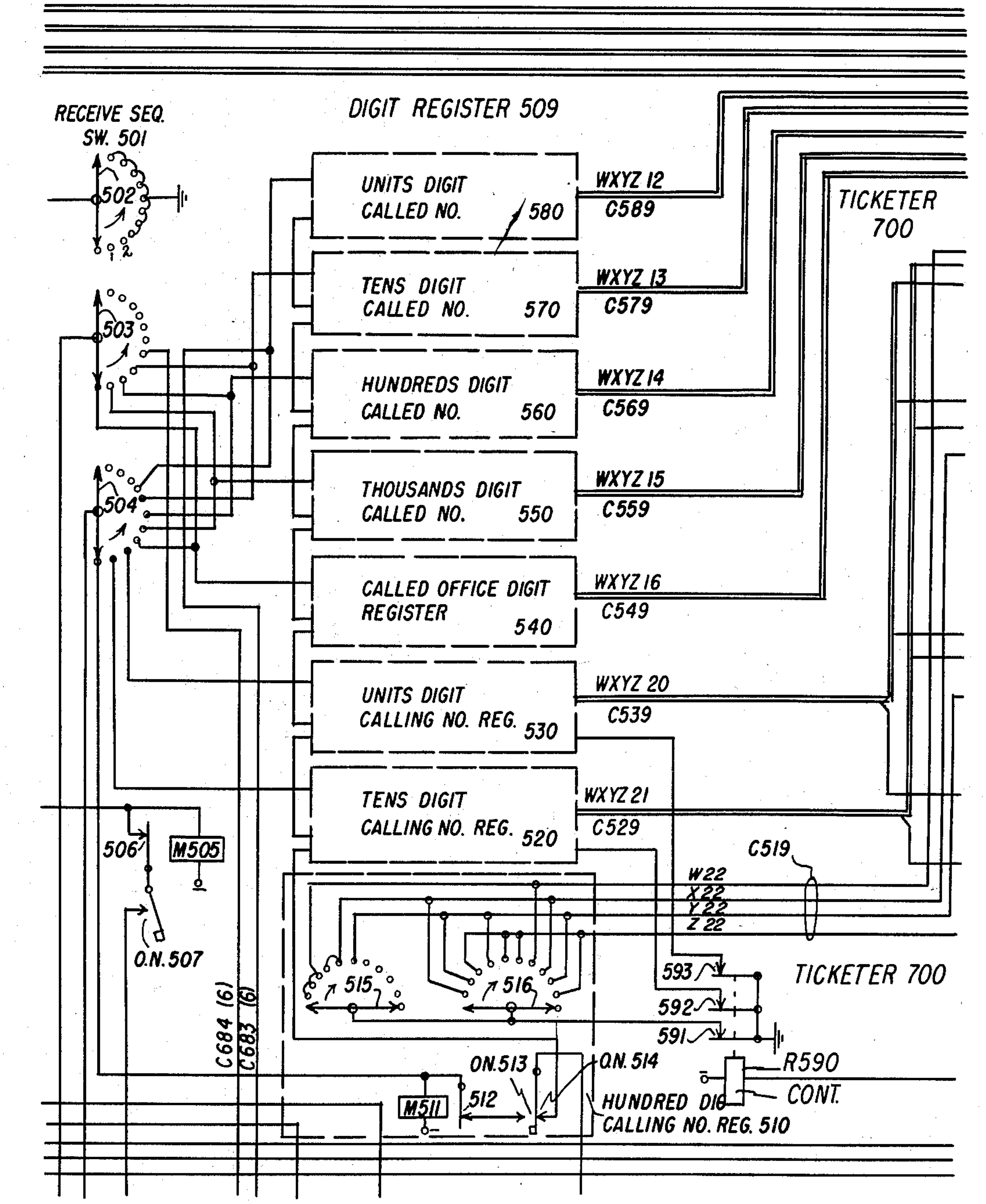
Figure 6:
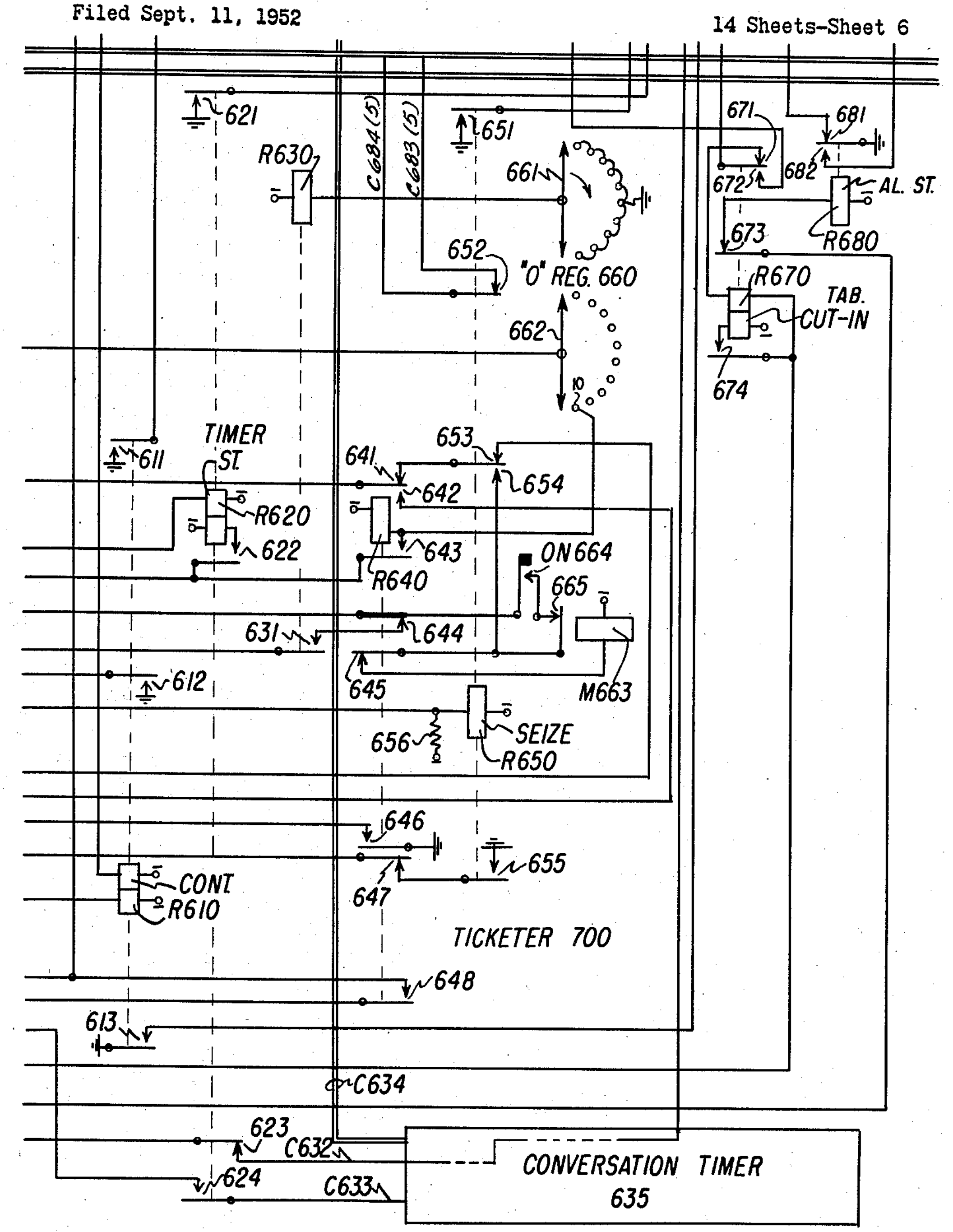
Figure 7:
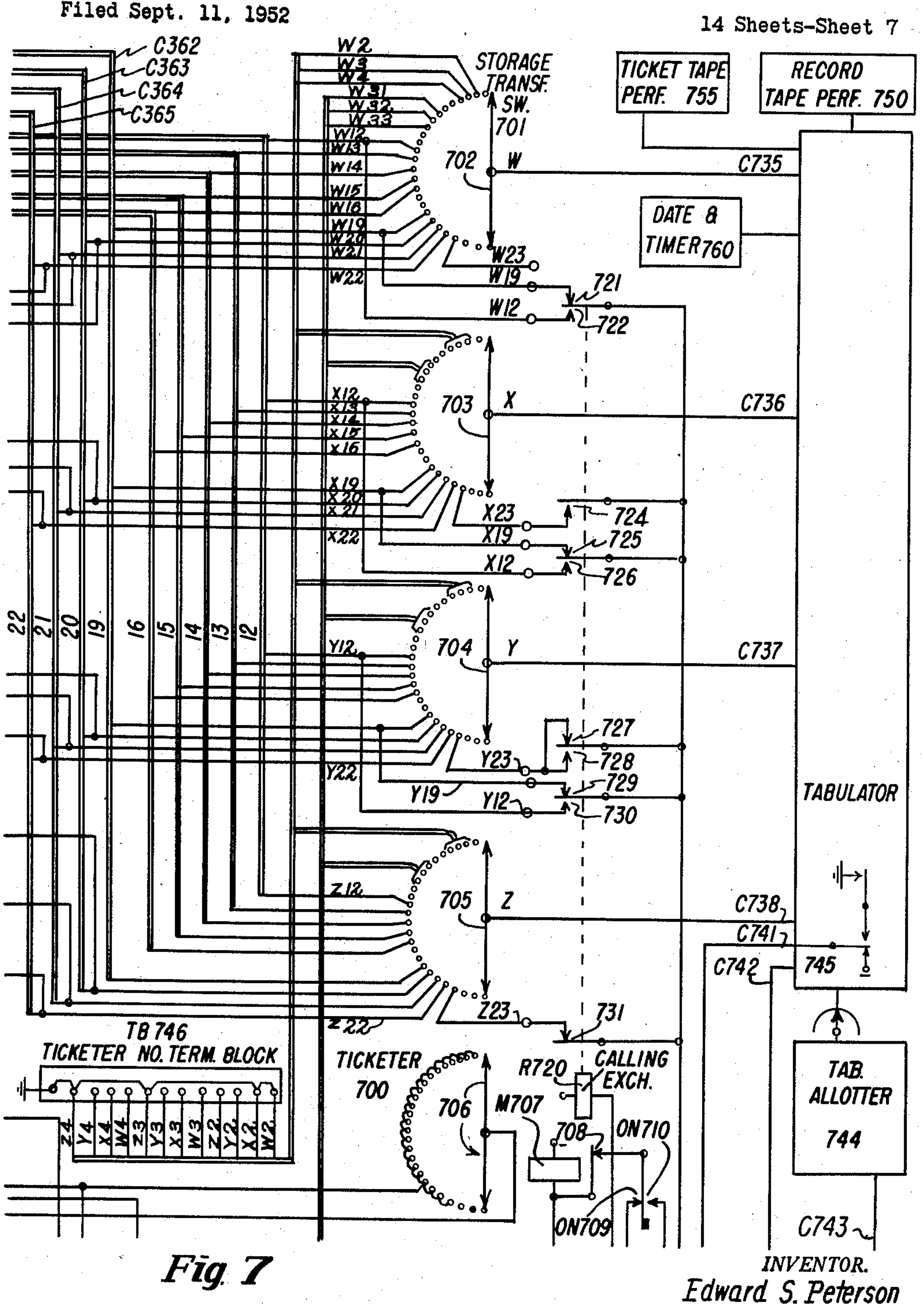

Inasmuch as the present call is being extended from a subscriber in exchange B to a subscriber in exchange C, the seized relay R650 in the ticketer 700 is retained in its operated position and, at its contacts 652, it interrupts a point in the circuit including the conductors C683 and C684, extending to Fig. 5 to disconnect the digit register 580 from the contact 4 engaged by the wiper 503. Accordingly, if the subscriber should inadvertently dial an additional digit, it will not be registered in the register 580.

At the present time, the relays R150, R250, R370, R410, R440, R460, R480, R610, R630, R640, R650 and R720 in the ticketer 700 are in their operated positions. In addition to the foregoing, the code storage register 302 is in an operated condition to register the digits 4774 of the calling number and the registers 540, 550, 560 and 570 are operated to register respectively the called exchange digit 6 of the exchange C and the three digits 253 constituting the directory number of the called subscriber in exchange C. Also, the 0 register 660 is in an operated position to register the first digit 0 transmitted to the ticketer 700 and the station identifying register 301 is operated to identify the station 3 on the calling party line as the calling station.

Figure 9:
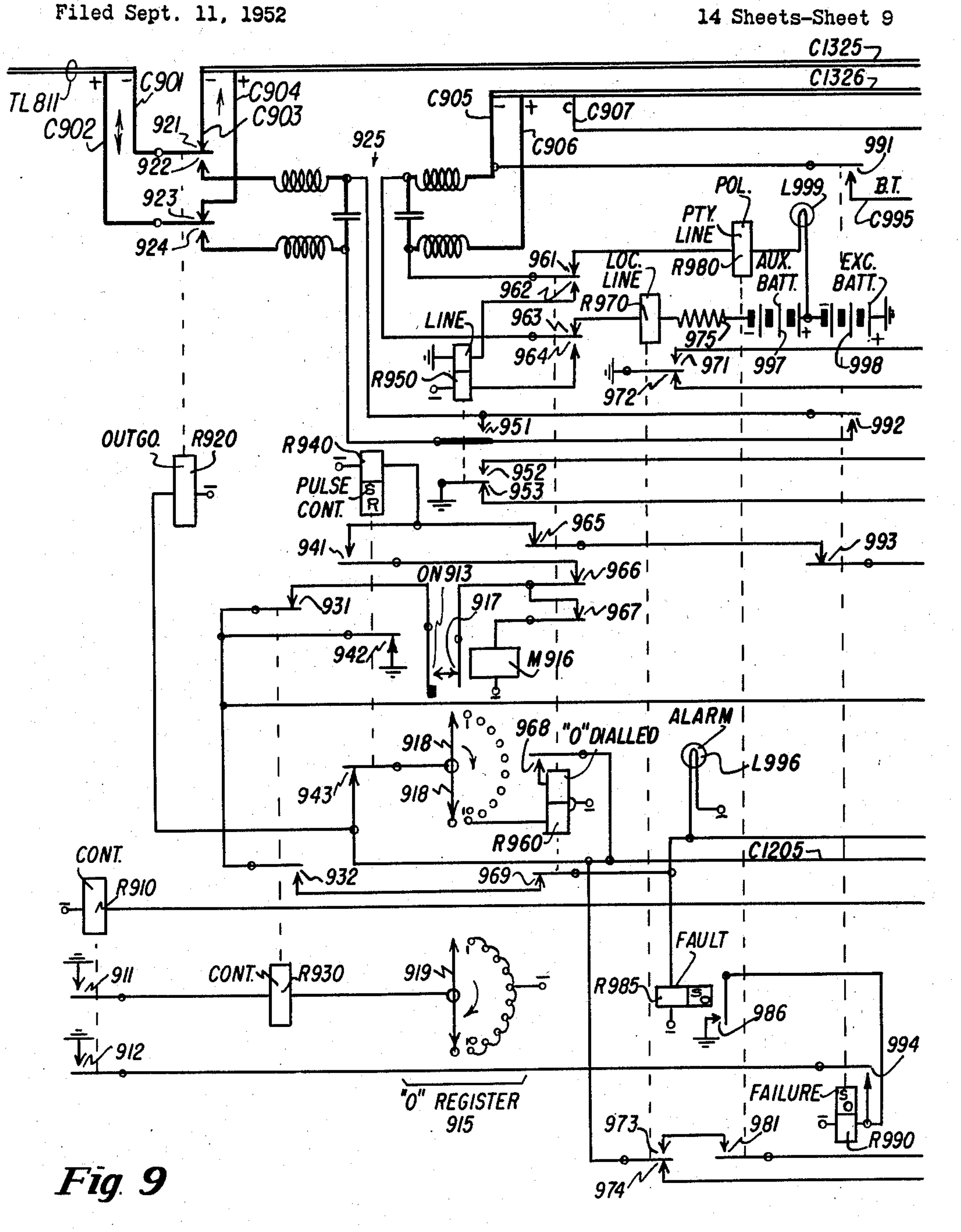
Figure 10:
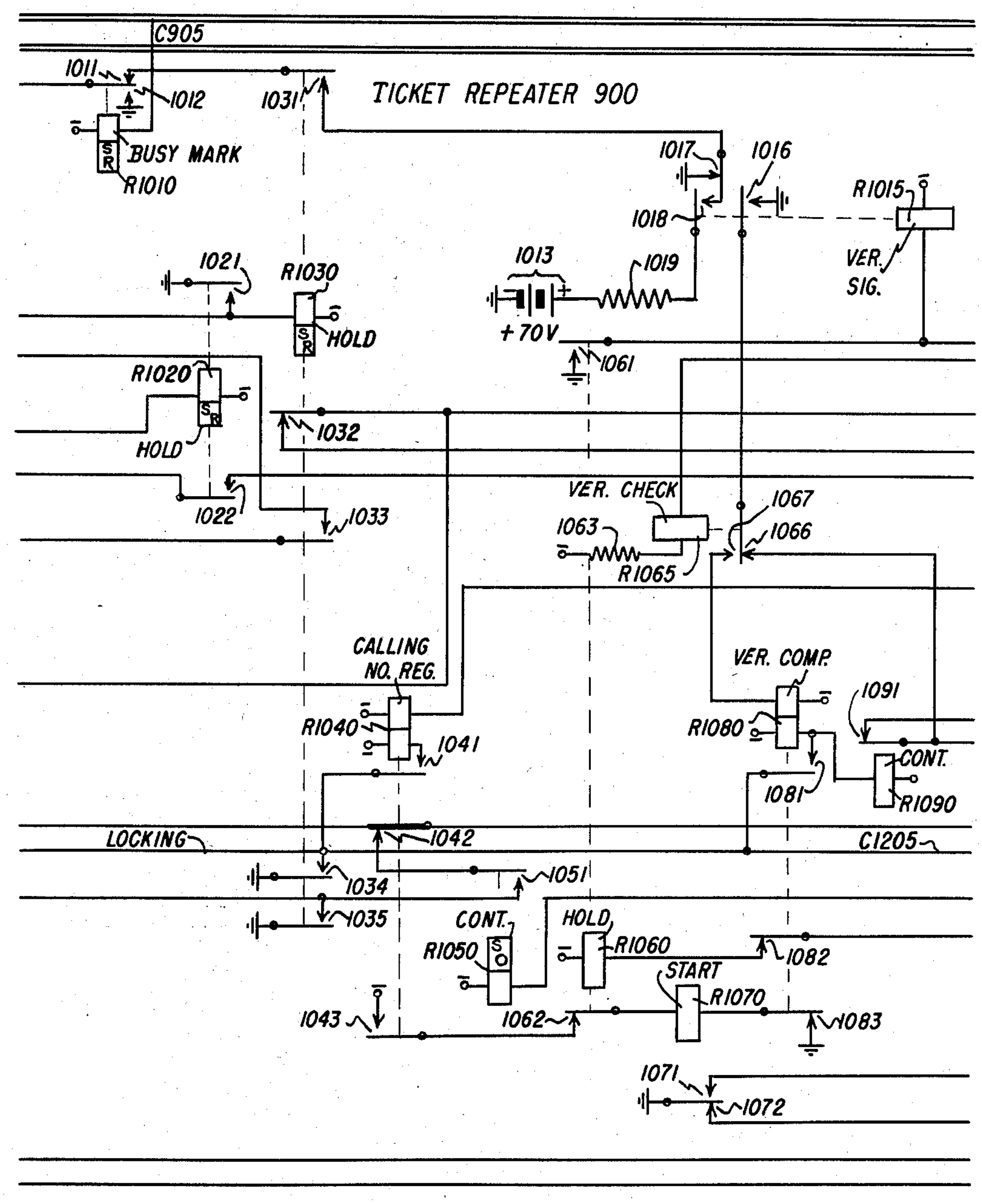
Figure 11:
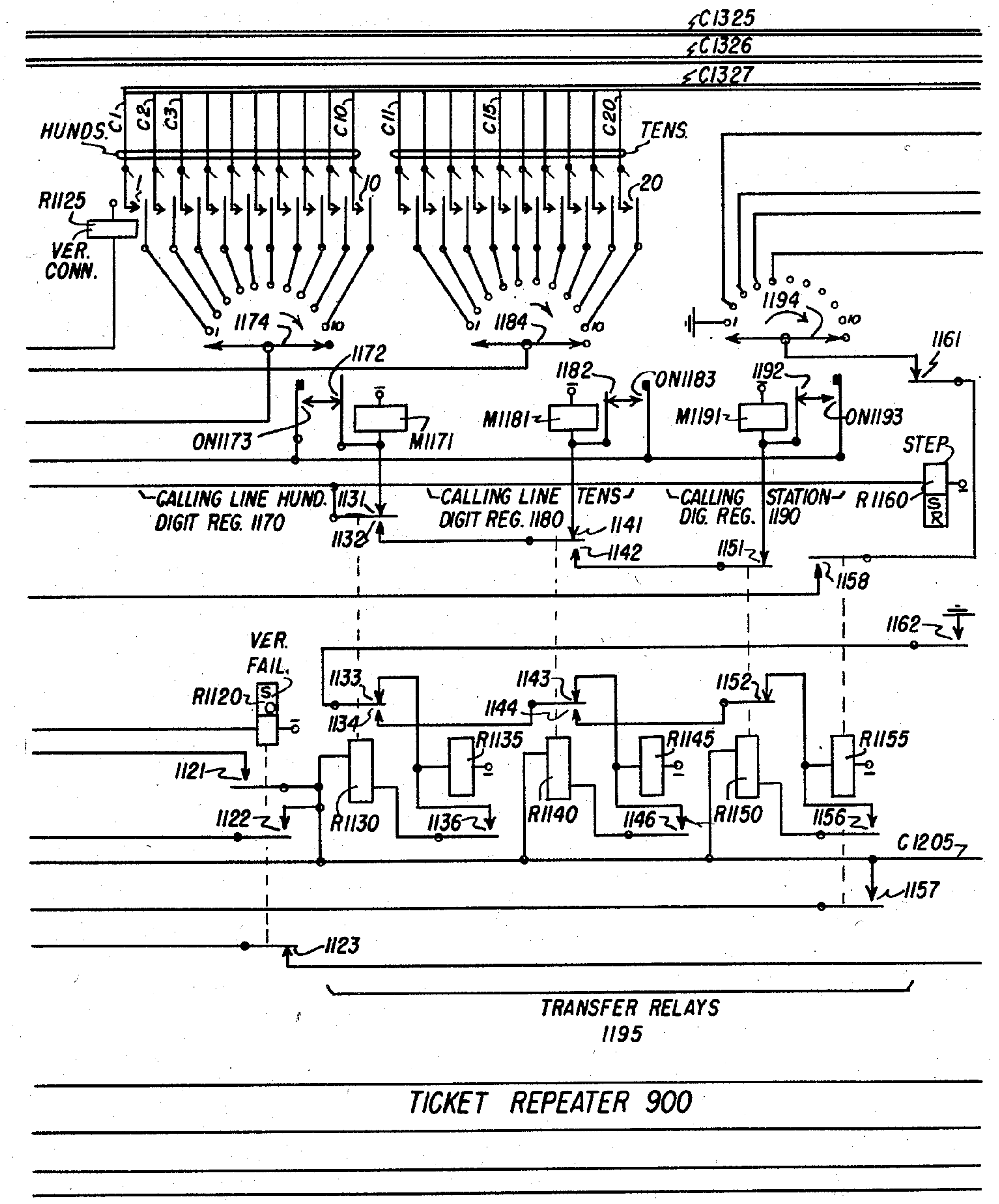

In the previous description of the operation of the system it was pointed out that the first digit repeated by the contacts 441 of the line relay R440 is the digit 6 identifying the called exchange C. The impulses of this digit controls the trunk selector 801 to select an idle trunk repeater, such as the trunk repeater 810. At the time of the selection of the trunk repeater 810, a circuit including the toll line TL811 is completed to the ticket repeater 900 (Fig. 9) in the exchange C. Referring now to Fig. 9 it will be seen that the — and + conductors C901 and C902 constituting the toll line TL811 are connected by way of the contacts 921 and 923 to the — and + conductors C903 and C904 in the cable C1325 extending to the incoming connector 1320 in exchange C. The above mentioned incoming connector 1320 is immediately seized over the above traced circuits as soon as the trunk repeater 810 in exchange B is seized by the trunk selector 801 and it returns ground potential over the conductor C905 in the cable C1325 in order to operate the busy marking relay R1010 in the ticketer 900. The relay R1010, at its contacts 1012, applies ground potential to the C conductor C907 in the cable C1326 in order to mark the ticket repeater 900 busy to connectors, such as 1319 and 1320, having access thereto. When the line relay R440 in the ticketer 900 repeats the impulses corresponding to the three digits 253 of the called number in the manner described above, the impulses of the first digit 2 will raise the wipers of the incoming connector 1320 to the second level; the impulses of the second digit 5 will rotate the wipers into engagement with the contacts 5 in the second level to select the called party line 25 and the impulses of the final digit 3 will control the connector 1320 to transmit ringing current of a particular frequency over the called line to signal only the subscriber station having the directory number 253.

When the called subscriber at substation 253 answers the call, a loop circuit, including the — and + line conductors C1309 and C1310, is completed back to the incoming connector 1320 and controls the connector to terminate the transmission of the ringing current and to cause the incoming connector 1320 to reverse the current flow over the — and + conductors C903 and C904 in the cable C1325. Thus, the current flow is reversed over the circuit path including the toll line TL811, trunk repeater 810, trunk selector 801, — and + conductors C491 and C492 and the upper winding of the polarized answer relay R270. The reversal of the current flow in the upper winding of the relay R270 causes the relay to operate (the lower winding being pre-energized from ground at contacts 465) and thus indicate to the ticketer 700 that the called party has answered the particular call.

At its contacts 271, the relay R270 completes a circuit for operating the timer start relay R620 and the latter relay locks itself in its operated position over a circuit including its lower winding, contacts 622 and the grounded locking conductor C486. The timer start relay R620 is thus operated and locked in its operated position as soon as the call is answered by the desired called party.

As soon as the timer start relay R620 operates it completes, at its contacts 621, a circuit including off-normal contacts ON709 on the storage transfer switch 701, contacts 708 and the winding of the magnet M707, to battery. This magnet now operates and then immediately interrupts its own operating circuit at its contacts 708. The momentary operation and restoration of the magnet M707 causes the wipers 702 to 706, inclusive, of the storage transfer switch 701 to advance one step in a counter-clockwise direction from the normal home contact position (illustrated) into engagement with the contacts 1. As soon as this step is taken by the wipers, the off-normal contacts ON709 are opened and the off-normal contacts ON710 are closed. Thus, the automatic stepping operation of the magnet M707 is interrupted as soon as the wipers are advanced one step.

As a further result of the operation of the timer start relay R620, the contacts 623 thereof are interrupted to open a point in a circuit including the grounded release supervisory relay R240 and it completes, at its contacts 624, a circuit whereby ground time pulses on the conductor C614 are transmitted by way of the contacts 255 and 624 and the conductor C633 to the conversation timer 635. The conversation timer 635 has been schematically illustrated since it is of conventional construction and comprises a first rotary switch that is advanced step-by-step by the ground pulses appearing every five seconds on the conductor C614. At the end of 12 steps or one minute, the first rotary switch controls a second rotary switch to register one minute and the latter rotary switch, as it is advanced at the end of each minute, continues to register the units digits of the number of minutes of conversation. The units digit is marked on on the WXYZ31 code marking conductors in the cable C634 which terminate in the contacts 7 accessible respectively to the wiper 702, 703, 704 and 705 in the storage transfer switch 701. At the end of every ten minutes, the units digit register in the conversation timer controls a tens digit register to register the tens digit of the total elapsed time of the conversation and the last-mentioned register at the end of every ten steps or 100 minutes controls a hundreds digit register. The tens digit register in the conversation timer marks the WXYZ32 code marking conductor in the cable C634 which terminate respectively in the contacts 8 accessible to the wiper 702 to 705, inclusive, and the hundreds digit register marks the WXYZ33 code marking conductors in the cable C634 and which terminate respectively in the contacts 9 accessible to the wiper 702 to 705, inclusive. In this manner, the conversation timer 635 will register the elapsed conversation time and it will mark the WXYZ31, WXYZ32, and WXYZ33 code marking conductors in the cable C634 in accordance with the units, tens and hundreds digits corresponding to the registered elapsed conversation time.

*Release of the connection*

As soon as the conversation between the calling and called subscribers is terminated, the subscribers will replace their receivers on the switchhooks of the associated telephone instruments. In response to the placement of the receiver at the called station 253 in the remote exchange C, the loop circuit, previously described, extending between the called station and the incoming connector 1320 is interrupted and the connector again reverses current flow back over the previously traced circuit path to the polarized answering relay R270 in the ticketer 700. This relay will now restore to normal inasmuch as the current flow through its upper winding is in a direction to cause the relay to restore. At its contacts 271, the relay R270 interrupts circuit for the upper winding of the timer start relay R620 but the latter relay remains in its operated position over the locking circuit including its lower winding and the locking conductor C486. Consequently, the conversation timer 635 will continue to register the conversation time until the calling subscriber has replaced his receiver on the associated switchhook.

When the calling subscriber at station 4774 in exchange B replaces his receiver, the loop circuit including the conductors C116 and C117 is interrupted in a conventional manner and thereby interrupts the circuit for the line relay R440 in the ticketer 700. The relay R440 now restores to normal and completes, at its contacts 442, a circuit for reoperating the pulse control relay R485. The relay R485 in turn, at its contacts 487, attempts to complete a circuit, including the contacts 642 and the wiper 503, for operating the units digit call number register 580. The last-mentioned circuit, however, is interrupted at this time at the contacts 652 on the operated seizure relay R650. Accordingly, the additional pulse transmitted by the contacts 442 of the line relay R440 upon the release of the connection will operate the pulse control relay R485 but the release pulse will not control the units digit call number register 580.

As a further result of the restoration of the relay R440, at its contacts 443, it opens the circuit for the slow-to-release hold relay R410. This relay, as previously noted, remains in its operated position during the pulsing periods of the line relay R440, but since the relay R440 now remains in its restored position the hold relay R410 slowly restores to normal. At its contacts 412, the relay R410 now interrupts the above mentioned circuit for the pulse control relay R485 and the latter relay now slowly restores to normal. As soon as the slow-to-release pulse control relay R485 restores to normal, at its contacts 489, it interrupts the circuit including the contacts 648 and the winding of the magnet M505 so that the magnet now steps the wipers 502 to 504, inclusive, an additional step in the counter-clockwise direction into engagement with the contact 4 in the associated contact bank. It may be well to mention at this time that as long as the wiper 502 of the receive sequence switch 501 engages any one of the contacts 3 to 10, inclusive, an obvious circuit is completed for the relay R370. In the present call the operated condition of the relay R370 is of no importance.

Referring again to the restoration of the hold relay R410, it will be seen that, at its contacts 413, it interrupts a circuit of the slow-to-release control relay R250. As soon as the relay R250 restores it completes, at its contacts 251, a circuit including the wiper 706 (which has been advanced one step from the home contact into engagement with the contact 1) for energizing the upper winding of the operated control relay R610 and, in multiple therewith, for completing an operating circuit for the slow-to-operate release guard relay R230. Consequently, the control relay R610 and the release guard relay R230 will be retained in their operated positions as long as the wiper 706 is grounded and is in engagement with any one of its contacts 1 to 23, inclusive. In other words, the two relays noted will remain in their operated positions during the time the storage transfer switch 701 is utilized in transferring the various items of record information stored in the ticketer 700 to the tabulator 745.

As a further result of the restoration of the control relay R250, at its contacts 252, it disconnects the busy marking and holding ground potential at the contacts 162 from the C conductor C416 in the cable C123 in order to cause the release of the first selector 122, the line finder 121 and the line circuit 120 in a conventional manner. As soon as the line circuit 120 restores to normal, as noted above, the calling party line, including the line conductors C116 and C117, is rendered available to receive a call or to initiate a new call.

In addition to the foregoing, the restoration of the relay R250 removes, at its contacts 253, the busy marking ground potential from the C conductor C497 extending to the rotary switch 816. At this particular instant, the ticketer 700 is marked idle to the first selectors, such as the first selector 122, and to rotary switches, such as the rotary switch 816. However, this idle condition of the ticketer 700 is retained only for a momentary period due to the fact that the slow-to-operate relay R230, upon operating, will artificially mark the ticketer 700 busy to the first selectors and the rotary switches noted above. In this connection it should be noted that the operating circuit for the relay R230 is completed, at contacts 251, incident to the restoration of the control relay R250 and at the same time that the contacts 252 and 253 are opened to remove the busy marking and holding ground potentials from the conductors C497 and C416. As soon as the slow-to-operate release guard relay R230 operates, it replaces ground potential, at its contacts 231, upon the C conductor C416 in order to again mark the ticketer 700 busy to the first selectors. Also, at its contacts 232, the relay R230 reapplies the busy marking ground potential to the C conductor C497 extending to Fig. 8 in order to mark the ticketer 700 busy to the rotary switches including the rotary switch 816.

The restoration of the control relay R250, at its contacts 254, also interrupts the circuit for the hold slave relay R480, whereupon, the latter relay slowly restores to normal and, at its contacts 481, interrupts the energizing circuit for the lower winding of the control relay R610. The relay R610, however, is retained in its operated position over the previously mentioned circuit including its upper winding, wiper 706 and contacts 251.

Finally, at its contacts 255, the control relay R250 disconnects the 5 second time plus conductor C614 from the conversation time 635. Accordingly, it will be understood that as soon as the calling party involved in the connection releases the same, the line relay R430 will control the restoration of the control relay R250 and the latter relay, at its contacts 255, will terminate further operation of the conversation timer 635. The conversation timer 635, however, will now maintain marking potentials on the WXYZ31 to WXYZ33 in the cable C634 to indicate in code form, the units, tens and hundreds digits corresponding to the total elapsed conversation time of the established connection.

*Selecting the tabulator 745 to record the call from exchange B to exchange C*

As pointed out above, the relay R230 retains the busy condition of the ticketer 700 to prevent its seizure for an outgoing call by any of the first selectors, including the selector 122, and for preventing its seizure on an incoming call by one of the rotary switches, including the rotary switch 816. Furthermore, at its contacts 234, the relay R230 completes a circuit including the contacts 673 for operating the allotter start relay R680 and, at its contacts 233, it applies ground potential by way of the upper winding of the tabulator cut-in relay R670 and the contacts 671 to the pulse conductor C741 extending to the tabulator 745 for the purpose to be described hereinafter.

As soon as the allotter start relay R680 operates, it applies ground potential, at the contacts 682, to the start conductor C743 extending to the tabulator allotter 744. This ground potential on the start conductor C474 controls the tabulator allotter 744 so that the latter mechanism searches for an idle tabulator, such as the tabulator 745. When an idle tabulator is found the latter mechanism, by means of a rotary switch (not shown), searches for the ticketer 700 which is marked as the calling ticketer by the removal of ground potential, at the contact 681, from the H conductor C742. When the tabulator 745 finds the ticketer 700, it first applies battery potential to the pulsing conductor C741 thereby to complete a circuit including the contacts 671, the upper winding of the tabulator cut-in relay R670 and ground potential at the contacts 233. The tabulator cut-in relay R670 now operates and, at its X contacts 674, it complete a locking circuit for its lower winding from ground at contacts 233. As a further result of the operation of the tabulator cut-in relay R670, at its contacts 673, it interrupts the circuit for the allotter start relay R680 so that the latter relay restores to normal and, at its contacts 682, removes ground potential from the start conductor C743. As a further result of the restoration of the relay R680, at its contacts 681, it applies ground potential to the H conductor C742 in order to mark the ticketer 700 busy to other tabulators having access thereto and also for the purpose of controlling the tabulator 745 so that it will transmit pulses over the pulsing conductor C741 to the magnet M707.

At the present time the four WXYZ conductors C735 to C738, inclusive, are connected through the rotary switch (not shown) in the tabulator 745 to the wipers of a storage register in the tabulator. The bank contacts of the respective wipers (not shown) in the tabulator are connected to code storage register relays in substantially the same manner as the WXYZ wipers 702 to 705, inclusive, of the storage transfer switch 701 are connected to code storage relays and marking conductors in the ticketer 700.

It may be well to mention at this time that the detailed circuits of the tabulator allotter 744 and the tabulator 745 are shown and described in the previously noted Ostline application Serial No. 75,985, filed February 12, 1949. At the present time the wipers 702 to 706 of the storage transfer switch 701 are in engagement with the contacts 1 in the associated contact banks and are ready to be advanced into engagement with the contacts 2 to mark the four WXYZ conductors C735 to C738 in code form in accordance with the units digit of the three digit number identifying the particular calling ticketer 700. Each ticketer in the central exchange B is identified by a different three digit number. In the tabulator 745 the rotary switch storage register is waiting to advance its wipers one step to select a set of code storage register relays so that the units digit identifying the ticketer 700 may be stored therein. Consequently, the tabulator 745 now transmits a ground pulse over the pulsing conductor C741 by way of the contacts 672 and the winding of the magnet M707, to battery. The magnet M707 now operates and at the end of the pulse the magnet restores to normal and advances the wipers 702 to 706, inclusive, an additional step in a clockwise direction into engagement with the contact 2. Simultaneously therewith, the tabulator 745 transmits a similar pulse to the code register switch therein so that it advances its wipers one step to select the first set of code storage register relays. The contacts 2 engaged by the wipers 702 to 705, inclusive, of the storage transfer switch 701 are connected respectively to the WXYZ2 conductors which terminate in the ticketer number terminal block TB746. In the ticketer 700, the terminal block TB746 is permanently wired so that the WX2 conductors are grounded to indicate the units digit 1; the Z3 conductor of the WXYZ3 conductors is grounded to indicate the tens digit 0; and the Z4 conductor in the group of WXYZ4 code marking conductors is grounded to indicate the hundreds digit 0. Thus, the ticketer 700 is identified as ticketer number 001.

In view of the foregoing, it will be understood that the ground potential on the WX2 conductors marks the W and X conductors C735 and C736 extending to the tabulator 745 and thereby transfer the code marking corresponding to the units digit 1 from the ticketer 700 to the tabulator 745 where this digit is stored in code form in the first set of code storage register relays.

The tabulator 745 now transmits the next pulse over the conductor C741 and causes the magnet M707 to advance its wipers 702 to 706, inclusive, into engagement with the contacts 3 terminating the WXYZ3 code marking conductors. Also, in the tabulator 745 the code register switch is advanced an additional step to select another set of code storage register relays. Since the Z3 conductor is now grounded, the Z conductor C738 extending to the tabulator 745 is marked with a ground potential to register in code form the digit 0 in the second set of code storage register relays in the tabulator 745.

The third pulse transmitted by the tabulator 745 controls the magnet M707 to advance the wipers 702 to 706, inclusive, into engagement with the fourth set of contacts terminating the WXYZ4 code marking conductors. Thus, the hundreds digit 0 is transferred to and stored in the tabulator 745.

The next three pulses transmitted by the tabulator 745 over the pulsing conductor C741 controls the magnet M707 of the storage transfer switch 701 to advance the wipers to the contacts 7 in the associated contact banks. The code storage switch in the tabulator 745 will be advanced three steps in synchronism with the stepping of the switching 701. With the wipers 702 to 705, inclusive, in engagement with the contacts 7, the WXYZ31 code marking conductors in the cable C634 will be selected. These conductors are marked in code form in accordance with the units digit of the total elapsed time of the conversation as registered in the conversation timer 635. The conductors WXYZ32 which terminate in contacts 8 accessible to the wiper 702 to 705, inclusive, are marked in code form, in accordance with the tens digit of the elapsed conversation time registered in the conversation timer 635. The WXYZ33 code marking conductors terminating in the contacts 9 accessible to the wipers 702 to 705, inclusive, are marked in code form in accordance with the hundreds digit of the total conversation time registered in the conversation timer 635. Consequently, as the wipers 702 to 706, inclusive, are advanced step by step over the contacts 7, 8 and 9, the respective units, tens and hundreds digits of the total elapsed conversation time as registered in the conversation timer 635 will be transferred to appropriate code storage register relays in the tabulator and registered therein in the same manner as has been previously described.

After the above transfer has been made, pulses will be transmitted over the conductor C741 to cause the wipers 702 to 706, inclusive, to be advanced from the contact positions 9 into engagement with the contact positions 12. Contact positions 12 accessible to the wiper 702 to 705, inclusive, of the storage transfer switch 701 terminate the WXYZ12 code marking conductors in the cable C589 extending to the units digit called number register 580 and they are multiply connected to the WXY12 conductors terminating in the contacts 722, 726 and 730 of the calling exchange relay R720.

In the present call which has been extended from the calling subscriber at station 4774 in exchange B, to the called subscriber 253 in exchange C, the called number registered in the digit register 509 includes only three digits (253) which are registered respectively in the thousands digit, hundreds digit and tens digit register 550, 560 and 570. Thus, the hundreds, tens and units digit 253 are actually registered in the thousands, hundreds and tens digit registers 550, 560 and 570 and the units digit register 580 is in its normal position with no digit registered therein. It is necessary in the present system to indicate to the tabulator 745 the fact that no digit is registered in the units digit register 580 in order to avoid subsequent speculation as to whether or not the apparatus has failed to transfer to the tabulator a digit that may have been registered in the units digit register 580. A positive registration in the form of a "space" indication is transferred from the ticketer 700 to the tabulator 745 when the number of the called subscriber in exchange C includes three digits instead of four digits. For this purpose the calling exchange relay R720 has been provided in the ticketer 700 and it is operated under control of the seize relay R650 whenever a call originates in the exchange B and is extended to exchange C. At the contacts 722, 726 and 730, the operated calling exchange relay R720 connects ground potential at the contacts 613 of the operated control relay to the WXY12 code marking conductors. Consequently, the corresponding WXY conductors C735, C736 and C737 extending to the tabulator 745 are marked with ground potential in order to register in an associated group of code storage register relays a "space" indication.

Thereafter, the wipers of the storage transfer switch 701 will be advanced step-by-step over the contacts 13, 14 and 15 to successively transfer the units, tens and hundreds digits 3, 5, 2 registered respectively in the tens digit register 570, the hundreds digit register 560 and the thousands digit register 550 and marked on the WXYZ13, WXYZ14 and WXYZ15 code marking conductors in the cables C579, C569 and C559. In this manner the digits of the called number 253 are transferred to and stored in the tabulator 745.

Thereafter, the wipers of the storage transfer switch 701 will be advanced into engagement with the contacts 16 terminating the WXYZ16 code marking conductors in the cable C549. These conductors are marked in code form in accordance with the digit 6 identifying the called exchange C registered in the called office digit register 540.

Thereafter, the tabulator 745 will control the wipers of the storage transfer switch 701 so that they are stepped from the contacts 16 into engagement with the contacts 19. It should be noted that the contacts 19, 20, 21 and 22 of the storage transfer switch 701 terminate respectively the WXYZ19, WXYZ20, WXYZ21 and WXYZ22 code marking conductors in the cables C362 to C365, inclusive. These conductors are connected to the corresponding code storage register relays in the code storage register 302 which have been operating to register respectively the units, tens, hundreds and thousands digits of the calling subscriber number. In the present example, the calling subscriber number 4774 has been registered in the code storage register 302 by the detector 1900 as has been previously described. Consequently, the digits 4774 are marked in code form on the respective code marking conductors in the cable C362 to C365, inclusive, and as the wipers 702 to 705 of the storage transfer switch 701 are advanced step-by-step over the contacts 19, 20, 21 and 22, the digits 4774 will be transferred in the order named to the tabulator 745 and registered therein.

The wipers of the storage transfer switch 701 will thereafter advance into engagement with the contacts 23 in the associated contact bank. These contacts terminate respectively, the WXYZ23 code marking conductors. It should be noted that the W23 conductor is not used. The X23 conductor is connected to the contact 724, the Y23 conductor is multiply connected to the contacts 727 and 728 and the Z23 conductor is connected to the contacts 731. Consequently, if the calling exchange relay R720 is in its operated position, the ground potential at the contacts 613 will be connected by way of the contacts 724 and 728 to mark the XY23 conductors in code form in accordance with the digit 4 identifying the calling exchange B. If the calling exchange relay R720 is in its normal position, then the ground potential at the contacts 613 will apply the marking ground potential by way of the contacts 727 and 731 to the YZ23 code marking conductors to mark these conductors in accordance with the digit 6 identifying the calling exchange C. In the present example, the call originated in the exchange B and the calling exchange digit 4 is transferred to the tabulator 745 due to the fact that the calling exchange relay R720 is in its operated position. Consequently, when the wipers 702 to 705, inclusive, engage the contacts 23, ground potential will be applied to the X conductors C736 and the Y conductor C737 extending to the tabulator so that the digit 4 will be registered therein in code form. At the present time all of the information stored in the ticketer 700 has been transferred to and stored in the tabulator 745.

In order more readily to determine the various items of information which are transferred from the ticketer 700 to the tabulator 745 in connection with the present call reference may be had to the following table:

| Storage Transfer Switch 701 Contact Positions | Code Marking Conductors | Information Transferred |
|---|---|---|
| 1 | Blank | Blank. |
| 2 | WXYZ2 | Ticketer No. Units Digit (1). |
| 3 | WXYZ3 | Ticketer No. Tens Digit (0) |
| 4 | WXYZ4 | Ticketer No. Hundreds Digit (0). |
| 5 | Blank | Blank. |
| 6 | Blank | Blank. |
| 7 | WXYZ33 | Conv. Time Units Digit. |
| 8 | WXYZ32 | Conv. Time Tens Digit. |
| 9 | WXYZ31 | Conv. Time Hundreds Digit. |
| 10 | Blank | Blank. |
| 11 | Blank | Blank. |
| 12 | WXYZ12 | Space. |
| 13 | WXYZ13 | Called No. Units Digit (3). |
| 14 | WXYZ14 | Called No. Tens Digit (5). |
| 15 | WXYZ15 | Called No. Hundreds Digit (2). |
| 16 | WXYZ16 | Called Exchange Digit (6). |
| 17 | Blank | Blank. |
| 18 | Blank | Blank. |
| 19 | WXYZ19 | Calling No. Units Digit (4). |
| 20 | WXYZ20 | Calling No. Tens Digit (7). |
| 21 | WXYZ21 | Calling No. Hundreds Digit (7). |
| 22 | WXYZ22 | Calling No. Thousands Digit (4). |
| 23 | WXYZ23 | Calling Exchange Digit (4). |
| 24 | Blank | Blank. |
| 25 | Blank | Blank. |
| 26 (home) | Blank | Blank. |

As the tabulator 745 transmits an additional impulse to the magnet M707, the wipers of the storage transfer switch 701 will be advanced one step from the contacts 23 into engagement with the contacts 24, as noted above. As soon as the wiper 706 disengages the contact 23, the ground potential on the wiper 706 is disconnected from the previously described multiple circuit including the upper winding of the control relay R610 and the winding of the release guard relay R230. These relays restore to normal at this time. Furthermore, when the wipers 702 to 706, inclusive, are advanced into engagement with the contacts 26 in the associated contact banks, the off-normal contacts ON710 will be opened and the off-normal contact ON709 will be closed.

Referring now to the relay R610, it will be seen that as soon as the relay restores to normal it interrupts, at its contacts 611, the circuit for maintaining the ground potential on the locking conductor C356. Accordingly, at this time operated ones of the code storage relays in the register 302 will restore to normal to remove the code markings from the marking conductors in the cables C362 to C365, inclusive. Also, at the contacts 613, the relay R610 upon restoring will remove ground potentials from all of the code marking conductors that are terminated in the contacts of the calling exchange relay R720. Finally, at its contacts 612, the relay R610 now interrupts the circuit for the release relay R460 which also restores to normal.

Referring now to the release relay R460 it will be seen that, at its contacts 462, it applies ground potential by way of the off-normal contacts ON507, contacts 506 and the winding of the magnet M505, to battery. It should be noted, however, that the off-normal contacts ON507 are in a closed position whenever the wipers 502 to 504, inclusive, of the receive sequence switch 501 are disengaged from the home contact position. When the wipers again engage the home contact positions, the off-normal contacts ON507 are opened. At the present time, the magnet M505 is self-interruptedly operated by means of its contacts 506 to return the wipers 502 to 504, inclusive, into engagement with the home contact positions. When this occurs, the off-normal contacts ON507 are opened to terminate further stepping of the magnet M505.

As a further result of the restoration of the release relay R460, at its contacts 463, it completes a point in a chain circuit for controlling the magnets of the rotary switches in the digit register 509, one after another, until all of the rotary switches are restored to normal. In the present call, no digits were registered in the digit register 510, 520 and 530 and, consequently, the associated rotary switches are in the normal position as is shown in detail in the register 510. In order to understand the manner in which each of the rotary switches are restored to normal, it will be assumed that the register 510 is in an operated position at this time. Therefore, the ground potential at the contacts 463 is extended by way of the off-normal contacts ON513 (closed whenever the associated wipers are in an off-normal position) contacts 512 and the winding of the magnet M511. This magnet is now self-interruptedly operated by its contacts 512 until the wipers 515 and 516 again assume the position illustrated in the drawing, at which time the contacts ON513 are opened and the off-normal contacts ON514 are closed. Thus, the ground potential at the contacts 463 is now transferred to the corresponding off-normal contacts associated with the magnet and wipers of the register 520. The magnet of this register will be self-interruptedly operated in the manner described above until its wipers are returned to their normal positions to transfer the restoring circuit to the next register 530. From the foregoing it will be understood that any operated ones of the registers 510 to 580, inclusive, will be self-interruptedly restored to normal one after another.

At its contact 465, the relay R460 simultaneously interrupts the circuit for the lower winding of the polarized answer relay R270 and the locking circuit for the operated relays in the station identifying register 301. At its contacts 466, the relay R460 removes the locking ground potential from the conductor C486 in order now to restore any operated relay in the ticketer 700 that is locked to this conductor. Consequently, at this time the detection complete relay R150, the timer start relay R620 and the 0 dialed relay R640 restore to normal. Finally, at the contacts 467, the relay R460 connects battery potential by way of the resistor 468 to the C conductor C497 but this is without effect until the shunting ground potential is removed at the contacts 232 as will be described subsequently.

As soon as the detection complete relay R150 restores, as noted above, it prepares at its contacts 152 and 154 the previously described circuits whereby the detector 1900 is associated with the calling ticketer 700. The restoration of the 0 dialed relay R640, as noted above, prepares points in various circuits previously described in connection with the seizure of the ticketer 700 and, at its contacts 645, the relay R640 completes a self-interrupting circuit for the magnet M663 whereby the wipers 661 and 662 of the 0 register 660 are returned to their normal positions. This circuit includes ground at the contacts 488, off-normal contacts ON664 which are closed as long as the wipers 661 and 662 are not in the position illustrated in the drawings, contacts 665 and 645 and the winding of the magnet M663, to battery. The magnet is self-interruptedly operated under control of its contacts 665 to advance its wipers 661 and 662 one step from the contacts 10 into engagement with the illustrated home contact positions. When the wipers reach this position, the off-normal contacts ON664 are opened in order to terminate further automatic stepping of the magnet M663.

As soon as the timer start relay R620 restores to normal, as noted above, it interrupts, at its contacts 621, the circuit including the off-normal contacts 709. Also, at its contacts 624, the relay R620 interrupts a further point in the time pulsing circuit for the conversation timer 635. Finally, at its contacts 623, the timer start relay R620 connects the release supervisory relay R240 to the releasing circuit including the conversation timer 635 and the storage transfer switch 701. Thus, the release supervisory relay R240 is operated in series with one of the magnets of the registers in the conversation timer 635 to complete the self-interrupting circuit for the latter magnet whereby the associated register is restored to normal in substantially the same manner as has been described in connection with the restoration of the wipers associated with the magnet M511 in the register 510. As the units, tens and hundreds digit registers are restored to normal, the releasing circuit including the winding of the relay R240, the contacts 623 and the conductor C632 is sequentially transferred from one register to the next as has been described above in connection with the restoration of the registers in the digit register 509. After the registers in the conversation timer 635 are restored to normal, the releasing circuit is connected to the off-normal contacts ON710 associated with the storage transfer switch 701. If the wipers 702 to 706, inclusive, of the storage transfer switch 701 are in engagement with the illustrated home contact positions then the off-normal contacts ON710 will be open. However, if the wipers are in engagement with any other contact position, then the off-normal contacts ON710 will be closed and the releasing circuit will be extended by way of the contacts 708 to the winding of the magnet M707. Thus, the release supervisory relay R240 and the magnet M707 will be operated. The magnet M707 is self-interruptedly operated, by means of its contacts 708, to advance the wipers 702 to 706, inclusive, step-by-step into engagement with the home contact position. When this position is reached the off-normal contacts ON710 will be opened, as illustrated in the drawings, to interrupt the releasing circuit.

As soon as the above mentioned release circuit, including the winding of the relay R240 is interrupted, the relay R240 restores to normal. It should be noted, however, that during the time the supervisory relay R240 is in its operated position, the contacts 241 are closed in order to illuminate the release signal lamp L244 and thus indicate to the exchange attendant that the ticketer 700 is in the release cycle of its operation. If the lamp L244 should remain illuminated for a period longer than is required to restore the conversation timer 635 and the storage transfer switch 701 to their normal positions, it will indicate to the exchange attendant that some fault has occurred during the releasing cycle of the ticketer 700. Also, during the operated period of the relay R240, at its contacts 242, it retains a busy marking ground potential on the conductor C416 and, at its contacts 243, it maintains a busy marking ground potential on the conductor C497 thereby to mark the ticketer 700 busy to the selectors, such as the first selector 122, and the rotary switches, such as the rotary switch 816, having access thereto.

It will be recalled that at the time the storage transfer switch 701 advanced its wiper 706 from the contact 23, the relay R230 restored to normal. This relay is somewhat slow-to-release and also maintains the busy marking ground potentials on the conductors C416 and C497, at its contacts 231 and 232, during its operated period. As soon as the relay restores to normal, however, the busy marking ground potentials are removed from these conductors. Finally, at its contacts 233, the relay R230 upon restoring interrupts the locking circuit for the tabulator cut-in relay R630 which now restores to normal. The ticketer 700 is now fully restored to normal and rendered available for use in a new call either from the exchange B to the exchange C or from the exchange C to the exchange B.

All of the items of information pertaining to the above described telephone connection have now been transferred from the ticketer 700 to the tabulator 745. After the tabulator 745 has received and registered a predetermined number of the items of record information in the code storage register relays therein, it will initiate operation whereby the various items of record information will be transmitted to the record tape perforator 750 and the ticket tape perforator 755. During the cycle of operation, the tabulator 745 will transmit an item of information including the day and month and the hour and minute of the time of the recording in accordance with the markings controlled by the date and time unit 760. The detailed operations of the tabulator 745, the record tape perforator 750, the ticket tape perforator 755 and the date and time unit 760, whereby, the items of information are perforated by the respective ticket and record tape perforators is described in detail in the Ostline application, Serial No. 75,985, filed February 12, 1948 and in the Ostline application Serial No. 207,092, filed January 22, 1951.

For the purpose of this description it will be assumed that the items of information are perforated by the record tape perforator 750 in the following order:

1. Tens digit of the month
2. Units digit of the month
3. Tens digit of the day
4. Units digit of the day
5. Tens digit of the hour
6. Units digit of the hour
7. Tens digit of the minute
8. Units digit of the minute
9. Digit 4 identifying the calling exchange
10. Thousands digit 4 of the calling number
11. Hundreds digit 7 of the calling number
12. Tens digit 7 of the calling number
13. Units digit 4 of the calling number
14. Digit 6 identifying the called exchange
15. Hundreds digit 2 of the called number
16. Tens digit 5 of the called number
17. Units digit 3 of the called number
18. Space
19. Hundreds digit of the conversation time
20. Tens digit of the conversation time
21. Units digit of the conversation time
22. Hundreds digit 0 of the ticketer number
23. Tens digit 0 of the ticketer number
24. Units digit 1 of the ticketer number The foregoing list illustrates one manner in which the record perforator 750 may be controlled to perforate the tape in accordance with the various items of record information registered in the tabulator 745. However, it should be understood that any other order may be utilized in controlling the perforator to perforate the associated tape.

The record tape perforator 750 will produce a perforated tape including all of the above noted items of information but the ticket tape perforator 755 will be controlled by the tabulator so that it will perforate its tape in accordance with only the items 9 to 21, inclusive, noted above. The items of information perforated by the record tape perforator are utilized by the operating telephone company, whereas, the tape produced by the ticket tape perforator 755 may be used to control a card punch mechanism. The card produced by such a mechanism may subsequently be utilized to control a printing mechanism, whereby a ticket individual to the particular call will be printed having thereon the printed items of information pertaining to the call. This ticket is normally forwarded to the subscriber at the end of the month to inform the calling subscriber of the details pertaining to the particular recorded toll call. The tape produced by the record tape perforating mechanism 755 includes the additional information noted above which are provided for the telephone company's records. Thus, the information relating to the exact date and time that the tape is perforated is not produced on the ticket tape, whereas, this information is contained on the record tape. Also, the information relating to the identity of the ticketer is omitted from the ticket tape and is produced on the record tape.

If desired, the ticket tape produced by the ticket tape perforating mechanism 755 may be fed through a translating mechanism which is arranged to calculate the cost of the call from the items of information which have been perforated on the ticket tape. The items of information which are utilized in calculating the cost of the call may be, for example, the conversation time of the call and an arbitrary charge rate for the call corresponding to the distance between the calling and called exchanges. Thus, the translating device which is controlled by the perforated tape may calculate the cost of the call and may either produce a punched card including all of the items of record information, as well as the cost of the call or it may directly control a printing mechanism to print all of the items of information pertaining to a call including the cost thereof. In this manner, individual toll tickets pertaining to a telephone connection may be produced and subsequently mailed to the calling subscriber with the monthly bill.

After all of the items of information stored in the tabulator 745 have been transmitted to the perforators 750 and 755, the tabulator 745 automatically restores to its normal condition and is rendered available to the tabulator allotter 744 for use in recording a subsequent call.

*Extension of a toll ticketed call from the subscriber in the remote exchange C to a subscriber in the central exchange B*

A description will now be given of the operation of the switching apparatus included in the remote exchange C and in the central exchange B and for this purpose it will be assumed that a call is originated by the subscriber at station 3 (Fig. 14) in the remote exchange C whose directory number is 253 and intended for the called subscriber at station 3 (Fig. 1) in the central exchange B whose directory number is 4774.

When the calling subscriber at station 3 (Fig. 14) whose directory number is 253, removes his receiver, the usual loop circuit, including the — and + line conductors C1309 and C1310, is completed for operating the line circuit 1315. In response to the completion of the above mentioned loop circuit, the line circuit 1315 initiates the operation of the distributor 1317 and marks the terminals of the calling subscriber line in the bank contacts of a group of line finders including the line finder 1318. For the purpose of this description it will be assumed that the distributor 1317 selects the line finder 1318 and that the latter finder operates its wipers in a vertical and then in a rotary direction in a conventional manner to select the terminals in the associated bank terminating the calling subscriber line. When the calling line is found by the finder 1318, it extends the loop circuit including the calling subscriber line to the local connector 1319. Since the exchange C is assumed to be a hundred line exchange, connectors, such as the connector 1319, are individually associated with line finders, such as the line finder 1318. As soon as the connector 1319 is seized in the manner noted above, the usual dial tone signal is transmitted to the calling subscriber to indicate that the dialing may be started. The above noted switching apparatus, including the line circuit 1315, the distributor 1317, the line finder 1318 and the local connector 1319, may be of conventional construction and arrangement, for example, of the type illustrated in the previously noted Bakker patent and Saunder patent.

Since the calling subscriber at station 253 intends to extend a connection to the called subscriber in the central exchange B, it is necessary for the calling subscriber to dial the prefix digits 90, then the digits 253 corresponding to the three digits identifying the calling subscriber station, then the digit 4 identifying the called exchange B and then the four digits 4774 identifying the called subscriber station in exchange B. Consequently, when the calling subscriber at station 253 in exchange C receives the dial tone signal, the dial is actuated in accordance with the digit 9 to transmit nine impulses to the local connector 1319. The connector is controlled by the loop impulses corresponding to the digit 9 to raise its wipers in a vertical direction to the ninth level in the associated contact banks. This level of the connector 1319 terminates a plurality of trunk lines, including the trunk line in cable C1326, terminating in the ticket repeaters, such as the ticket repeater 900. Furthermore, the local connector 1319 is arranged to automatically search over the bank contacts in the ninth level to select an idle ticket repeater. It will be assumed for the purpose of this description that the connector 1319 in rotating its wipers over the ninth level selects the ticketer 900 over the conductors C905, C906 and C907 included in the cable C1326. It should be noted that as the ticket repeater 900 (Figs. 9 to 12, inclusive) is arranged so that the conductor C907 will be grounded if the busy marking relay R1010 is in its operated busy marking position. In other words, if the ticket repeater 900 is busy in an incoming call, the local connector 1319 will rotate its wipers an additional step to select the next idle ticket repeater.

When the local connector 1319 seizes the ticket repeater 900, it extends the loop circuit including the — and + conductors C1309 and C1310 of the calling subscriber line to the — and + conductors C905 and C906 in the ticket repeater 900 by way of the line circuit 1315, the line finder 1318 and the local connector 1319. Referring now to Fig. 9 of the ticket repeater 900, it will be seen that the above traced loop circuit is further extended by way of the — conductor C905, upper right-hand winding of the repeating coil 925, contacts 963, winding of the local line relay R970, resistor 975 to the — terminal of the auxiliary 50 volt battery 997. Also, the + conductor C906 is extended by way of the lower right-hand winding of the repeating coil 925, contacts 961, winding of the polarized party line relay R980, resistance lamp L999 to the + terminal of the 50 volt auxiliary battery 997. Consequently, the calling subscriber loop circuit is now bridged across the — and + terminals of the 50 volt auxiliary battery 997 through the windings of the local line relay R970 and the party line relay R980. Since the party line relay R980 is of the polarized type, the current flow through its windings at the present time is in such a direction that the relay does not operate. However, the local line relay R970 operates at this time.

In response to the operation of the line relay R970, a circuit is completed at its contacts 971 for operating the hold relay R1030. The latter relay, at its contacts 1031, applies ground potential by way of the contacts 1017, 1031 and 1011 to the C conductor C907 in the cable C1326 extending to the local connector 1319. This ground potential holds the local connector 1319 in its operated position and marks the toll ticket repeater 900 busy to other similar connectors having access thereto. Furthermore, the holding ground potential applied to the C conductor C907 retains the line finder 1318 and the line circuit 1315 in their operated positions and it marks the line circuit 1315 busy to the connectors, such as the local connector 1319 and the incoming connector 1320, having access thereto.

As a further result of the operation of the control relay R1030, at its contacts 1033, it prepares a point in a pulsing circuit to be traced hereinafter; at its contacts 1034 it applies a holding ground potential to the locking conductor C1205 thereby to operate the outgoing control relay R920; and, at its contacts 1035, it completes an obvious circuit for operating the control relay R910. In operating at this time the outgoing relay R920 transfer the — and + conductors C901 and C902 of the toll line TL811 from the — and + conductors C903 and C904 in the cable C1325 to the upper and lower left-hand windings of the repeating coil 925. This prepares the toll line TL811 so that the ticket repeater 900 may seize the trunk repeater 810 in the central exchange B and repeat certain dialed digits to the switching apparatus in the central exchange B. The operation of the control relay R910 at this time merely prepares points in circuits to be completed hereinafter.

As stated above, the local line relay R970 in the ticket repeater 900 is now operated over a circuit including the calling subscriber line, the polarized party line relay R980 is conditioned to respond to ground impulses transmitted by the calling subscriber dial, and the ticket repeater 900 is in condition to respond to the series of loop impulses as well as any station identifying ground impulses transmitted by the dial at the calling subscriber station.

*Dialing the digit 0 into the ticket repeater 900*

In response to the dialing of the second digit, which in this case is the digit 0, the local line relay R970 restores and reoperates ten times. The first time the line relay R970 restores to normal it completes, at its contacts 972, a circuit including contacts 1033, 993 and 965 for operating the slow-to-release pulse control relay R940 and the latter relay, at its contacts 941 further extends this operating ground potential by way of the contacts 966 and 967 in order to operate the magnet M916 of the 0 register 915. The magnet M916 is retained in its operated position until the line relay R970 reoperates at the end of the first pulse. When this occurs, the magnet M916 restores to normal and advances its wipers 918 and 919 one step in a clockwise direction into engagement with the contacts 1. The slow-to-release relay R940 remains in its operated position as the remaining nine impulses are repeated by the line relay R970 to the magnet M916. As soon as the wipers 918 and 919 are advanced into engagement with the contacts 1 in the associated contact banks, the off-normal contacts ON913 are closed and a circuit including battery potential, contact 1 engaged by the wiper 919, winding of the control relay R930 and ground at contacts 911 is completed for operating the control relay R930. The control relay R930 upon operating prepares a point in a test circuit including the contacts 932 for operating the fault relay R985 in the event that the calling subscriber fails to dial the digit 0 as the second digit.

The pulses 2 to 10, inclusive, repeated by the local line relay R970 to the magnet M916 are also extended by way of the contacts 917 and the off-normal contacts 913 to the contacts 931. However, since the control relay R930 is operated during the time that the wipers of the 0 register 915 are in engagement with the contacts 2 to 10, inclusive, the pulses repeated to the contacts 931 perform no controls at this time. In response to the transmission of the ten impulses of the digit 0 to the line relay R970, the magnet M916 operates and restores ten times and, accordingly, positions its wipers 918 and 919 into engagement with the contacts 10 in the associated contacts banks. During this pulsing period of time the line relay R970 intermittently completes, at its contacts 971, the circuit for retaining the slow-to-release hold relay R1030 in its operated position.

At the conclusion of the dialing of the second digit 0, the local line relay R970 is retained in its operated position during the interdigital pause between the transmission of the second digit 0 and the following digit dialed by the calling subscriber. During the interdigital pause, the pulse control relay R940 restores to normal and attempts to complete, at its contacts 942 and 943, two separate circuits. The first circuit is provided to operate the fault relay R985 if the digit 0 is not dialed. The second circuit is provided to operate the 0 dialed relay R960 in the event that the digit 0 has been properly registered in the 0 register 915.

It will first be assumed that the digit 0 has been properly registered in the 0 register 915 and, consequently, the wipers 918 and 919 are in engagement with the contacts 10. As soon as the pulse control relay R940 restores during the interdigital pause, it completes, at its contacts 943, a circuit including the grounded locking conductor C1205, wiper 918 in engagement with the contact 10, the lower winding of the 0 dialed relay R960, and battery. The relay R960 now operates and, at its contacts 968, locks itself in its operated position over a circuit including its upper winding and the grounded locking conductor C1205. As a further result of the operation of relay R960, at its contacts 969, it opens a point in the circuit traced hereinafter so that the fault relay R985 cannot operate when the contacts 942 on the relay R940 are closed. Also, at its contacts 961 to 964, inclusive, the relay R960 transfers the calling subscriber loop circuit from the previously described circuit including the party line relay R980 and the local line relay R970 and connects the loop circuit to the upper and lower windings of the line relay R950. As a further result of the operation of the relay R960, at its contacts 965, 966 and 967, it interrupts points in the previously described circuits for controlling the pulse control relay R940 and the magnet M916. Thus, the digit 0 is registered in the 0 register 915 and the 0 dialed relay R960 is locked in its operated position.

The second circuit controlled by the restoration of the pulse control relay R940 during the interdigital pause is rendered effective to operate the fault relay R985 only in the event the 0 dialed relay R960 fails to operate. In the latter event, a circuit including the contacts 942, 932 and 969 will be completed for operating the fault relay R985 and for illuminating the alarm lamp L996. The latter relay, at its contacts 986, completes an obvious circuit for operating the failure relay R990 which relay, at its contacts 994, locks itself in its operated position to ground at contacts 912. As a further result of the operation of the relay R990, at its contacts 993, it interrupts a point in the pulsing circuit for the pulse control relay R940; at its contacts 992, it places a shunt around the impulsing contacts 951 on the line relay R950 in order to prevent the latter relay from repeating impulses over the toll line TL811 in the event that the subscriber should dial an additional digit; and at the contacts 991, it connects the busy tone conductor C995 to the — conductor C905 so that the busy tone signal on the conductor C995 will be transmitted to the calling subscriber station. Accordingly, the calling subscriber receives a busy tone signal to indicate that the call can not be completed to its destination.

From the foregoing description it will be understood that if the 0 digit is properly registered in the 0 register 915, the ticket repeater 900 is controlled so that the line relay R950 may respond to subsequent dialed digits. However, if the 0 digit is not properly dialed and registered in the register 915, a busy tone signal will be transmitted to the calling subscriber and the ticket repeater 900 will be controlled so that it will not repeat further impulses dialed by the calling subscriber over the toll line TL811.

It will be assumed for the purpose of this description that the 0 digit has been properly dialed and that the ticket repeater 900 is now conditioned to respond to the next digit dialed by the calling subscriber. However, before describing the operations in response to subsequent dialed digits, the control of the polarized party line relay R980 will first be considered. If the present call is originated at an individual subscriber line provided with a conventional dial that is arranged to transmit only loop impulses as is schematically illustrated at station 521 (Fig. 14) then the polarized party line relay R980 will not be operated during the transmission of the digit 0 to the ticket repeater 900. In the latter event the operations of the ticket repeater 900 will be performed in the manner described above. However, if the calling station is provided with a special dial of the type previously noted, then the polarized party line relay R980 will operate and restore one or more times in accordance with the arrangement illustrated in Fig. 16 and will control the party line station identifying register 1201 to indicate the particular station on the party line that is making the call. The special calling device when actuated in accordance with the digit 0, and, as a matter of fact, when actuated in accordance with any of the digits 2 to 9 and 0, will transmit a corresponding number of regular switch controlling loop impulses to the local line relay R970 and during the transmission of at least the last two impulses of the digit, the special dial will also transmit 1, 2 or 3 short ground impulses to the party line relay R980.

In the present example, it was assumed that the call was originated by the subscriber at station 3 in the remote exchange C whose directory number is 253. The special dial at this station is arranged to transmit 3 spaced-apart short ground impulses as is indicated by the line 1603 in Fig. 16. The previous description regarding the operation of the local line relay R970 in response to the ten loop impulses of the digit 0 still applies so that the 0 digit is registered in the 0 register 660. However at the calling station the dial 1313 is arranged so that just prior to the transmission of the next to the last loop impulse by the impulsing springs 1313*a*, the cam 1313*b* closes the cam springs 1313*c* in order to apply ground potential simultaneously to the line conductors C1309 and C1310. The ground potential applied in this manner to the — conductor C1309 is extended over the previously traced circuits to the conductor C905 in the ticket repeater 900 and then to the local line relay R970 in order to retain the relay R970 in its operated position each time the ground potential is applied.

The ground potential applied to the + conductor C1310 of the calling subscriber line is extended over the previously traced circuit to the + conductor C906 in the ticket repeater 900 and then by way of the lower right-hand winding of the repeating coil 924, contacts 961, the winding of the polarized line relay R980, resistance lamp L999 and the — terminal of the 50 volt exchange battery 998, to ground. In this circuit the current flow through the winding of the polarized party line relay R980 is reversed from the normal direction of the current flow through the relay during the time that the loop circuit is closed. Consequently, the relay R980 operates in response to the first ground pulse transmitted by the dial 1313 as it returns to normal in transmitting the ten impulses of the digit 0. At the contacts 981, a momentary circuit is now completed for operating the relay R1210 of the party line station identifying register 1201. This circuit may be traced from the grounded locking conductor C1205 and then by way of the contacts 973, 981, ground pulse conductor C1202, contacts 1212 and the winding of relay R1210, to battery. The relay R1210 operates and, at its X contacts 1213, locks itself to the locking conductor C1205. The locking circuit noted above is completed before the initial operating circuit for the relay is interrupted at the contacts 1212. As a further result of the operation of relay R1210, at its contacts 1211, it prepares a point in the circuit for operating the relay R1215. At the end of the first ground pulse transmitted by the cam 1313*b* on the calling subscriber dial, the party line relay R980 restores to normal inasmuch as the original loop circuit is again completed and reverses the current flow through the winding of the party line relay R980 so that the relay now restores to normal.

Immediately thereafter, the impulsing springs 1313*a* are again opened in order to transmit the next to the last loop impulse over the line conductors C1309 and C1310 to the ticket repeater 900. The line relay R970 now restores to normal in order to complete, at its contacts 974, a circuit including the grounded locking conductor C1205, the loop pulse conductor C1203, contacts 1211 and 1217 and the winding of relay R1215, to battery. This relay also locks itself in its operated position over a circuit including its X contacts 1218 to the grounded locking conductor C1205 before it interrupts its initial operating circuit including the contacts 1217. At the end of the next to the last loop impulse, the relay R970 remains in its operated position and shortly thereafter the next ground impulse is transmitted by the cam 1313*b*.

In response to the second ground impulse transmitted by the cam 1313*b*, the line relay R970 is retained in its operated position and the polarized party line relay R980 reoperates. At its contacts 981, the party line relay R980 applies the second ground pulse to the conductor C1202 thereby to operate and lock the station identifying relay R1220 in the same manner as has been described above.

At the end of the second ground impulse transmitted by the cam 1313*b* at the calling station, the party line relay R980 again restores to normal. Shortly thereafter, the last loop impulse is transmitted by the impulsing springs 1313*a* in order momentarily to restore the local line relay R980. At its contacts 974, the relay R980 applies ground potential to the loop pulse conductor C1303 thereby to operate and lock the next station identifying relay R1225 in the manner previously described.

After the transmission of the last loop impulse, as noted above, the cam 1313*b* transmits the third ground impulse to the polarized party line relay R980. The relay R980, at its contacts 981, completes the circuit for operating and locking the last station identifying relay R1230.

Since the special dial at the calling station 3 having the directory number 253 on the calling party line is arranged to transmit three short ground impulses separated by two loop impulses as is graphically illustrated in Fig. 16, the five relays R1210 to R1230, inclusive, in the party line station identifying register 1201 are sequentially operated in the manner noted above during the dialing of the digit 0. With all of the relays of the party line station identifying register 1201 in their operated positions, a circuit is completed at the contacts 1232 for applying a marking ground potential to the conductor PTY.3 terminating in the bank contact 3 accessible to the wiper 1194 of the calling station digit register 1190. Thus, the bank contact 3 accessible to the register 1190 is marked to indicate that the third station on the calling party line has originated the present toll call.

By referring to Fig. 16, it will be seen that if the station 5 having the directory number 255 on the party line originated the call the cam 1315*b* thereat would transmit a single short ground impulse after the last loop impulse of the digit 0 thereby to operate only the relay R1210 in the party line station identifying register 1201. With only the relay R1210 operated, a circuit is completed, at the contacts 1214, for applying a marking ground potential to the conductor PTY.5 in order to mark the bank contact 5 accessible to the wiper 1194 of the digit register 1190 and indicate that the station 5 on the party line is calling.

Referring again to Fig. 16, it will be seen that if the station 4 having the directory number 254 on the party line originated the call, the cam 1314*b* thereat will transmit one short ground impulse prior to the transmission of the last loop impulse of the diigt 0 and it will transmit a second short ground impulse after the transmission of the last loop impulse. Accordingly, the party line relay R980 will operate in response to the first ground impulse and cause the relay R1210 in the party line station identifying register 1201 to operate and lock. The last loop impulse will control the local line relay R970 and cause it to operate the relay R1215 in the party line station identifying register 1201. Thereafter, the second short ground impulse transmitted by the cam 1314*b* will cause the party line relay R980 to transmit the second short ground impulse to now operate the relay R1220 in the party line station identifying register 1201. Thus, the relays R1210, R1215 and R1220 of the party line station identifying register 1201 are operated in sequence and as a result thereof, the conductor PTY.4 will be marked with the ground potential by the contacts 1221 on the operated relay R1220. The grounded conductor PTY.4 will mark the contact 4 accessible to the wiper 1194 in the digit register 1190 to indicate that the station 4 on the party line originated the call.

Referring again to Fig. 16 it will be seen that if the station 2 having the directory number 252 on the party line originated the call, the cam 1312*b* thereat will transmit a first short ground impulse just prior to the transmission of the next to the last loop impulse of the digit 0 and it will transmit a second short ground impulse between the transmission of the next to the last and the last loop impulse. Consequently, the party line relay R980 will operate in response to the first ground impulse transmitted by the cam 1312*b* and will cause the operation of the relay R1210 in the register 1201. Thereafter, the line relay R970 will respond to the next to the last loop impulse and cause the operation of the relay R1215 in the register 1201. The second short ground impulse transmitted by the cam 1312*b* will cause the party line relay R980 to operate the relay R1220 in the register 1201 and the last loop impulse transmitted by the calling device will control the local line relay R970 to cause the operation of the relay R1225 in the register 1201. With the relays R1210, R1215, R1220 and R1225 operated in sequence in the manner noted above, a marking ground potential will be applied to the conductor PTY.2 by way of the contacts 1231 and 1226. This ground potential is applied to the bank contact 2 accessible to the wiper 1194 of the digit register 1190 to indicate that the station 2 is the calling station on the party line.

From the foregoing description it is apparent that during the dialing of the digit 0 to the ticket repeater 900 the local line relay R970 will restore and reoperate ten times to register the digit 0 in the 0 register 915 and it will cooperate with the party line relay R980 to register the number of the particular calling station on a calling party line in the station identifying register 1201. It should be noted, however, that the party line, including the line conductor C1309 and C1310 has been illustrated as a four party line having the stations 2 to 5, inclusive. If it is necessary to add another station to the party line, it may be accomplished by providing station apparatus having a conventional calling device of the type schematically illustrated at the individual line station having the directory number 521. If this is done, the station having the conventional calling device connected to the calling line, conductors C1309 and C1310 will only transmit loop impulses without transmitting any station identifying ground impulses. Consequently, the relays included in the party line station identifying register 1201 will not be operated when such a station dials the digit 0 to the ticket repeater 900. The same operations occur in the event the call is originated by an individual line station, such as, the station 521 schematically illustrated in Fig. 13.

To take care of the condition wherein the first station on a party line or an individual line station having conventional calling devices originates calls the last digit of the directory numbers of such stations will be the digit 1. If these stations dial the digit 0 into the ticket repeater 900, the 0 digit register 915 will operate in the manner previously described but all of the relays in the party line station identifying register 1201 will remain in their normal positions. Therefore, the calling station digit register 1190, has ground potential permanently connected to the contact 1 in the associated contact bank to indicate that a first station on a party line or an individual line station originated the call. The station digit register 1190 will be operated to select any one of the contacts 1 to 5, inclusive, corresponding to the last digit of the directory number of the calling station as dialed from said station as will be described hereinafter.

*Dialing the three digits of the calling station number*

In the previous description it was pointed out that the calling subscriber at station 3 having the directory number 253 dialed the digit 0 into the ticket repeater 900 and that as a result thereof, the 0 register 915 caused the operation of the 0 dialed relay R960 and that all of the relays in the station identifying register 1201 operated to mark the conductor PTY.3 terminating in the bank contact 3 accessible to the wiper 1194 of the calling station digit register 1190. Furthermore the 0 dialed relay R960 transferred the calling subscriber loop circuit from the circuit including the windings of the polarized relay R980 and the local line relay R970 to a circuit including the upper and lower windings of the line relay R950. Consequently, the line relay R950 immediately operates over the loop circuit including the calling subscriber line conductors C1309 and C1310. The line relay R950 immediately operates when the above transfer is made and, at its contacts 951, completes a loop circuit by way of the upper and lower left-hand windings of the repeating coil 925, contacts 922 and 924 of the operated outgoing relay R920 and the — and + conductors C901 and C902 in the toll line TL811 extending to the trunk repeater 810 in the central exchange B. As soon as the above mentioned loop circuit is completed, the trunk circuit 810 operates in a conventional manner to mark itself busy to trunk selectors, including the trunk selector 810, having access thereto and it also controls the allotter 815 so that its rotary switch 816 selects an idle ticketer in the central exchange B. It will be assumed that the ticketer 700 is selected over the five conductors C493 to C497, inclusive.

Figure 4:
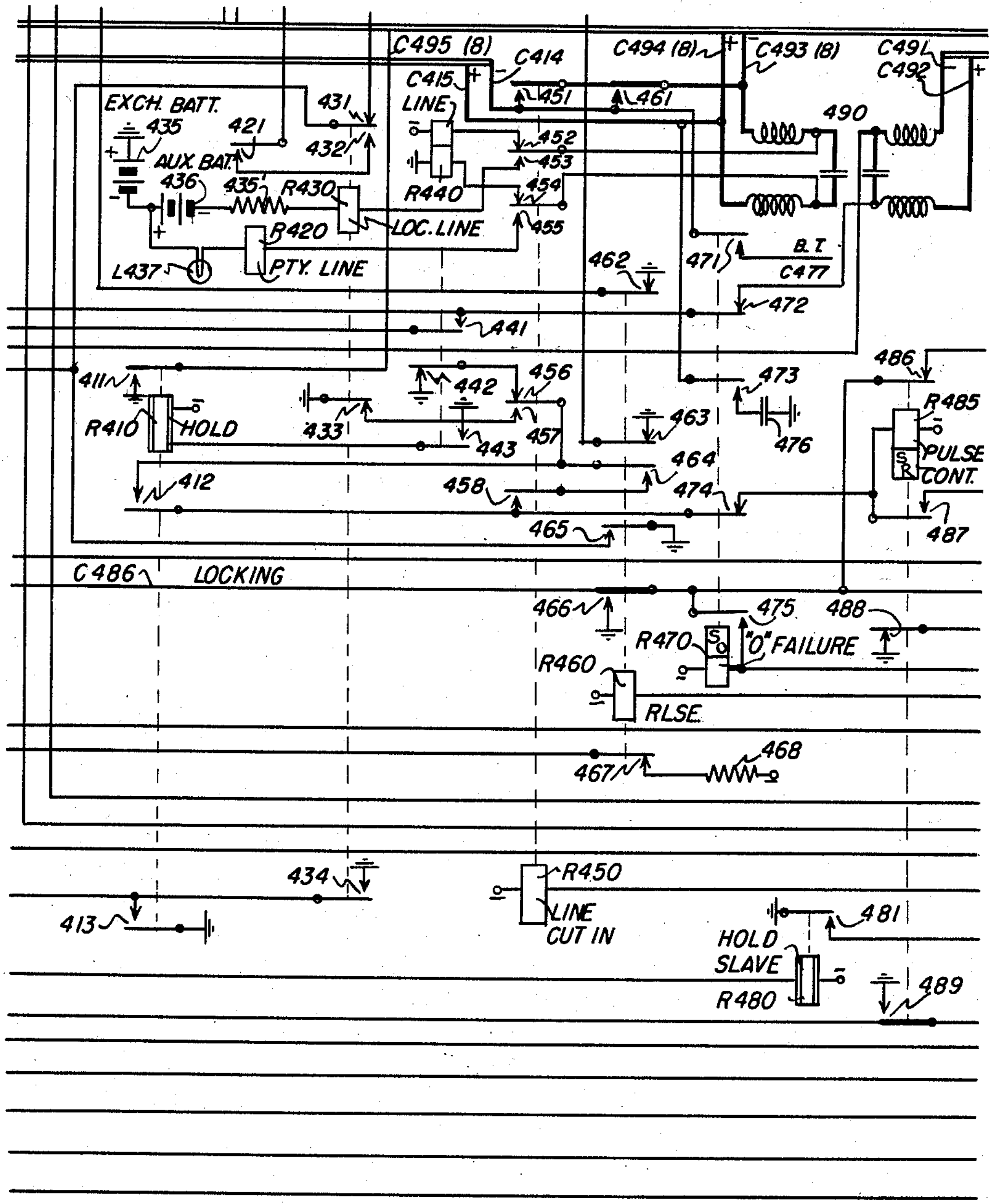

As a result of the foregoing selection of the ticketer 700, the loop circuit including the contacts 951 in the ticket repeater 900 and the — and + conductors C901 and C902 in the toll line TL811 controls relays (not shown) in the trunk repeater 810 so that a further loop circuit is extended by way of the allotter 815, and the rotary switch 816 to the — and + conductors C493 and C494 (Fig. 4) in the ticketer 700. Referring to Fig. 4 it will be seen that the — conductor C493 is further connected by way of the upper left-hand winding of the repeating coil 490, contacts 452 and the upper winding of the line relay R440, to battery. The + conductor C494 is connected by way of the lower left-hand winding of the repeating coil 490, contacts 454 and the lower winding of the line relay R440, to ground. The line relay R440 operates when the above mentioned loop circuit is completed and prepares the ticketer 700 to respond to subsequent impulses repeated over the toll line TL811 by the contacts 951 on the line relay R950 in the ticket repeater 900.

Also at the time the allotter 815 and its rotary switch 816 selects the ticketer 700, a circuit including the C conductor C496 (Fig. 2) is completed for operating the control relay R260 to further condition the ticketer 700 for subsequent operation and the conductors C495 (Fig. 4) and C497 (Fig. 2) are connected by way of the rotary switch 816 to the allotter 815 for holding the ticketer 700 associated with the rotary switch 816, the allotter 815 and the trunk repeater 810. Further operations of the ticketer 700 in response to impulses of digits repeated by the line relay R950 in the ticket repeater 900 will be described following the description of the operation of the ticket repeater 900 under control of the remaining digits dialed by the calling subscriber.

As a further result of the operation of the line relay R950 in the ticket repeater 900, at its contacts 952, it completes an obvious circuit for operating the hold relay R1020. The latter relay upon operating, at its contacts 1021, completes a circuit for retaining the hold relay R1030 in its operated position. In this connection it should be noted that the hold relay R1030 is of the slow-to-release type and, consequently, does not have sufficient itme to restore to normal between the opening of its original circuit at the contacts 971 upon the restoration of the local line relay R970 and the closing of the circuit including the contacts 1021 by the operation of relay R1020. In other words, when the calling subscriber line is transferred from the circuit including the local line relay R970 to the line relay R950, the slow-to-release relay R1030 does not have time to restore before it is re-energized and held operated under control of the contacts 1021.

As a further result of the operation of relay R1020, at its contacts 1022, it prepares a point in the pulsing circuit whereby the three digits of the calling subscriber number, as dialed by the calling subscriber, will be successively registered in the registers 1170, 1180 and 1190. At the present time, the relays R910, R920, R930, R950, R960, R1020, R1030, R1230, R1225, R1220, R1215 and R1210 in the ticket repeater 900 are in their operated positions and the 0 register 915 has its wipers in engagement with the contacts 10 in the associated contact banks.

Since the present call is being extended from a calling station in the remote exchange C to a called station in the central exchange B, the next three digits dialed by the calling subscriber are the digits of the calling subscriber directory number. The calling subscriber now dials the hundreds digit 2 of his own directory number to the line relay R950, whereupon, the latter relay restores and reoperates two times in accordance with the two impulses of the digit 2. The first time the line relay R950 restores to normal it completes, at its contacts 953, a circuit including the contacts 1022 and 1131 for operating the magnet M1171. Also, in multiple therewith, a circuit is completed for operating the slow-to-release step relay R1160. At its contacts 1162, the step relay R1160 completes a circuit including the contacts 1133 for operating the transfer relay R1135. As soon as the relay R1135 operates it prepares, at its contacts 1136, a circuit for subsequently operating the transfer relay R1130 in series with the relay R1135. However, as long as the initial operating ground potential for the relay R1135 is retained at the contacts 1162, the relay R1130 is shunted and prevented from operating by the ground potential maintained on the locking conductor C1205.

At the end of the first impulse of the digit 2 dialed by the calling subscriber the line relay R950 reoperates and interrupts the circuit for the magnet M1171 and the step relay R1160. The relay R1160, being of the slow-to-release type, remains in its operated position for a short period but the magnet M1171 restores to normal and advances its wiper 1174 one step in a clockwise direction into engagement with the bank contact 1.

In response to the second impulse of the digit 2 dialed by the calling subscriber, the line relay R950 again momentarily restores to normal and completes, at its contacts 953, the above traced circuit for reoperating the magnet M1171 and for retaining the slow-to-release step relay R1160 in its operated position. At the end of the second impulse, the line relay R950 reoperates and thereby interrupts the circuit for the magnet M1171 and the step relay R1160. As soon as the magnet M1171 restores the second time it advances its wiper 1174 an additional step into engagement with the contact 2 in the associated bank. During the interdigital pause between the transmission of the hundreds digit 2 of the calling station directory number, the line relay R950 is retained in its operated position for a sufficient time interval to permit the slow-to-release step relay R1160 to restore to normal. Consequently, the ground potential at the contacts 1162 is disconnected from the circuit including the winding of the relay R1135 thereby to permit the relay R1135 to lock in its operated position over the circuit including its contacts 1136, the winding of the relay R1130 and the grounded locking conductor C1205. Since the shunt circuit is now removed from the winding of the relay R1130, the relay now operates and prepares, at its contacts 1134, a point in the circuit for the transfer relay R1145 and, at its contacts 1131 and 1132, it transfers the previously described impulsing circuit for the magnet M1171 to the magnet M1181.

It may be well to mention at this time that the magnet M1171 has advanced its wiper 1174 into engagemennt with the bank contact 2 to register the hundreds digit 2 in the calling line hundreds digit register 1170 and the line relay R950, at its contacts 951, has repeated two impulses corresponding to the digit 2 over the toll line TL811 to the trunk repeater 810 in the central exchange B.

The calling subscriber now dials the tens digit 5 of his directory number. Consequently, the line relay R950 will restore and reoperate five times in order to repeat, at its contacts 953, five impulses over the circuit including the contacts 1022 to the step relay R1160 and, in multiple therewith, over a circuit including the contacts 1132 and 1141 to the winding of the magnet M1181. Also, at its contacts 951, the line relay R950 repeats five impulses corresponding to the digit 5 over the toll line TL811 to the trunk repeater 810 in the central exchange B.

The step relay R1160 operates in response to the first impulse transmitted thereto and is retained in its operated position throughout the period of time that the remaining impulses of the digit 5 are repeated by the line relay R950 to the magnet M1181. As soon as the step relay R1160 operates it completes, at its contacts 1162, a circuit which now includes contacts 1134 and 1143 for operating the transfer relay R1145. In response to the five impulses transmitted to the magnet M1181, the wiper 1184 is advanced step-by-step in a clockwise direction into engagement with the contact 5 in the associated contact bank, thereby to register the digit 5 in the calling line tens digit register 1180.

During the interdigital pause between the transmission of the digit 5 and the next digit of the calling station number, the line relay R950 remains in its operated position and thereby permits the slow-to-release step relay R1160 to restore to normal. Consequently, the contacts 1162 are again opened in order to interrupt the initial circuit for the transfer relay R1145. The relay R1145 remains in its operated position over a locking circuit which includes its contacts 1146, the winding of the transfer relay R1145 and ground potential on the locking conductor C1205. As soon as the above mentioned locking circuit is completed for the relay R1145, the relay R1140 operates in series therewith and prepares, at its contacts 1144, a point in the circuit for operating the transfer relay R1155. Also, at its contacts 1141 and 1142, the relay R1140 disconnects the magnet M1181 from the impulsing circuit including the contacts 953 and it connects the magnet M1191 to the impulsing circuit.

The calling subscribed now dials the units digit 3 of his directory number to the line relay R950. The relay R950 restores and reoperates three times in accordance with the three impulses of the digit 3 dialed by the calling subscriber and, at its contacts 953, repeats three impulses to the step relay R1160 and to the magnet M1191. In response to the first impulse of the digit 3 the step relay R1160 operates and it remains in its operated position during the time the remaining impulses of the digit 3 are repeated to the magnet M1191. As soon as the relay R1160 operates it completes, at its contacts 1162, a circuit including the contacts 1134, 1144 and 1152 for operating the transfer relay R1155. Upon operating the relay R1155 prepares at its contacts 1158, a point in the circuit for the upper winding of the calling number register relay R1040. However, the last mentioned circuit will not be completed until after the step relay R1160 subsequently restores to normal. As a further result of the operation of relay R1155, at its contacts 1156, it prepares a point in the circuit for locking itself in series with the relay R1150. Finally, at its contacts 1157, the relay R1155 completes a circuit including the grounded locking conductor C1205 and the winding of the slow-to-operate control relay R1050.

Also, at the contacts 953, the line relay R950 repeats the three impulses of the digit 3 by way of the contacts 1022, 1132, 1142 and 1151 to the winding of the magnet M1191. The magnet M1191 operates and restores three times and advances its wipers 1194 into engagement with the contact 3 in the associated contact bank. At the contacts 951, the line relay R950 repeats three impulses corresponding to the digit 3 over the toll line TL811 to the trunk repeater 810 in the central exchange B.

During the interdigital pause following the dialing of the units digit 3 of the calling station directory number, the line relay R950 remains in its operated position thereby to permit the slow-to-release step relay R1160 to again restore to normal. At its contacts 1162, the relay R1160 removes the initial operating ground potential from the winding of the relay R1155 so that this relay may now lock itself by way of its contacts 1156 in series with the relay R1150 to the grounded locking conductor C1205. The relay R1150 operates in series with the relay R1155 and, at its contacts 1152, interrupts a point in the initial operating circuit for the relay R1155 and, at its contacts 1151, it disconnects the previously described impulsing circuit from the magnet M1191. As a further result of the restoration of the step relay R1160, at its contacts 1161, it completes a circuit for operating the calling number register relay R1040. This circuit includes ground potential applied to the conductor PTY.3 at the contacts 1232, contact 3 engaged by the wiper 1194 of the register 1190, contacts 1161 and 1158 and the upper winding of the calling number register relay R1040, and battery.

It will be recalled from the previous description of the operation of the party line station identifying register 1201 that all of the relays therein have been operated by the ground pulses transmitted by the calling device at station 3 on the party line having the directory number 253. Since the calling subscriber has correctly dialed the last digit 3 of his number, the wiper 1194 of the digit register 1190 engages the contact 3 that has been grounded over the conductor PTY.3 by the operated condition of all of the relays in the station identifying register 1201. As long as the subscriber accurately dials the last digit of his number and this digit corresponds to the operated condition of the party identifying register 1201, the calling number register relay R1040 will operate at this time. If the match is not accurately made between the operated condition of the station identifying register 1201 and the position of the wiper 1194 on the register 1190 the relay R1040 will not operate.

At the present time the three digits 253 of the calling subscriber number, as dialed by the calling subscriber, are registered respectively in the calling line hundreds digit register 1170, the calling line tens digit register 1180 and the calling station digit register 1190. Also, the line relay R950, at its contacts 951, has repeated impulses corresponding to the digits 253 over the toll line TL811 to the trunk repeater 810 in the central exchange B.

In the above description it was pointed out that the transfer relay R1155 operated in response to the first pulse of the units digit 3 of the calling number transmitted to the step relay R1160 and the magnet M1191 and that the operated condition of the relay R1155 completed a circuit for the slow-to-operate control relay R1050. It was also pointed out that during the interdigital pause following the last impulse of the digit 3 transmitted to the relay R1160 and the magnet M1191, the relay R1160 restored to normal and completed, at its contacts 1161, a circuit for operating the calling number register relay R1040. Normally, the calling number register relay R1040 will be operated before the slow-to-operate relay R1050 closes its contacts 1051. The timed relationship between relays R1040 and R1050 is such that a fault condition will be transmitted to the fault relay R1185 and the alarm lamp L996 if the digit register 1190 fails to engage a grounded contact in the associated contact bank. In other words, if the calling subscriber does not dial the last digit of his number, or dials a digit that does not check with the operated condition of the station identifying register 1201, the calling number register relay R1040 will fail to operate. Therefore, when the control relay R1050 closes its contacts 1051, ground potential at the contacts 1035 will be connected by way of the contacts 1051 and 1042 to illuminate the alarm lamp L996 and to operate the fault relay R985. Thus, a signal will be given to the exchange attendant that a fault has occurred in the checking of the last digit dialed by the calling subscriber and the operated condition of the station identifying register 1201. As previously indicated, the relay R985 upon operating, completes a circuit for the relay R990 and the latter relay transmits a busy tone signal to the calling subscriber, at its contacts 991, and, at its contacts 992, it short circuits the impulsing contacts 951 to prevent the line relay R950 from repeating additional impulses over the toll line TL811.

If the calling number register relay R1040 operates, and locks itself in its operated condition over a circuit including its contacts 1041 and the locking conductor C1205, it will open its contacts 1042 to prevent the subsequent operation of the control relay R1050 from completing the above described circuit for the fault relay R985 and the alarm lamp L996. As a further result of the operation of the relay R1040, at its contacts 1043, it completes the circuit including contacts 1062, the winding of the start relay R1070 and ground at contacts 1083. The start relay R1070 now operates and applies ground potential to the start conductor C1264 extending to the allotter 1270. Also, at its contacts 1072, the start relay R1070 removes ground potential from the guard conductor C1265 in order to mark the ticket repeater 900 as the calling ticket repeater to the allotter 1270.

Referring to the allotter 1270 (Fig. 12) it will be seen that the start conductor C1264 is connected to the winding of the start relay R1240 and it should be understood that this conductor is multiply connected to corresponding start conductors extending to all of the other ticket repeaters provided in exchange C. The guard conductor C1265 is connected to the contact 1 accessible to the wiper 1274 and the remaining contacts accessible to this wiper are connected to corresponding guard conductors provided in the remaining ticket repeaters in exchange C. As soon as the start relay R1240 operates, at its contacts 1241, it completes a circuit for connecting the winding of the test relay R1250 to the winding of the magnet M1271 and, at its contacts 1242, it completes a circuit for connecting the wiper 1274 to the magnet M1271 and to the test relay R1250.

At the present time the wiper 1274 is in engagement with the grounded contact 11 in the associated contact bank and, consequently, a circuit is completed by way of the contacts 1242, 1251, 1262 and 1272 and the winding of the magnet M1271, to battery. This ground potential short circuits the winding of the test relay R1250. The magnet M1271 now operates and, at its contact 1272, interrupts its operating circuit and restores to normal. As a result of the restoration of the magnet M1271, the wipers 1273 and 1274 are advanced one step in a counterclockwise into engagement with the contacts 1 in the associated contact banks.

In the present example, the ground potential has been removed from the guard conductor C1265 so that as soon as the wiper 1274 engages contact 1 the short circuit is removed from the test relay R1250 and the operating ground potential is accordingly removed from the winding of the magnet M1271. The test relay R1250 now operates over a circuit including ground, the winding of the relay R1250, contacts 1261, 1241, and 1272 and the winding of the magnet M1271, to battery. Due to the high resistance of the winding of the relay R1250, the magnet M1271 does not operate in series with the relay R1250 but the latter relay now operates and, at its contacts 1251, disconnects the magnet M1271 and the winding of relay R1250 from the wiper 1274. As a further result of the operation of relay R1250, at its contacts 1252, it connects the grounded winding of the control relay R1260 by way of the wiper 1273 in engagement with the contact 1, hold conductor C1260, contacts 1123 and 1082 and the winding of the hold relay R1060, to battery. At this time the control relay R1260 and the hold relay R1060 operate in series.

As soon as the control relay R1260 operates, it completes, at its X contacts 1263, a multiple circuit, whereby, the relay is held in its operated position in series with the hold relay R1060 over a circuit which is independent of the contacts 1252. As a further result of the operation of relay R1260, at its contacts 1261, it interrupts the above mentioned circuit including the winding of the relay R1250 and the magnet M1271 hereby to restore the relay R1250 and, at its contacts 1262, it disconnects the circuit including the winding of the magnet M1271 from the wiper 1274.

Before describing the operations controlled by the relay R1060, it should be noted that when the magnet M1271 is initially connected to the wiper 1274 by the operation of the start relay R1240, the magnet will be self-interruptedly restored and reoperated as the wipers 1273 and 1274 are advanced step-by-step over the associated bank contacts until the wiper 1274 engages an ungrounded contact. In other words, the allotter 1270 will be controlled to find a ticket repeater that has removed ground potential from the associated contact in the bank accessible to the wiper 1274. It should also be understood that the allotter 1270 will not search for an additional ticket repeater, after a calling ticket repeater has been found, until the control relay R1260 is subsequently restored to normal, even though the start relay R1240 is held in its operated position from a second or an additional calling ticket repeater.

Referring now to the hold relay R1060 in the ticket repeater 900, it will be seen that as soon as this relay operates, as described above, it interrupts, at its contacts 1062, the circuit for the start relay R1070 which now restores to normal. Upon restoring, the relay R1070 removes the ground potential, at the contacts 1071, from the start conductor C1264 to permit the start relay R1240 to restore, in the event no other calling ticket repeater has grounded the conductor C1264. Also, at its contacts 1072, the relay R1070 applies ground potential to the guard conductor C1265 in order to mark the ticket repeater 900 busy to the allotter 1270.

As a further result of the operation of the relay R1060, at its contacts 1061, it completes an obvious multiple circuit for operating the verification signal relay R1015 and the verification connect relay R1125. The verification signal relay R1015 is provided to transmit a pulse of +70 volt current from the battery 1013 over the C conductor C907 to the calling subscriber line and the verification connect relay R1125 is provided to connect the conductors C1 to C20, inclusive, in the cable C1327 to the bank contacts accessible to the wiper 1174 and 1184 so that the calling line verifier 1301 may be selectively operated in accordance with the hundreds digit 2 and the tens digit 5 of the calling subscriber number 253 as registered in the digit registers 1170 and 1180. The operation of the calling line verifier 1301 will now be described.

*Operation of the calling line verifier 1301*

The calling line verifier 1301 illustrated in Fig. 13 includes ten hundreds digit relays corresponding respectively to the ten hundreds digits 1 to 9 and 0 of the calling station directory numbers in exchange C. The hundreds digit relays 2 and 5 have been illustrated and they are respectively common to all of the subscriber stations having the first digit 2 and the first digit 5. Each hundreds digit relay in the calling line verifier 1301 is connected to the corresponding conductor C1 to C10, inclusive, which terminate respectively in the contacts 1 to 10, inclusive, accessible to the wiper 1193 on the calling line hundreds digit register 1170. These conductors are also multiply connected to all of the other ticketer repeaters in the exchange C so that any one of the ticketer repeaters in the exchange C so that any one of the ticket repeaters may be connected to the comon calling line vertifier 1301 when the verifier connect relay, such as the relay R1125, in the respective repeaters are operated.

Each of the ten hundreds digit relays in the calling line verifier 1301 is provided with ten sets of make contacts designated 1 to 10, inclusive, which are connected in common to the respective conductors C11 to C20, inclusive, terminating respectively in the bank contacts 1 to 10, inclusive, accessible to the wiper 1184 of the calling line tens digit register 1180. The armature spring of each of the contacts 1 to 10 on each of the ten relays of the calling line verifier 1301 is connected to the C conductor of the subscriber line in exchange C having the corresponding hundreds and tens digits in the directory number.

More specifically, the hundreds digit relay 2 when operated will connect the C11 conductor by way of the make contact 1 to the C conductor of the subscriber line 21X; conductor C15 will be connected through the make contact 5 to the C conductor of the subscriber line 25X; and the conductor C20 will be connected by way of the contact 10 to the C conductor of the subscriber line 20X. The designation X included in the above noted subscriber station numbers is indicative of the particular station identifying digit (1 to 5) on the associated subscriber line.

In the present description, the call was originated by the subscriber at station 3 on the party line having the directory number 253. As previously described, the calling subscriber has dialed the digits 253 and they have been registered respectively in the digit registers 1170, 1180 and 1190. As a result of the registration of the units digit 3 of the calling number in the digit register 1190, the ticket repeater 900 controlled the allotter 1270 to associate itself with the ticket repeater 900 in order to operate the hold relay R1160 and to operate both the verifier signal relay R1050 and the verifier connect relay R1125. As soon as the verifier connect relay R1125 operates, it connects the contacts 1 to 10, inclusive, accessible to the wiper 1174 to the C1 to C10 conductors in the cable C1327. Also, the relay R1125, at its contacts 11 to 20, inclusive, connects the bank contacts 1 to 10, accessible to the wiper 1184 to the C11 to C20 conductors in the cable C1327.

Since the hundreds digit 2 of the calling station number 253 is registered in the hundreds digit register 1170, the wiper 1174 will be in engagement with the bank contact 2. Also, since the tens digit 5 of the calling station number 253 is registered in the tens digit register 1180, the wiper 1184 will be in engagement with the bank contact 5. Consequently, a circuit will now be completed for operating the hundreds digit relay 2 in the calling line verifier 1301. This circuit may be traced from ground at the contacts 942 on the restored pulse control relay R940, wiper 1174 of the digit register 1170 in engagement with the bank contact 2, contact 2 on the operated verifier connect relay R1125 conductor C2 in the cable C1327 and the winding of the hundreds digit relay 2 (Fig. 13), to battery. The relay 2 now operates and closes its contacts 1 to 10, inclusive, thereby to connect the C11 to C19 and C20 conductors to the C conductors of the subscriber line having the numbers 21 to 29, inclusive, and 20 as the first two digits of the directory number.

At the same time the vertifier connect relay R1125 completes the above traced circuit for operating the hundreds digit relay 2 in the calling line vertifier 1301, the verification signal relay R1015, at its contacts 1016 completes a circuit including the contacts 1066 and 1091 for energizing the slow-to-operate vertification failure relay R1120. If the proper verification is made of the calling subscriber line, the circuit for the verification failure relay R1120 will be interrupted by the relay R1065 before the relay R1120 has had sufficient time to fully operate.

As a further result of the operation of the verification signal relay R1015, at its contacts 1017 and 1018, it substitutes +70 volt battery for the direct ground potential applied to the C conductor C907 extending back to the calling subscriber line circuit 1315. The ground potential on the C conductor C907, as previously described, maintains the local connector 1319, the line finder 1318 and the line circuit 1315 in their operated positions and it applies ground potential to the C conductor C1315C in order to mark the calling subscriber line 25X busy to all of the local connectors in the exchange C having access thereto. As soon as the +70 volt battery 1013 is connected by way of the resistor 1019, contacts 1018, 1031 and 1011 to the C conductor C907, in place of the direct ground potential, it also maintains the local connector 1319, the line finder 1318 and the line circuit 1315 in their operated positions and it also maintains a busy marking potential on the C conductor C1315C extending to the bank contacts of all of the connectors in the exchange C having access to the calling subscriber line. The C conductor C1315C is also multiply connected to the contact 5 of the operated hundreds digit relay 2 in the verifier 1301 and then by way of the conductor C15 in the cable C1327, contact 15 of the operated verifier connect relay R1125, bank contact 5 engaged by the wiper 1184, winding of the verification check relay R1065 and the resistor 1063 to the − terminal of the 50 volt exchange battery. It may be well to mention at this time that throughout the drawings, the small circle with the — symbol indicates the — (negative) terminal of a regular 50 volt exchange battery and the ground symbol, represented by three or more graduated closely-spaced parallel lines, indicates the + (positive) terminal of the 50 volt exchange battery. The verification check relay R1065 operates over the above traced circuit in response to the application of the + 70 volt battery potential to the C conductor C1315C of the calling line but it should be noted that it will not operate when the direct ground potential is connected to this conductor.

As soon as the verification check relay R1065 operates it interrupts, at its contacts 1066, the previously traced circuit for energizing the verification failure relay R1120. Due to the slow-to-operate characteristics of the relay R1120, it normally does not have sufficient time to operate before the verification check relay R1065 is operated as described above. However, if the verification check relay R1065 fails to operate, for example, due to the fact that the subscriber has inadvertently dialed the digits of some other subscriber number, the verification failure relay R1120 will have sufficient time to operate and it will lock itself in its operated position. The locking circuit for the relay R1120 includes contacts 1091 and 1121 and the grounded locking conductor C1205. As a further result of the operation of the relay R1120, at its contacts 1122, a circuit including the grounded locking conductor C1205 will be completed for illuminating the alarm lamp L996 and for operating the fault relay R985. The latter relay, at its contacts 986, will complete the circuit for operating the failure relay R990 and, at its contacts 992, the relay R990 will short circuit the impulsing contacts 991 on the line relay R950 thereby to prevent subsequent digits dialed by the calling subscriber from being repeated over the toll line TL811. The illuminated condition of the lamp L996 will indicate to the exchange attendant that the ticket repeater 900 has failed to verify the number of the calling subscriber line as dialed by the calling subscriber.

It will be assumed in the present call that the verification check relay R1065 operates to interrupt, at its contacts 1066, the energizing circuit for the verification failure relay R1120 thereby to prevent the latter relay from operating to transmit the above described fault alarm. As a further result of the operation of the verification check relay R1065, at its contacts 1067, it completes a circuit including ground at the contacts 1016 for operating the verification complete relay R1080. The latter relay upon operating locks itself by way of its contacts 1081 and its lower winding to the grounded locking conductor C1205. As soon as the above mentioned locking circuit is completed, at the contacts 1081, ground potential on the locking conductor C1205 is also extended by way of the contacts 1081 to the winding of the control relay R1090. This relay now operates and, at its contacts 1091, disconnects the winding of the vertification failure relay R1120 from the contacts 1066 of the verification check relay R1065. Consequently, when the verification check relay R1065 subsequently restores to normal it cannot inadvertently complete an operating circuit for the verification failure relay R1020. As a further result of the operation of the relay R1080, at its contacts 1082, it interrupts the previously described series circuit including the winding of the hold relay R1060 in the ticket repeater 900 and the winding of the control relay R1260 in the alotter 1270.

Referring now to the allotter 1270, it will be seen that when the series circuit for the relay R1260 is interrupted, the relay restores to normal and, at its contacts 1261 and 1262, prepares points in the circuits for the test relay R1250 and the magnet M1271 so that the allotter may now search for another calling toll ticket repeater. In other words, if the start relay R1240 is retained in its operated condition under control of another ticket repeater, it will complete, at its contacts 1241 and 1242, the previously described circuits for connecting the wiper 1274 to the circuit including the test relay R1250 and the magnet M1271. Since the wiper 1274 is now in engagement with the contact 1, terminating in the ticket repeater 900, the ground potential applied to the guard conductor C1261 by the contacts 1072 on the restored start relay R1070 is extended by way of the wiper 1274, contacts 1242, 1251, 1262 and 1272 to the winding of the magnet M1271. The magnet now operates and restores in the manner previously described to advance its wipers 1273 and 1274 until the wiper 1274 engages the ungrounded bank contact terminating the guard conductor of another calling ticket repeater. Thus, the allotter 1270 is automatically controlled as soon as the ticket repeater 900 has verified the number of the calling subscriber line that has been registered in the ticket repeater 900 so that another ticket repeater may be utilized to verify the number of calling line that has been registered in the last mentioned ticket repeater.

Referring again to the hold relay R1060, it will be seen that as soon as this relay restores to normal, in response to the operation of the verification complete relay R1080, it prepares, at its contacts 1062, a point in the incomplete circuit for the start relay R1070. The latter circuit is now interrupted at the contacts 1083 of the operated relay R1080. As a further result of the restoration of the hold relay R1060, at its contacts 1061, it interrupts the circuit for the verification signal relay R1015 and the verification connect relay R1125. As soon as the relay R1015 restores to normal it again reapplies the direct ground potential at the contacts 1017, in place of the +70 volt battery 1013, to the C conductor C907 thereby to retain the local connector 1319, the line finder 1318 and the line circuit 1315 in their operated positions and to maintain a busy marking ground potential on the C conductor C1315C as previously noted.

As soon as the verification connect relay R1125 restores to normal, as noted above, it disconnects conductors C1 to C10, inclusive, in the cable C1327 from the bank contacts of the hundreds digit register 1170 and it disconnects the conductors C11 to C20, inclusive, in the cable C1327 from the tens digit register 1180. Accordingly, the operated hundreds digit relay 2 in the calling line verifier 1301 now restores to normal and, at its contacts 5, the latter relay disconnects the grounded C conductor C1315C of the calling party line 25X from the conductor C15. As a result of the restoration of both the verification connect relay R1125 and the restoration of the hundreds digit relay 2 in the calling line verifier 1301, the verification check relay R1065 will restore to normal, if it has not previously restored in response to the substitution of the direct ground potential for the +70 volt battery potential on the C conductor C1315C of the calling subscriber line.

*Dialing the remaining digits of the called number into the ticket repeater 900*

In the description of the operation of the system thus far, it has been assumed that the calling subscriber at station 3, having the directory number 253, has dialed the digit 9 to select the ticket repeater 900, has then dialed the digit 0 into the ticket repeater 900 and registered the same in the 0 register 915, and has then dialed the digits 253 corresponding to the directory number of the calling station into the respective digit registers 1170, 1180 and 1190 in the ticket repeater 900. Impulses corresponding to the digits 253 have been repeated over the toll line TL811 to the central exchange B by the contacts 951 on the line relay R950 in the ticket repeater 900. It should be noted, however, that the impulses of the digit 0, which have been registered in the ticket repeater 900, have not been repeated over the toll line TL811.

Following the interdigital pause between the transmission of the units digit 3 of the calling subscriber number 253, the calling subscriber will then dial the digit 4 identifying the called central exchange B and then the digits 4774 of the directory number of the called subscriber in the central exchange B. Consequently, impulses corresponding to the digit 4 of the called exchange B and the impulses of the digits 4774 corresponding to the directory number of the called subscriber station will be repeated by the contacts 951 of the line relay R950 over the toll line TL811 to the central exchange B as they are dialed by the calling subscriber. It may be well to mention at this time, however, that the control of the line relay R950 to repeat the impulses over the toll line TL811 may take place at the same time that the ticket repeater 900, the allotter 1270 and the calling line verifier 1301 are co-operating to verify the digits of the directory number dialed by the calling subscriber and registered in the ticket repeater 900. It should be further understood, that the verification operation will be started during the interdigital pause between the dialing of the units digit 3 of the calling subscriber number 253 and the dialing of the digit 4 identifying the called central exchange B. However, even if the verification is not completed before the dialing of the digit 4 noted above, the operation of the ticket repeater 900 to repeat the impulses of the digit 4 and the remaining digits of the called subscriber directory number will not interfere with the above described verification operation of the ticket repeater 900.

*Operation of the ticketer 700 in response to a call from exchange C*

In the above description of the operation of the ticket repeater 900 in the present call, it was pointed out that the trunk repeater 810 in the central exchange B was seized over the toll line TL811 at the time the line relay R950 operated. In this connection it will be recalled that the line relay R950 operated immediately after the second dialed digit 0 was registered in the ticket repeater 900. It was also pointed out in the foregoing description that the trunk repeater 810, the allotter 815 and the associated rotary switch 816 extended the call on the toll line TL811 to the ticketer 700 and caused the operation of the line relay R440 and the control relay R260 therein. Thus, in response to the seizure of the toll line TL811 by the ticket repeater 900, the trunk repeater 810 and the ticketer 700 are conditioned to respond to the impulses of the different digits repeated over the toll line TL811 by the line relay R950 in the ticket repeater 900.

As soon as the line relay R440 in the ticketer 700 operates as noted above, it completes, at its contacts 443, a circuit for operating the hold relay R410 and it completes, at its contacts 441, a loop circuit for seizing the associated trunk selector 801. The hold relay R410 upon operating completes an obvious circuit, at its contacts 413, for operating the control relay R250 and, at its contacts 411, it applies ground potential to the hold conductor C495 extending to Fig. 8 thereby to hold the rotary switch 816, the allotter 815 and the trunk repeater 810 in their operated positions in a conventional manner.

The control relay R250 upon operating, removes ground potential, at its contacts 251, from the wiper 706 on the storage transfer switch 701 and, at its contacts 252, it applies the ground potential at the contacts 161 to the C conductor C416 in the cable C123 in order to mark the ticketer 700 busy to the selectors, such as the first selector 122, in the central exchange B having access to the ticketer 700. As a further result of the operation of the control relay R250, at its contacts 253, it applies ground potential to the C conductor C497 extending to Fig. 8 thereby to mark the ticketer 700 busy to the rotary switches, such as the rotary switch 816, and the allotter 815 having access thereto. In other words, the conductor C497 is grounded to prevent another call from the exchange C to the exchange B from selecting the ticketer 700 which is busy in the present call. Finally, at its contacts 254, the relay R250 completes an obvious circuit for operating the hold slave relay R480 and, at its contacts 255, it prepares a point in a circuit for transmitting the time pulses on the conductor C614 to the conversation timer 635. Incident to the operation of the hold slave relay R480, as noted above, a circuit is completed, at its contacts 481, for operating the control relay R610.

Referring now to the control relay R610, it will be seen that, at its contacts 612, it completes an obvious circuit for operating the release relay R460. The relay R460 in turn, at its contacts 466, applies ground potential to the locking conductor C486 and, at its contacts 465, it completes a pre-energizing circuit for the lower winding of the polarized answer relay R270, but the latter relay does not operate at this time.

From the foregoing, it will be understood that as soon as the line relay R440 in the ticketer 700 operates incident to seizure, the relays R410, R250, R480, R610 and R460 operate in sequence in the order named. As a further result of the seizure of the ticketer 700, the control relay R260 is operated, as noted above, over the conductor C496 by the allotter 815. At its contacts 262, the relay R260 interrupts a point in the circuit of the seize relay R650 thereby to prevent the operation of the latter relay when the control relay R250 operates, as noted above. Also, at its contacts 261, the control relay R260 completes a multiple loop circuit for seizing the trunk selector 801 associated with the ticketer 700. This multiple loop circuit may be traced from the − conductor C491, upper right-hand winding of the repeating coil 490, upper winding of the polarized answer relay R270, resistor 272 and then over a first branch including contacts 441, 472, lower right-hand winding of the repeating coil 490 and the + conductor C492 and (in multiple thereof) over a second branch including the resistor 272, contacts 371, 261, 472, lower right-hand winding of the repeating coil 490 and the + conductor C492. Thus, in the first branch circuit, the loop circuit extending to the trunk selector 801 over the conductors C491 and C492 includes contacts 441 on the line relay R440 and in the second branch circuit the contacts 441 are short-circuited. Since the trunk selector 801 is of conventional construction and arrangement, it returns battery and ground potential through a line relay (not shown) to the − and + conductors C491 and C492 to the upper winding of the polarized answer relay R270. The current flow over this loop circuit, however, is in such a direction that the polarized relay R270 does not operate even though the pre-energizing circuit is completed for its lower winding.

The ticketer 700 is now in condition to respond to the impulses of each of the digits transmitted over the toll line TL811 by the contacts 951 on the line relay R950 in the ticket repeater 900 in the remote exchange C. It will be recalled that the first digit repeated over the toll line TL811 by the line relay R950 is the hundreds digit 2 of the calling station number 253, as dialed by the calling subscriber. In the ticketer 700, the line relay R440 will restore and reoperate two times in accordance with the two impulses of the digit 2 in the manner previously explained. Upon the first restoration, the relay R440 completes, at its contacts 442, a circuit including contacts 456, 412 and 474 for operating the pulse control relay R485 and as soon as the latter relay operates and closes its contacts 487, a further circuit is completed, including the contacts 641 and 653 and the wiper 504 for operating the magnet M511 of the hundreds digit calling number register 510. At the end of the first impulse of the digit 2, the magnet M511 restores to normal to advance its wipers 515 and 516 one step into engagement with the contacts 1 but the pulse control relay R485, due to its slow-to-release characteristics, remains operated.

As a further result of the operation of the pulse control relay R485, at its contacts 489, it completes a circuit for operating the control relay R590 and, in multiple therewith, it completes a circuit including the contacts 263 for operating the magnet M505 of the receive sequence switch 501. The magnet M511 of the hundreds digit calling number register 510 restores to normal, as noted above, at the end of the first impulse and advances its wipers 515 and 516 one step in a clockwise direction.

The line relay R440 now responds to the second impulse of the digit 2 and transmits an additional impulse, at its contacts 442, to the pulse control relay R485 and the magnet M511. Consequently, the magnet M511 advances its wipers 515 and 516 an additional step into engagement with the contacts 2 in the associated contact banks in order to mark the WXYZ22 conductors in the cable C519 in code form in accordance with the digit 2. During the interdigital pause between the transmission of the digit 2 and the digit 5 of the calling subscriber number 253 as dialed by the calling subscriber in exchange C, the line relay R440 remains in its operated position. During this interdigital pause, the slow-to-release pulse control relay R485 restores to normal and, at its contacts 489, interrupts the circuit for the magnet M505 which magnet now restores to normal and advances the wipers 502 to 504, inclusive, of the receive sequence switch 501 one step in a counterclockwise direction so that the wiper 504 selects the tens digit calling number register 520.

The line relay R440 now responds to the five impulses of the digit 5 repeated over the toll line TL811 and thereby controls the pulse control relay R485 and the magnet (not shown) in the tens digit calling number register 520. Accordingly, the digit 5 is registered in the register 520 in the same manner as the digit 2 was registered in the register 510. Consequently, the register 520 will mark the WXYZ21 conductors in the cable C529 in code form in accordance with the digit 5. During the interdigital pause between the transmission of the tens digit 5 and the units digit 3 of the calling subscriber number 253, the pulse control relay R485 again restores to normal and causes the magnet M505 to advance its wipers an additional step into engagement with the contacts 2 in the associated contact banks. Thus, the wiper 504 of the receive sequence switch 501 selects the units digit calling number register 530.

In response to the final digit 3 of the calling number 253, as dialed by the calling subscriber in exchange C, the line relay R440 again controls the pulse control relay R485 and transmits three impulses to the tens digit calling number register 530, in the manner previously described. The register 530 is exactly the same as the register 510 and it will mark the WXYZ20 conductors in the cable C539 in code form in accordance with the digit 3. During the interdigital pause following the dialing of the tens digit 3, the line relay R440 remains in its operated position and the pulse control relay R485 restores to normal in order again to cause the magnet M505 to advance its wipers into engagement with the contacts 3 in the associated contact banks.

As soon as the wiper 502 of the receive sequence switch 501 engages the contact 3 or any one of the remaining contacts in the associated contact banks, the control relay R370 is operated and opens its contacts 371. At this point it should be noted that the control relay R370 remains in its restored position during the time the wiper 502 is in engagement with the home contact and the contacts 1 and 2 in the associated contact bank. The contacts 371 short-circuit the contacts 441 so that the latter contacts are rendered ineffective during the time that the calling number is registered in the registers 510, 520 and 530. As soon as the relay R370 opens its contacts 371, the short-circuit around the contacts 441 is removed so that the latter contacts may now repeat impulses to the trunk selector 801 corresponding to the remaining digits dialed by the calling subscriber in exchange C.

The next digit repeated over the toll line TL811 to the line relay R440, is the digit 4 identifying the called central exchange B. At the contacts 442, the line relay R440 completes the previously traced circuit for operating the pulse control relay R485 and for transmitting the first pulse of the digit 4 to the called office digit register 540. The remaining three impulses of the digit 4 are also repeated by the contacts 442 of the line relay R440 to the pulse control relay R485 and to the called office digit register 540. Since this register is exactly the same as the illustrated digit register 510, it will also mark the WXYZ16 conductors in the cable C549 in code form in accordance with the digit 4. At the contacts 441, the line relay R440 will also interrupt the loop circuit including the upper winding of the polarized answer relay R270, the right-hand windings of the repeating coil 490, the − and + conductors C491 and C492 and the line relay (not shown) in the trunk selector 801 so that the wipers of the latter selector are advanced step-by-step in a vertical direction to the fourth level. Thereafter, the trunk selector 801 automatically rotates its wipers over the selected fourth level in order to find and seize an idle incoming selector, such as the selector 802.

The calling subscriber in the remote exchange C now dials the digits 4774 corresponding to the number of the desired called station in the central exchange B. During the interdigital pause between the dialing of the called exchange digit 4 and each of the digits 4774 of the called number, the magnet M505 restores to normal to advance its wipers an additional step in order to select in sequence the thousands digit, hundreds digit, tens digit and units digit called number registers 550, 560, 570 and 580 so that the digits 4774 of the called station number are registered respectively therein.

At the conclusion of the dialing of the last digit 4 of the called station number 4774, the line relay R440 remains in its operated position, the pulse control relay R485 restores to normal and the magnet M505 restores to normal to advance the wipers 502 to 504, inclusive, into engagement with the contacts 8 in the associated contact banks. At this time the three digits of the calling station number 253 are registered respectively in the registers 510, 520 and 530; the called exchange digit 4 identifying the central exchange B is registered in the register 540; and, the four digits of the called station number 4774 are registered respectively in the registers 550, 560, 570 and 580. These digits are marked in code form on the WXYZ conductors in the respective cables C519, C529, C539, C549, C559, C569, C579, and C589, terminating in the bank contacts accessible to the wipers 702 to 705, inclusive, on the storage transfer switch 701.

As previously described, the line relay R440, at its contacts 441, repeats impulses corresponding to the digit 4 identifying the called central exchange B to the trunk selector 801 in order to select the incoming selector 802. Also, the thousands digit 4 of the called station number 4774, is repeated by the contacts 441 to the incoming selector 802 and the latter selector raises its wipers to the fourth level and rotates its wipers over the selected fourth level to search for and to seize an idle second selector, such as the second selector 803. The hundreds digit 7 of the called station number 4774, is then repeated by the contacts 441 in order to control the second selector 803 to raise its wipers to the seventh level and to rotate its wipers over the selected seventh level to search for and to seize an idle connector, such as the connector 804, having access to the 100 subscriber lines in the 700 group of lines. The tens digit 7 of the called station number 4774 is then repeated by the contacts 441 to the connector 804 in order to control the connector to raise its wipers to the seventh level. The units digit 4 of the called station number 4774 is then repeated by the contacts 441 in order to control the connector 804 to rotate its wipers four steps over the selected seventh level to select the contacts terminating the —, + and C conductors extending to the line circuit 120 (Fig. 1) of the called party line.

If the desired called party line connected to the line circuit 120 is busy, the C conductor thereof accessible to the connector 804 will be marked busy with a ground potential and will cause the connector to return a busy tone signal to the calling subscriber at the calling station 253 in the remote exchange C. However, if the called line is idle, the connector 804 will switch-through in a conventional manner and will transmit a ringing signal that will ring only the subscriber at station 4774 on the called party line.

When the called subscriber at station 4774 answers the call, a loop circuit including the line conductors C116 and C117 is completed back to the connectors 804 in order to terminate the transmission of the ringing current and to cause the connector 804 to reverse the current flow over the connection established between the ticketer 700 and the connector 804 in a conventional manner. Accordingly, the reversal of current flow back over the connection including the second selector 803, the incoming selector 802, the trunk selector 801 and the — and + conductors C491 and C492 in the ticketer 700 causes the polarized answer relay R270 to operate. The reversal of the current flow in the upper winding of the polarized answer relay R270 cause the relay now to operate due to the fact that the current flow is in the same direction as the current flow in the pre-energized lower winding of the relay. The operated condition of the relay R270 indicates to the ticketer 700 that the called party has answered the particular connection.

At the contacts 271, the relay R270 upon operating completes a circuit for operating the timer start relay R260 and the latter relay in turn locks itself to the grounded locking conductor C486 over a circuit including its lower winding and its contact 622. As a further result of the operation of the timer start relay R620, at its contacts 621, it completes a circuit including the off-normal contacts ON709, contacts 708 and the winding of the magnet M707, to battery. This magnet now operates and then immediately interrupts its own operating circuit at its contacts 701. The momentary operation and restoration of the magnet M707 causes the wipers 702 to 706, inclusive, of the storage transfer switch 701 to advance one step in a counterclockwise direction from the normal home contact position (illustrated) into engagement with the contacts 1. As soon as this step is taken by the wipers, the off-normal contacts ON709 are opened and the off-normal contacts ON710 are closed. Thus, the automatic stepping operation of the magnet M707 is interrupted as soon as the wipers are advanced from the home contact positions and the off-normal contacts ON709 will not be reclosed until the wipers again engage the home contact position.

As a further result of the operation of the timer start relay R620, it opens a point in the releasing circuit for the conversation timer 635 and the storage transfer switch 701, at its contacts 623, and, at its contacts 624, it completes a circuit whereby ground impulses on the conductor C614 at five second intervals are transmitted by way of the contacts 255 and 624 and the conductor C633 to the conversation timer 635. As previously noted, the conversation timer 635 has been schematically illustrated since it is of conventional construction and it should be understood that it accumulates the total elapsed time of the conversation and registers this time in accordance with the units, tens and hundreds digits indicative of the elapsed conversation time. The units digit is marked in code form on the WXYZ31 code marking conductors terminating in the contacts 7 accessible respectively to the wipers 702, 703, 704 and 705 in the storage transfer switch 701. At the end of every ten minutes, the tens digit is also marked in code form on the WXYZ32 code marking conductors terminating in the bank contact 8 accessible to the above noted wipers. At the end of every hundred minutes, the hundreds digit is marked in code form on the WXYZ33 code marking conductors terminating in the bank contacts 9 accessible to the above noted wipers. In this manner the conversation timer 635 will accumulate the elapsed conversation time and it will mark the code marking conductors WXYZ31, WXYZ32 and WXYZ33 in the cable C634 in accordance with the units, tens and hundreds digit of the registered time.

The calling subscriber at station 253 in the remote exchange C may continue to converse with the called subscriber at station 4774 in the central exchange B over the line conductors of the connection now established between the subscribers stations as described above. As soon as the conversation between the calling and called subscribers is terminated, they will replace their receivers on the switchhooks of the associated telephone instruments in order to release the switching apparatus involved in the telephone connection.

In response to the replacement of the receiver at the called station 4774 in the exchange B, the loop circuit including the line conductors C116 and C117 extending by way of the line circuit 120 to the connector 804 is interrupted and thereby causes the current flow back over the established connection to the upper winding of the polarized answer relay R270 in the ticketer 700 to again be reversed back to its original condition. This relay now restores to normal inasmuch as the current flow through its upper winding is in the opposite direction from the current flow through the lower winding of the relay. However, the line circuit 120, the connector 804, the second selector 803, the incoming selector 802 and the trunk selector 801 are held in their operated positions until the calling subscriber involved in the connection also replaces his receiver as will be described subsequently. When the polarized answer relay R270 restores to normal, it interrupts, at its contacts 271, a point in the energizing circuit for the upper winding of the timer start relay R620 but this relay remains in its operated position over the previously traced locking circuit including its lower winding. The conversation timer 635 will continue to record the conversation time until the calling subscriber has replaced his receiver on the associated switchhook.

Referring now to Fig. 14 it will be seen that when the calling subscriber at station 253 in exchange C replaces his receiver upon the switchhook upon the telephone instrument, the loop circuit including the line conductors C1309 and C1310 will be interrupted in a conventional manner. At the present time this loop circuit includes the line circuit 1315, line finder 1318, local connector 1319 and the — and + conductors C905 and C906 included in the cable C1326 extending to the ticket repeater 900. In the ticket repeater 900, the — and + conductors C905 and C906 in the cable C1326 (Fig. 9) are further extended to the upper and lower windings of the line relay R950. Therefore, when the loop circuit is interrupted by the replacement of the receiver of the calling station, the line relay R950 restores to normal and interrupts, at its contacts 951, the loop circuit which is extended over the toll line TL811 to the trunk repeater 810 in the central exchange B. The interruption of this loop circuit will initiate the release of the switching apparatus in the central exchange B as will be subsequently described. As a further result of the restoration of the line relay R950, at its contacts 952, it interrupts the circuit for the slow-to-release hold relay R1020, whereupon, the latter relay restores to normal and interrupts, at its contacts 1021, the circuit for the slow-to-release hold relay R1030. At the contacts 1031, the hold relay R1030 now disconnects the holding ground potential, at the contacts 1017, from the circuit including the C conductor C907 in the cable C1326. The removal of the holding ground potential from this conductor now causes the local connector 1319, line finder 1318 and the line circuit 1315 to restore to normal and it removes the busy marking ground potential from the C conductor C1315C so that the subscriber line including the conductors C1309 and C1310 may be utilized in receiving or originating another call.

Referring again to the ticket repeater 900, it will be seen that at the contacts 1032, the hold relay R1030 completes a circuit for restoring the registers 1170, 1180 and 1190 to their normal positions. This releasing circuit may be traced from ground at the contacts 942 on the restored pulse control relay R940 and then by way of the contacts 1032, off-normal contacts ON1173, contacts 1172 and the winding of the magnet M1171, to battery. In this circuit it should be noted that the off-normal contacts ON1173 are closed as long as the wiper 1174 is in engagement with any one of the contacts 1 to 10, inclusive, in the associated contact bank and that the off-normal contacts ON1173 are moved to the illustrated open position whenever the wiper 1174 engages the contact 11. In response to the above mentioned circuit, the magnet M1171 operates and opens its contacts 1172 so that the magnet immediately restores to normal. Upon restoring, the magnet M1171 advances its wiper 1174 an additional step in the clockwise direction. This self-interrupting circuit for the magnet M1171 is maintained until the wiper 1174 again engages its contact 11 to open the off-normal contacts ON1173. Consequently, the self-interrupting circuit for the magnet M1171 is thus terminated with the wiper 1174 in its normal position. An identical self-interrupting circuit is also completed for the magnet M1181 by way of the off-normal contacts ON1183 and the contacts 1182. Accordingly, the magnet M1181 is self-interruptedly operated until the wiper 1184 engages its contact 11 to open the off-normal contacts ON1183. In addition to the foregoing, an identical self-interrupting circuit is completed for the magnet M1191 so that this magnet is self-interruptedly operated until its wiper 1194 engages its contact 11 and opens its off-normal contacts ON1193.

In view of the foregoing, it will be understood that when the hold relay R1030 restores to normal and closes its contacts 1032, the magnet M1171, M1181 and M1191 are simultaneously self-interruptedly operated until the associated wipers are returned to their home contact positions in order to place the hundreds digit register 1170, the tens digit register 1180 and the station digit register 1190 in condition to again register digits of a calling number as dialed by a calling subscriber in another call.

As a further result of the restoration of the hold relay R1030, at its contacts 1035, it interrupts the circuit for the control relay R910 and the latter relay upon restoring at its contacts 911, interrupts the circuit for the control relay R930 which also restores to normal.

Inasmuch as the 0 register 915 is still registering the digit 0 dialed by the calling subscriber in the course of setting up the connection to the central exchange B, it is now necessary to restore this register to its normal position. Consequently, when the hold relay R1030 restores to normal, at its contacts 1034, it removes the holding ground potential from the locking conductor C1205. When this occurs, the outgoing relay R920, the 0 dialed relay R960, the calling number register relay R1040, the control relay R1050, vertification complete relay R1080, the control relay R1090, the transfer relays R1130 to R1155 and all of the operated relays in the party line station identifying register 1201 all restore to normal.

As soon as the 0 dialed relay R960 restores to normal it completes, at its contacts 967, a circuit for self-interruptedly operating the magnet M916 so that the wipers 918 and 919 of the 0 register 915 are restored to normal. This circuit includes ground at contacts 942, contacts 931, off-normal contacts ON913, contacts 917 and 967 and the winding of the magnet M916, to battery. The magnet M916 operates over this circuit and immediately interrupts its own circuit, at its contacts 917, whereupon, the magnet restores to normal and advances its wipers 918 and 919 an additional step into engagement with the home contact position. Inasmuch as the digit 0 has previously been registered by the 0 register 915, the advancement of the wipers will return them to the home contact position and cause the off-normal contacts ON913 to open the self-interrupting circuit for the magnet M916. Thus, the wipers of the 0 register 915 are again returned to the normal home contact position.

As a further result of the restoration of the 0 dialed relay R960, at its contacts 961 to 964, inclusive, it disconnects the line relay R950 from the — and + line conductors C905 and C906 and reconnects the local line relay R970 and the polarized party line relay to these line conductors.

The restoration of the remaining relays, noted above, that have been locked to the locking conductor C1205, places the ticket repeater 900 in its normal condition so that it may be utilized in conjunction with an incoming call received over the toll line TL811 from the central exchange B or it may be utilized by a subscriber in the remote exchange C to extend an outgoing call over the toll line TL811 to the central exchange B.

Referring now to Fig. 15 it should be understood that when the loop circuit, including the toll line TL811, is interrupted by the contacts 951 upon the release of the line relay R950 in the ticket repeater 900, the trunk repeater 810 will interrupt the loop circuit including the allotter 815, the rotary switch 816, and the — and + conductors C493 and C494 in the ticketer 700 in order to restore the line relay R440 which is bridged across the — and + conductors C493 and C494 through the left-hand windings of the repeating coil 490. As soon as the line relay R440 restores, it interrupts, at its contacts 441, a point in the previously described loop circuit including the upper winding of the polarized answer relay R270 and the — and + conductors C491 and C492 extending to the trunk selector 801. The interruption of the above noted loop circuit causes the trunk selector 801, the incoming selector 802, the second selector 803, the connector 804, and the line circuit 120 in exchange B to restore to normal in a conventional manner. Thus, the above noted switching apparatus is rendered available for use in other calls and the called subscriber line (conductors C116 and C117) is rendered available for use in either originating or receiving an additional call.

As a further result of the restoration of the line relay R440 it interrupts, at its contacts 443, the circuit for the slow-to-release hold relay R410. Before the hold relay R410 restores to normal, a circuit including ground at contacts 442, contacts 456, 412 and 474, will be completed for operating the pulse control relay R485. This operation of the pulse control relay R485 is of no importance at this time and it performs no switching control. Furthermore, the hold relay R410 restores to normal and, at its contacts 412, interrupts the above mentioned circuit for the pulse control relay R485.

As a further result of the restoration of the hold relay R410, at its contacts 411, it removes ground potential from the hold conductor C495 extending to the rotary switch 816 and allotter 815, whereby, the allotter and the trunk repeater 810 are rendered available for use in other calls. Incident to the release of the trunk repeater 810, the allotter 815 and the rotary switch 816, the line conductors C493 and C494 are disconnected from this apparatus and the circuit for the control relay R260 in the ticketer 700 is interrupted to permit the last mentioned relay to restore to normal.

As a further result of the restoration of the hold relay R410, at its contacts 413, it interrupts the circuit for the slow-to-release control relay R250 which slowly restores to normal. As soon as the relay R250 restores to normal it completes, at its contacts 251, a circuit including the wiper 706 (which has been advanced one step from the home contact into engagement with the home contact 1) for energizing the upper winding of the operated control relay R610 and in multiple therewith, for completing an operating circuit for the slow-to-operate release guard relay R230. Consequently, the control relay R610 and the relay R230 will be retained in their operated positions as long as the wiper 706 is grounded and is in engagement with any one of its contacts 1 to 23, inclusive. In other words, the two relays will remain in their operated positions during the time the storage transfer switch 701 is utilized in transferring the various items of record information stored in the ticketer 700 to the tabulator 745.

As a further result of the restoration of the control relay R250, at its contacts 252, it disconnects the busy marking ground potential, at the contacts 162, from the C conductor C416 in the cable C123 but the ground potential is replaced on this conductor, at the contacts 231, as soon as the relay R230 operates. Consequently, the ticketer 700 is retained busy to prevent its seizure by any of the selectors, including the first selector 122 having access thereto. In other words, the relay R230, at its contacts 231, artificially marks the ticketer 700 busy to the selectors including the first selector 122 having access thereto and, at its contacts 232, it applies the busy marking ground potential to the conductor C497 to mark the ticketer 700 busy to the rotary switches, including the rotary switch 816, having access thereto. In this connection it should be noted that the operating circuit for the relay R230 is completed, at the contacts 251, incident to the restoration of the control relay R250 and at the same time, at its contacts 252 and 253, removes the busy marking ground potentials initially applied to the conductors C416 and C497.

As a further result of the restoration of the control relay R250, at its contacts 254, it interrupts the circuit for the hold slave relay R480, whereupon, the latter relay slowly restores to normal to interrupt, at its contacts 481, the energizing circuit for the lower winding of the control relay R610. The relay R610, however, is retained in its operated position over the previously mentioned circuit including its upper winding. Finally, at the contacts 255, the control relay R250 disconnects the five second time pulse conductor C614 from the conversation timer 635 in order to terminate further stepping of the timer. Accordingly, it will be understood that as soon as the calling party releases the connection, the line relay R430 will control the restoration of the control relay R250 and the latter relay, at its contacts 255, will terminate further operation of the conversation timer 635. The conversation timer 635, however, will now maintain marking potentials on the WXYZ31 to WXYZ33 in the cable C634 to indicate in code form the units, tens and hundreds digits corresponding to the total elapsed conversation time of the established connection.

*Selecting the tabulator 745 to record the call from exchange C to exchange B*

As pointed out above, the relay R230 retains the busy condition of the ticketer 700 to prevent its seizure for an outgoing call by any of the first selectors, including the selector 122, and for preventing its seizure on an incoming call by one of the rotary switches, including the rotary switch 816. As a further result of the operation of the relay R230, at its contacts 234, it completes a circuit, including the contacts 673, for operating the allotter start relay R680 and, at its contacts 233, it applies ground potential by way of the upper winding of the tabulator cut-in relay R670 and the contacts 671 to the conductor C741 extending to the tabulator 745. The operation of the relays R680 and R670 and the manner in which the tabulator allotter 744 selects an available tabulator 745 and associates the tabulator with the calling ticketer 700 is exactly the same as has been previously described under the heading "Selecting The Tabulator 745 To Record The Call From Exchange B to Exchange C." Accordingly, it will be understood from the above description that the tabulator 745 will be associated with the ticketer 700 and it will cause the operation of the tabulator cut-in relay R670 and the restoration of the allotter start relay R680. The tabulator 745 is now seized and is ready to transmit impulses over the conductor C741 by way of the contacts 672 to the magnet M707 at the same time that it transmits corresponding impulses to a similar magnet in the tabulator 745.

At the present time, the wipers 702 to 706, inclusive, of the storage transfer switch 701, are in engagement with the contacts 1 in the associated contact banks and are ready to be advanced into engagement with the contacts 2 so that the WXYZ conductors C735 to C738, inclusive, extending to the tabulator 745, may be marked in code form in accordance with the units digit of the three digit number identifying the particular calling ticketer 700.

As soon as the first pulse is transmitted over the conductor C741 by the tabulator 745, the magnet M707 advances its wiper into engagement with the contacts 2. The contacts 2 engaged by the wipers 702 to 705, inclusive, are connected respectively to the WXYZ2 conductors which are permanently marked at the terminal block TB746 to indicate the units digit 1. The contacts 3 accessible to the wipers 702 to 705, inclusive, are connected respectively to the WXYZ3 conductors which are permanently marked at the terminal block TB746 to indicate the tens digit 0. The contacts 4 accessible to the wipers 702 to 705, inclusive, are connected respectively to the WXYZ4 code marking conductors which are permanently marked at the terminal block TB746 to indicate the hundreds digit 0. Thus, the ticketer 700 is identified by the ticketer number 001.

In view of the foregoing, it will be understood that as the wipers 702 to 705, inclusive, are advanced step-by-step under control of pulses transmitted to the magnet M707 by the tabulator 745, the wipers will successively engage the contacts 2, 3 and 4 in the corresponding banks to transfer the units digit 1, the tens digit 0 and the hundreds digit 0 in the order named to the tabulator 745. The tabulator 745 will store these digits so that the number 001 identifying the calling ticketer 700 will be stored in the tabulator 745.

The next three pulses transmitted by the tabulator 745 will advance the wipers of the storage transfer switch into engagement with the contacts 7 terminating the WXYZ31 code marking conductors in the cable C634. It should be noted that the contacts 8 accessible to the wipers of the storage transfer switch 701 terminate the WXYZ32 code marking conductors and that the contacts 9 terminate the WXYZ33 code marking conductors in the cable C634. As previously noted, these conductors are respectively marked in code form in accordance with the units, tens and hundreds digits of the elapsed conversation time, now registered in the conversation timer 635. Consequently, as the wipers 702 to 705, inclusive, are advanced step-by-step over the contacts 7, 8 and 9, the conductor C735 to C738 will be successively marked in code form in accordance with the units, tens and hundreds digits of the elapsed conversation time. These digits will then be stored in the tabulator 745 in the manner previously described.

The next three impulses transmitted by the tabulator 745 to the storage transfer switch 701 will advance the wiper step-by-step into engagement with the contacts 12 in the associated contact banks. At this time, it should be noted that due to the fact that the called station number includes four digits (4774) which have been registered respectively in the registers 550, 560, 570 and 580, there is no necessity for providing a "space" marking on the WXYZ12 conductors. When only three digits have been registered in the three registers noted as is the case when the call is extended from exchange B to exchange C, no digit is registered in the units digit register 580 and it is necessary to mark the WXYZ12 conductors in accordance with an arbitrary "space" marking to indicate this fact. This is done by operating the calling exchange relay R720 which marks the WXYZ12 code marking conductors in accordance with the "space" indication. Since a digit is registered in the units digit register 580 in the present call, the calling exchange relay R720 is in its restored position. In view of the foregoing it will be appreciated that as the wipers 702 to 705, inclusive, are advanced step-by-step over the contacts 12 to 16, inclusive, terminating the WXYZ12 to WXYZ16 code marking conductors, the units digit 4, the tens digit 7, the hundreds digit 7 and the thousands digit 4 corresponding to the number of the called subscriber at station 4774 will be transferred in code form over the conductors C735 to C738, inclusive, and registered in the tabulator 745. Also, the WXYZ16 code marking conductors in the cable C549 will be marked in code form in accordance with the called office code digit 4 registered in the register 540 identifying the central exchange B so that this digit will also be transferred in code form to the tabulator 745 and registered therein.

Thereafter, the tabulator 745 will control the wipers of the storage transfer switch 701 so that they are advanced step-by-step from the contacts 16 into engagement with the contacts 19. In the previous description of a call from exchange B to exchange C, it was pointed out that the WXYZ19 to WXYZ22 code marking conductors in the cable C362 to C365, inclusive, were marked in code form by the code storage register 302 in accordance with the four digit number identifying the calling subscriber station in exchange B. In the present call from exchange C to exchange B, the three digits 253 identifying the calling subscriber station in exchange C are registered respectively in the digit registers 510, 520 and 530. These registers in turn mark the WXYZ22, WXYZ21 and WXYZ20 code marking conductors in the respective cables C539, C529 and C519 in accordance with the corresponding digits registered in the associated digit registers. Accordingly, no digit is marked in code form on the WXYZ19 code marking conductors terminating in the bank contacts 19 of the storage transfer switch 701. In order to indicate this fact to the tabulator 745, circuits are completed when the wipers 702 to 705, inclusive, engage contacts 19, for marking the conductors C735 to C738, inclusive, in accordance with a "space" indication.

As previously noted, the calling exchange relay R720 is in its restored position during the present call and ground potential at the contacts 613 of the operated control relay R610 is applied by way of the contacts 721, 725, and 729, to the WXY19 code marking conductors engaged by the wipers 702, 703 and 704 so that a "space" indication will be registered in the tabulator 745 in the register that is normally utilized to register the units digit of a four digit calling subscriber number. As the wipers 702 to 705, inclusive, are advanced step-by-step over the contacts 20, 21 and 22, the units digit, the tens digit and the hundreds digit of the calling station number 253 registered in the respective registers 530, 520 and 510 will be transferred to the tabulator 745 and stored in the registers therein which are utilized in a call from exchange B to exchange C to register respectively the tens, hundreds and thousands digit of a four digit calling subscriber number.

When the wipers 701 to 705, inclusive, engage the contacts 23 in the associated contact banks, the Y23 and Z23 code marking conductors will be grounded by way of the contacts 727 and 731 of the restored calling exchange relay R720. Consequently, the digit 6 identifying the calling remote exchange C will be transferred in code form to the tabulator 745. At the present time all of the information stored in the ticketer 700 has been transferred to and stored in the tabulator 745.

In order more readily to determine the various items of information which are transferred from the ticketer 700 to the tabulator 745 in connection with the present call from the calling subscriber station in the remote exchange C to the called subscriber station in the central exchange B, reference may be had to the following table:

| Storage Transfer Switch 701 | Code Marking Conductors | Information Transferred |
|---|---|---|
| 1 | Blank | Blank. |
| 2 | WXYZ2 | Ticketer No. Units Digit (1). |
| 3 | WXYZ3 | Ticketer No. Tens Digit (0). |
| 4 | WXYZ4 | Ticketer No. Hundreds Digit (0). |
| 5 | Blank | Blank. |
| 6 | Blank | Blank. |
| 7 | WXYZ33 | Conversation Time Units Digit. |
| 8 | WXYZ32 | Conversation Time Tens Digit. |
| 9 | WXYZ31 | Conversation Time Hundreds Digit. |
| 10 | Blank | Blank. |
| 11 | Blank | Blank. |
| 12 | WXYZ12 | Called No. Units Digit (4). |
| 13 | WXYZ13 | Called No. Tens Digit (7). |
| 14 | WXYZ14 | Called No. Hundreds Digit (7). |
| 15 | WXYZ15 | Called No. Thousands Digit (4). |
| 16 | WXYZ16 | Called No. Exchange Digit (4). |
| 17 | Blank | Blank. |
| 18 | Blank | Blank. |
| 19 | WXYZ19 | Space. |
| 20 | WXYZ20 | Calling No. Units Digit (3). |
| 21 | WXYZ21 | Calling No. Tens Digit (5). |
| 22 | WXYZ22 | Calling No. Hundreds Digit (2). |
| 23 | WXYZ23 | Calling No. Exchange Digit (6). |
| 24 | Blank | Blank. |
| 25 | Blank | Blank. |
| 26 (home) | Blank | Blank. |

As the tabulator 745 transmits an additional impulse to the magnet M707, the wipers of the storage transfer switch 701 will be advanced one step from the contacts 23 into engagement with the contacts 24, as noted above. However, as soon as the wiper 706 disengages the contact 23, the ground potential on the wiper 706 is disconnected from the previously described multiple circuit for the upper winding of the control relay R610 and the winding of the release guard relay R230. These relays restore to normal at this time.

Referring now to the control relay R610, it will be seen that as soon as this relay restores to normal, it interrupts, at its contacts 613, a point in the previously traced circuit for applying ground potential to the different contacts on the restored calling exchange relay R720. Finally, at its contacts 612, the relay R610 now interrupts the circuit for the release relay R460 which also restores to normal.

Referring now to the release relay R460 it will be seen that, at its contacts 462, it applies ground potential by way of the off-normal contacts ON507, contacts 506 and the winding of the magnet M505, to battery. The off-normal contacts ON507 are in a closed position whenever the wipers 502 to 504, inclusive, of the receive sequence switch 501 are disengaged from the illustrated home contact positions As soon as the wipers again engage the home contact positions, the off-normal contacts ON507 are opened. Consequently, at the present time the magnet M505 is self-interruptedly operated by its contacts 506 to advance the wipers 502 to 504, inclusive, step-by-step into engagement with the home contact position. When this occurs, the off-normal contacts ON507 are opened to terminate further stepping of the magnet M505.

As a further result of the restoration of the release relay R460, at its contacts 463, it completes a point in the chain circuit for controlling the magnets of the register switches in the digit register 509, one after another, until all of these switches have been restored to their normal positions. In the present call, the hundreds digit 2 identifying the calling subscribed at station 253 is registered in the digit register 510. Consequently, the ground potential at the contacts 463 is extended by way of the off-normal contacts ON513 (closed whenever the wipers of the register 510 are in an off-normal position) contacts 512 and the winding of the magnet M511, to battery. This magnet is self-interruptedly operated by its contacts 512 until the wipers 515 and 516 are again advanced to the position illustrated in the drawings. At this time, the contacts ON513 are closed in order to transfer the releasing ground potential, at contacts 463, to corresponding off-normal contacts in the register 520. The magnet (not shown) in the register 520 will also be self-interruptedly operated until its wipers are advanced to their normal positions. When this occurs, the release circuits will be further transferred to the succeeding register 530. From the foregoing, it should be understood that the operated ones of the digit registers 510 to 580, inclusive, will be restored to normal one after another in the order named.

At the contacts 465, the release relay R460 interrupts a point in the pre-energizing circuit for the lower winding of the polarized answer relay R270. At its contacts 466, the relay R460 removes the holding ground potential from the locking conductor C486 in order now to restore any operated relay in the ticketer 700 that is locked to this conductor. Consequently, at this time the timer start relay R620 restores to normal. Finally, at the contacts 467, the relay R460 connects battery potential by way of the resistor 468 to the C conductor C497 but this potential is not effective to mark the ticketer idle to the rotary switches, including the rotary switch 816 until the shunting ground potential is removed at the contacts 232 as will be described subsequently.

As soon as the timer start relay R620 restored to normal, as previously noted, it disconnects ground potential, at the contacts 621, from the off-normal contacts ON709; at the contacts 624, it interrupts a further point in the time pulsing circuit for the conversation timer 635; and, at its contacts 623, it connects the release supervisory relay R240 to the releasing circuit including the conversation timer 635 and the storage transfer switch 701. Thus, the release supervisory relay R240 is operated in series with one of the magnets (not shown) of the registers in the conversation timer 635 to complete the self-interrupting circuit for the latter magnet, whereby, the register therein is restored to normal in substantially the same manner as has been described in connection with the restoration of the wipers associated with the magnet M511 in the register 510. As the units, tens and hundreds digit registers (not shown) in the conversation timer 635 are restored to normal, the releasing circuit, including the winding of the relay R240, is sequentially transferred from one register to the next as described in connection with the restoration of the registers in the digit register 509. After all of the registers in the conversation timer 635 are restored to normal, the releasing circuit is further extended to the off-normal contacts ON710 of the storage transfer switch 701. If the wipers 702 to 706, inclusive, of the storage transfer switch 701 are in engagement with the illustrated home contact positions, then the off-normal contacts ON710 will be opened. However, if the wipers are in engagement with the contacts 24, for example, or any other positions, the off-normal contacts ON710 will be closed so that the releasing circuit includes contacts 708 and the winding of the magnet M707. Accordingly, the release supervisory relay will remain in its operated position and the magnet M707 will be operated. The magnet M707 is self-interruptedly operated, by means of its contacts 708, to advance its wipers step-by-step until the illustrated home contact position is encountered. When this occurs, the off-normal contacts ON710 will be opened, as illustrated in the drawings, to interrupt the releasing of the circuit.

As soon as the above mentioned releasing circuit is interrupted, the relay R240 slowly restores to normal. It should be noted, however, that during the time the relay R240 is operated, incident to the release of the registers in the conversation timer 635 and the release of the storage transfer switch 701, the contacts 241 are closed to illuminate the release signal lamp L244. The illuminated condition of the lamp L244 indicates to the exchange attendant that the ticketer 700 is in the release cycle of operation. Incidentally, if the lamp L244 remains illuminated for a period longer than is normally required to restore the conversation timer 635 and the storage transfer switch 701 to their normal positions, it will indicate to the exchange attendant that some fault has occurred during the releasing cycle of the ticketer 700. Also, during the operated period of the relay R240, at its contacts 242, it retains a busy marking ground potential on the conductor C416 and, at its contacts 243, it maintains the busy marking ground potential on the conductor C497 so that the ticketer 700 cannot be seized by a first selector, such as the selector 122, or by a rotary switch, such as the rotary switch 816.

It will be recalled that at the time the storage transfer switch advanced its wiper 706 from the contact 23, the relay R230 restored to normal. This relay is somewhat slow-to-release and, accordingly, maintains the busy marking ground potential on the conductors C416 and C497, at its contacts 231 and 232, during its operated period, but when this relay restores to normal, it removes the busy marking ground potential from each of these conductors. It will be appreciated that the ticketer 700 will be retained in a busy condition until both the relay R230 and the release supervisory relay R240 restore to their normal positions. As a further result of the restoration of the relay R230, at its contacts 233, it interrupts the locking circuit for the lower winding of the tabulator cut-in relay R670 to permit the latter relay to restore to normal. At the present time, the ticketer 700 is fully restored to normal and rendered available for use in a new call either from the exchange B to the exchange C or from the exchange C to the exchange B.

All of the items of information pertaining to the above described telephone connection from the calling subscriber station in exchange C to the called subscriber station in exchange B have now been transferred from the ticketer 700 and stored in the tabulator 745. The operation of the tabulator 745 to control the record tape perforator 750 and the ticket tape perforator 755 in order to produce perforated tapes containing in code form the various items of record information is the same as has been previously described.

For the purpose of the present description it will be assumed that the items of information in connection with the call from exchange C to exchange B are perforated by the record tape perforator 750 in the following order:

1. Tens digit of the month
2. Units digit of the month
3. Tens digit of the day
4. Units digit of the day
5. Tens digit of the hour
6. Units digit of the hour
7. Tens digit of the minute
8. Units digit of the minute
9. Digit 4 identifying the calling exchange C
10. Hundreds digit 2 of the calling number
11. Tens digit 5 of the calling number
12. Units digit 3 of the calling number
13. Space
14. Digit 4 identifying the called exchange B
15. Thousands digit 4 of the called number
16. Hundreds digit 7 of the called number
17. Tens digit 7 of the called number
18. Hundreds digit 4 of the called number
19. Hundreds digit of the conversation time
20. Tens digit of the conversation time
21. Units digit of the conversation time 22. Hundreds digit 0 of the ticketer number
23. Tens digit 0 of the ticketer number
24. Units digit 1 of the ticketer number The foregoing table illustrates one manner in which the record perforator 750 may be controlled to perforate the tape in accordance with the various items of record information stored in the tabulator 745. However, it should be understood that any other order may be utilized to control the perforator to perforate the associated tape.

The record tape perforator 750 will produce a perforated tape including all of the above noted items of information, whereas, the ticket tape perforator 755 will be controlled by the tabulator 745 so that it will perforate its tape in accordance with only the items of 9 to 21, inclusive, noted above. After all of the items of information stored in the tabulator 745 have been transmitted to the perforators 750 and 755, the tabulator 745 automatically restores to its normal condition and is rendered available to the tabulator allotter 744 for use in recording a subsequent call.

From the foregoing description of the operation of the telephone system illustrated in the drawings, it will be appreciated that in response to the extension of a toll call from the subscriber in exchange B to a called subscriber in the remote exchange C, the calling subscriber will dial the prefix digits 90 followed by the digit 6 identifying the called exchange C and then three digits 253 corresponding to the station number of the desired called subscriber in exchange C. In response to this call, the ticketer 700 in the central exchange B will register the four digits of the station number of the calling subscriber as determined by the detector 1900 and it will register the digit 6 identifying the called exchange C and the digits 253 identifying the called station. Also, the ticketer 700 will time the call and it will store the elapsed conversation time in the conversation timer 635. In response to the release of the connection, the ticketer 700 will cause the tabulator 745 to associate itself with the ticketer 700 so that the items of information pertaining to the call, including the number of the ticketer, the elapsed conversation time, the number of the called station, the digit identifying the called exchange C, the number of the calling subscriber station, and the number of the calling exchange B will be transferred to the tabulator allotter 745 so that a record may be produced of all of the items of information.

It will also be understood that on a call from a subscriber in the remote exchange C to a called subscriber in the central exchange B, the calling subscriber will first dial the prefix digits 90 to select a ticket repeater in the remote exchange C. The calling subscriber will then dial the three digits corresponding to the calling station directory number. The calling subscriber will then dial the digit 4 identifying the called central exchange B and then the four digit number identifying the called station in the central exchange B. It will also be understood that the ticket repeater in the remote exchange C responds to all of the above noted digits dialed by the calling subscriber except the first digit 9 which is utilized in selecting the ticket repeater. Furthermore, the ticket repeater 900 repeats impulses of all of the dialed digits, except the two digits 90, over the toll line TL811 to the ticketer in the central exchange B. Consequently, the digits 253 identifying the calling subscriber, as dialed by the calling subscriber, the digit 4 identifying the called exchange digit 4, and the four digits identifying the called subscriber station are registered in the digit register 509. It will also be recalled that the conversation timer 635 registers the total elapsed time of the conversation and upon release of the connection, the ticketer in the central exchange B selects an idle tabulator. As a result of the last mentioned operation, the ticketer is marked busy to further calls but, it is retained connected to the tabulator until all of the items of information, including the calling subscriber number, the calling exchange digit, the called subscriber number, the called exchange digit, the total elapsed time of the conversation and the identity of the ticketer involved in the connection, are transferred to the tabulator. As soon as the various items of information are transferred to the tabulator, the ticketer is released from the connection and rendered available for an additional call and it may be utilized in an additional call while the tabulator is controlling the perforators to produce the record of the items of information stored therein.

While one embodiment of the invention has been disclosed, it will be understood that various modifications may be made therein which are within the true spirit and scope of the invention.

What is claimed is:

1. In an automatic telephone system comprising, a first exchange provided with first switching apparatus and a first subscriber station identified by a first plural digit directory number, a second exchange provided with second switching apparatus and a second subscriber station identified by a second plural digit directory number, a calling device at each of said stations, a first repeater in said first exchange provided with a first register and a second register, means controlled by said first station calling device for operating said first switching apparatus to extend a first connection to said first repeater, means in said first repeater controlled thereafter by said first station calling device for operating said first register to register therein a predetermined digit, means controlled in response to said registration of said predetermined digit in said first register for operating said second register to register therein for recording purposes said digits of said first station directory number, additional means in said first repeater controlled thereafter by said first station calling device for operating said second register to also register therein for recording purposes said digits of said second station directory number and for repeating impulses corresponding to said digits of said second station directory number to said second switching apparatus in order to complete said first telephone connection from said first station to said second station, a second repeater in said second exchange provided with a third register, means controlled by said second station calling device for operating said second switching apparatus to extend a second different connection to said second repeater, means in said second repeater controlled thereafter by said second station calling device for operating said third register to register therein a predetermined digit, additional means in said second repeater selected in response to said registration of said predetermined digit in said third register and thereafter controlled by said second station calling device for repeating impulses corresponding to said second station directory number and said first station directory number to said first repeater, and means in said first repeater controlled by said impulses repeated thereto by said second repeater additional means for operating said second register to register for recording purposes said second station directory number and said first station directory number and for repeating impulses corresponding to said digits of said first station directory number to said first switching apparatus in order to complete said second different telephone connection from said second station to said first station.

2. In an automatic telephone system comprising, a first exchange provided with first switching apparatus and a first subscriber station identified by a plural digit directory number, a second exchange provided with second switching apparatus and a second subscriber station identified by a plural digit directory number, a first repeater in said first exchange, a first register in said first repeater, a second register in said first repeater operative to register information for recording purposes, means including a calling device at said first station for controlling said first switching apparatus to extend a first connection to said first repeater, means in said first repeater controlled thereafter by said calling device at said first station for operating said first register to register a predetermined digit therein, means in said first repeater controlled in response to said registration of said predetermined digit in said first register for operating said second register to register the directory number of said calling first station, additional means in said first repeater controlled thereafter by said calling device at said first station for operating said second register to register said called second station directory number and for repeating impulses corresponding to said called second station directory number to said second switching apparatus in order to complete said first telephone connection between said calling first station and said called second station, a second repeater in said second exchange, a third register in said second repeater, a fourth register in said second repeater, means including a calling device at said second station for controlling said second switching apparatus to extend a second different connection to said second repeater, means in said second repeater controlled thereafter by said calling device at said second station for operating said third register to register a predetermined digit therein, means in said second repeater controlled in response to said registration of said predetermined digit in said third register for conditioning said first repeater for subsequent operation, additional means in said second repeater controlled thereafter by said calling device at said second station for operating said fourth register to register said calling second station directory number and for repeating impulses corresponding to said calling second station directory number and said called first station directory number to said first repeater, and means in said first repeater controlled by said impulses repeated thereto by said second repeater for operating said second register to register said calling second and said called first station directory numbers and for repeating impulses corresponding to said called first station directory number to said first switching apparatus in order to complete said second different telephone connection between said calling second station and said called first station.

3. In an automatic telephone system comprising, a first exchange provided with first switching apparatus and a first subscriber station identified by a first plural digit directory number, a second exchange provided with second switching apparatus and a second subscriber station identified by a second plural digit directory number, a calling device at said first station and a calling device at said second station, a first repeater in said first exchange provided with a first register and a second register and a third register, means controlled by said first station calling device for operating said first switching apparatus to extend a first connection to said first repeater, means in said first repeater controlled thereafter by said first station calling device for operating said first register to register therein a predetermined digit, a detector, means controlled in response to said registration of said predetermined digit in said first register for operating said detector to detect and register said digits of said directory number of said first station in said second register for recording purposes, additional means in said first repeater controlled thereafter by said first station calling device for operating said third register to register therein for recording purposes said digits of said second station directory number and for repeating impulses corresponding to said digits of said second station directory number to said second switching apparatus in order to complete said first telephone connection from said first station to said second station, a second repeater in said second exchange provided with a fourth register and a fifth register, means controlled by said second station calling device for operating said second switching apparatus to extend a second different connection to said second repeater, means in said second repeater controlled thereafter by said second station calling device for operating said fourth register to register therein a predetermined digit, a second station directory number verifier in said second exchange, additional means in said second repeater selected in response to said registration of said predetermined digit in said fourth register and thereafter controlled by said second station calling device for repeating impulses corresponding to said second station directory number and said first station directory number to said first repeater and for registering said digits of said second station directory number in said fifth register, means controlled in response to said registration of said second station directory number in said fifth register for operating said verifier to verify the accuracy of said second station directory number as registered in said fifth register, and means in said first repeater controlled by said impulses repeated thereto by said additional means in said second repeater for operating said third register to register therein for recording purposes both said second station directory number and said first station directory number and for repeating impulses corresponding only to said first station directory number to said first switching apparatus in order to complete said second different telephone connection from said second station to said first station.

4. In an automatic telephone system comprising, a first exchange provided with first switching apparatus and a first subscriber station identified by a first plural digit directory number, a second exchange provided with second switching apparatus and a second subscriber station identified by a second plural digit directory number, a calling device at said first station and a calling device at said second station, a first repeater in said first exchange provided with a first register and a second register and a third register, means controlled by said first station calling device for operating said first switching apparatus to extend a first connection to said first repeater, means in said first repeater controlled thereafter by said first station calling device for operating said first register to register therein a predetermined digit, means controlled in response to said registration of said predetermined digit in said first register for operating said second register to register therein for recording purposes said digits of said calling first station directory number, additional means in said first repeater controlled thereafter by said first station calling device for operating said third register to register therein for recording purpose said digits of said called second station directory number and for repeating to said second switching apparatus impulses corresponding to said digits of said called second station directory number in order to cause said second switching apparatus to complete said first telephone connection from said calling first station to said called second station, a second repeater in said second exchange provided with a fourth register, means controlled by said second station calling device for operating said second switching apparatus to extend a second different connection to said second repeater, means in said second repeater controlled thereafter by said second station calling device for operating said fourth register to register therein a predetermined digit, additional means in said second repeater selected in response to said registration of said predetermined digit in said fourth register and thereafter controlled by said second station calling device for repeating to said first repeater impulses corresponding to said calling second station directory number and impulses corresponding to said called first station directory number, and means in said first repeater controlled by said impulses repeated thereto by said additional means in said second repeater for operating said third register to register therein for recording purposes said calling second station directory number and said called first station directory number and for repeating to said first switching apparatus impulses corresponding to said called first station directory number in order to cause said first switching apparatus to complete said second different telephone connection from said calling second station to said called first station.

5. In an automatic telephone system, a first exchange provided with a plurality of first subscriber stations identified by respectively corresponding first plural digit directory numbers and including first switching apparatus and a first repeater and a detector, a second exchange provided with a plurality of second subscriber stations identified by respectively corresponding second plural digit directory numbers and including second switching apparatus and a second repeater and a verifier, a trunk line interconnecting said repeaters, a plurality of calling devices respectively at said stations; means controlled by the calling device at a calling one of said first stations for operating said first switching apparatus to extend a first connection from said calling first station to said first repeater, means in said first repeater for thereafter initiating operation of said detector automatically to detect the directory number of said calling first station, additional means in said first repeater for registering for recording purpose the directory number of said calling first station as detected by said detector, further means in said first repeater controlled by the calling device at said calling first station for registering for recording purpose the directory number of a called one of said second stations and for repeating corresponding digits over said trunk line to said second repeater, means controlled by said digits repeated over said trunk line to said second repeater for operating said second switching apparatus to complete said first telephone connection to said called second station; means controlled by the calling device at a calling one of said second stations for operating said second switching apparatus to extend a different second connection from said calling second station to said second repeater, means in said second repeater controlled by the calling device at said calling second station for registering for verifying purpose the directory number of said calling second station and for repeating first corresponding digits over said trunk line to said first repeater and for operating said verifier to verify the actual directory number of said calling second station with the directory number thereof as registered in said second repeater, additional means in said second repeater conditioned in response to verification by said verifier and controlled by the calling device at said calling second station for receiving the directory number of a called one of said first stations and for repeating second corresponding digits over said trunk line to said first repeater, means in said first repeater controlled by said first digits repeated thereto over said trunk line for registering for recording purpose the directory number of said calling second station, and additional means in said first repeater controlled by said second digits repeated thereto over said trunk line for registering for recording purpose the directory number of said called first station and for operating said first switching apparatus to complete said different second telephone connection to said called first station.

6. The automatic telephone system set forth in claim 5, wherein said further means in said first repeater is controlled by the calling device at said calling first station sequentially to register for recording purpose the individual digits of the directory number of a called one of said second stations and to repeat concurrently with the reception thereof the individual digits thus registered over said trunk line to said second repeater.

7. The automatic telephone system set forth in claim 5, wherein said means in said second repeater is controlled by the calling device at said calling second station sequentially to register for verifying purpose the individual digits of the directory number of said calling second station and to repeat concurrently with the reception thereof the individual digits thus registered over said trunk line to said first repeater.

8. In an automatic telephone system, a first exchange provided with a plurality of first subscriber stations identified by respectively corresponding first plural digit directory numbers and including first switching apparatus and a first repeater and a detector, a second exchange provided with a plurality of second subscriber stations identified by respectively corresponding second plural digit directory numbers and including second switching apparatus and a second repeater and a verifier, a trunk line interconnecting said repeaters, a plurality of calling devices respectively at said stations; means controlled by the calling device at a calling one of said first stations for operating said first switching apparatus to extend a first connection from said calling first station to said first repeater, means in said first repeater for thereafter initiating operation of said detector automatically to detect the directory number of said calling first station, additional means in said first repeater for registering for recording purpose the directory number of said calling first station as detected by said detector, further means in said first repeater controlled by the calling device at said calling first station for registering for recording purpose the directory number of a called one of said second stations and for repeating corresponding digits over said trunk line to said second repeater, means controlled by said digits repeated over said trunk line to said second repeater for operating said second switching apparatus to complete said first telephone connection to said called second station; means controlled by the calling device at a calling one of said second stations for operating said second switching apparatus to extend a different second connection from said calling second station to said second repeater, means in said second repeater controlled by the calling device at said calling second station for registering for verifying purpose the directory number of said calling second station and for repeating first corresponding digits over said trunk line to said first repeater and for operating said verifier to verify the actual directory number of said calling second station with the directory number thereof as registered in said second repeater, additional means in said second repeater responsive to failure of verification by said verifier for blocking said second repeater against the repeating of further digits over said trunk line to said first repeater, further means in said second repeater conditioned in response to verification by said verifier and controlled by the calling device at said calling second station for receiving the directory number of a called one of said first stations and for repeating second corresponding digits over said trunk line to said first repeater, means in said first repeater controlled by said first digits repeated thereto over said trunk line for registering for recording purpose the directory number of said calling second station, and additional means in said first repeater controlled by said second digits repeated thereto over said trunk line for registering for recording purpose the directory number of said called first station and for operating said first switching apparatus to complete said different second telephone connection to said called first station.

9. In an automatic telephone system, a first exchange provided with a plurality of first subscriber stations identified by respectively corresponding first plural digit directory numbers and including first switching apparatus and a first repeater and a detector, a second exchange provided with a plurality of second subscriber stations identified by respectively corresponding second plural digit directory numbers and including second switching apparatus and a second repeater and a verifier, a trunk line interconnecting said repeaters, a plurality of calling devices respectively at said stations; means controlled by the calling device at a calling one of said first stations for operating said first switching apparatus to extend a first connection from said calling first station to said first repeater, means in said first repeater for thereafter initiating operation of said detector automatically to detect the directory number of said calling first station, additional means in said first repeater for registering for recording purpose the directory number of said calling first station as detected by said detector, further means in said first repeater controlled by the calling device at said calling first station for registering for recording purpose the directory number of a called one of said second stations and for repeating corresponding digits over said trunk line to said second repeater, means controlled by said digits repeated over said trunk line to said second repeater for operating said second switching apparatus to complete said first telephone connection to said called second station; means controlled by the calling device at a calling one of said second stations for operating said second switching apparatus to extend a different second connection from said calling second station to said second repeater, means in said second repeater controlled by the calling device at said calling second station for registering for verifying purpose the directory number of said calling second station and for repeating first corresponding digits over said trunk line to said first repeater and for initiating operation of said verifier automatically to verify the actual directory number of said calling second station with the directory number thereof as registered in said second repeater, additional means in said second repeater responsive to failure of verification by said verifier for blocking said second repeater against the repeating of further digits over said trunk line to said first repeater and for returning a corresponding signal therefrom to said calling second station, further means in said second repeater conditioned in response to verification by said verifier and controlled by the calling device at said calling second station for receiving the directory number of a called one of said first stations and for repeating second corresponding digits over said trunk line to said first repeater, means in said first repeater controlled by said first digits repeated thereto over said trunk line for registering for recording purpose the directory number of said calling second station, and additional means in said first repeater controlled by said second digits repeated thereto over said trunk line for registering for recording purpose the directory number of said called first station and for operating said first switching apparatus to complete said different second telephone connection to said called first station.

References Cited in the file of this patent

UNITED STATES PATENTS

| | | |
|---|---|---|
| 2,297,365 | Ostline | Sept. 29, 1942 |
| 2,387,897 | Grandstaff | Oct. 30, 1945 |
| 2,581,287 | Ostline | Jan. 1, 1952 |
| 2,591,909 | Baker | Apr. 8, 1952 |
| 2,674,656 | Ostline | Apr. 6, 1954 |
| 2,782,257 | Blashfield et al. | Feb. 19, 1957 |

FOREIGN PATENTS

| | | |
|---|---|---|
| 541,074 | Great Britain | Nov. 12, 1941 |